(12) United States Patent
Ackerman et al.

(10) Patent No.: US 12,102,943 B2
(45) Date of Patent: Oct. 1, 2024

(54) DETECTION AND RECOVERY OF METALS FROM ORE

(71) Applicant: ECO METALS RECOVERY (HOLDING) LIMITED, Saint Michael (BB)

(72) Inventors: Dean John Ackerman, Gauteng (ZA); Sean Goodwin, Calgary (CA)

(73) Assignee: ECO METALS RECOVERY (HOLDING) LIMITED, St. Michael (BB)

( * ) Notice: Subject to any disclaimer, the term of this patent is extended or adjusted under 35 U.S.C. 154(b) by 0 days.

(21) Appl. No.: 18/258,531

(22) PCT Filed: Dec. 21, 2021

(86) PCT No.: PCT/CA2021/051864
§ 371 (c)(1),
(2) Date: Jun. 20, 2023

(87) PCT Pub. No.: WO2022/133599
PCT Pub. Date: Jun. 30, 2022

(65) Prior Publication Data
US 2024/0066437 A1    Feb. 29, 2024

Related U.S. Application Data

(60) Provisional application No. 63/128,569, filed on Dec. 21, 2020.

(51) Int. Cl.
*B01D 21/32* (2006.01)
*B01D 21/28* (2006.01)
*G01N 27/04* (2006.01)

(52) U.S. Cl.
CPC ............. *B01D 21/32* (2013.01); *B01D 21/28* (2013.01); *G01N 27/043* (2013.01)

(58) Field of Classification Search
CPC ....... B01D 23/32; B01D 23/28; G01N 27/043
See application file for complete search history.

(56) References Cited

U.S. PATENT DOCUMENTS

| 4,022,638 A | 5/1977 | Weet |
| 9,314,823 B2 | 4/2016 | Bamber |

(Continued)

FOREIGN PATENT DOCUMENTS

| CN | 101 900 739 A | 12/2010 |
| DE | 10118677 A1 | 4/2003 |

OTHER PUBLICATIONS

International Search Report for International Application No. PCT/CA2021/051864, (International Filing Date: Dec. 21, 2021), mailed Mar. 29, 2022 (3 pages).

(Continued)

*Primary Examiner* — Michael McCullough
*Assistant Examiner* — Kalyanavenkateshware Kumar
(74) *Attorney, Agent, or Firm* — Christensen O'Connor Johnson Kindness PLLC

(57) ABSTRACT

Method and apparatus are provided to select target metal particles from aggregate ore. A feed stream of aggregate is directed along a path and a higher density portion is segregated therefrom. Detectors are arranged in-line and along the flow of the higher density portion. High resolution detection of a target particles within the feed stream triggers ejection of a select portion of the feed stream and target particle as a concentrate and the balance continues to a further phase of detection/ejection. The concentrate is processed in further stages or collected as product. Multiple parallel detector/ejectors across the path can isolate target particles and minimize the ejected gangue portion associated therewith. Dry or hydrodynamic transport of the feed stream is available determined by aggregate characteristics. A compact footprint of the apparatus is achieved with arcuate paths and (Continued)

multi-level conveyance whilst low energy requirements enables use in artisan installations.

20 Claims, 35 Drawing Sheets

(56) References Cited

U.S. PATENT DOCUMENTS

| | | |
|---|---|---|
| 2009/0250384 A1 | 10/2009 | Valerio |
| 2011/0186660 A1 | 8/2011 | Harding et al. |
| 2013/0062443 A1* | 3/2013 | Wang ............... B07B 4/08 |
| | | 241/24.1 |
| 2019/0027569 A1 | 1/2019 | DeVos |
| 2019/0299255 A1* | 10/2019 | Chaganti ............ G06V 10/56 |
| 2019/0352741 A1 | 11/2019 | Budach, Jr. |
| 2020/0164409 A1 | 5/2020 | Shaw et al. |

OTHER PUBLICATIONS

Watt et al: "On-Stream analysis of metalliferous ore slurries", International Journal of Applied Radiation and Isotops, Pergamon Press, New York, NY, US, vol. 24, No. 1, Jan. 1, 1983, pp. 309-331.
Barette, L. and Turmel, S.: "On-line irone-ore slurry monitoring for real-time process control of pellet making processes using laser-induced breakdown spectroscopy: graphitic vs. total carbon detection", Spectrochimica Acta Part B, vol. 56B, 2001, pp. 715-723.
Holynska, B., Lankosz, M. and Ostachowicz, J.: "Benefits of automatic multielemental analysis of zinc-lead ore slurries by radioisotope x-ray flourescence" In: "Technical and Economic Benefits of Nuclear Techniques in Ore Processing", Aug. 1989, International Atomic Energy Agency, Vienna, pp. 43-49.

* cited by examiner

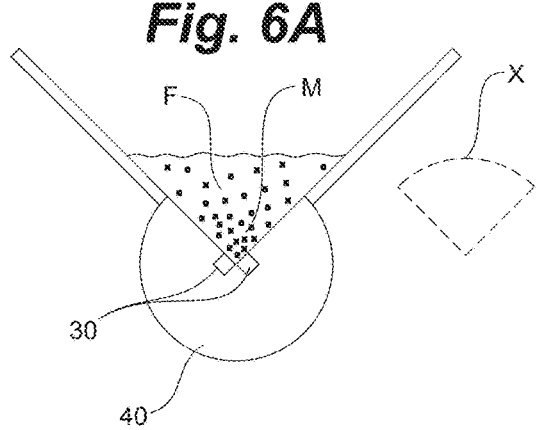
*Fig. 6A*
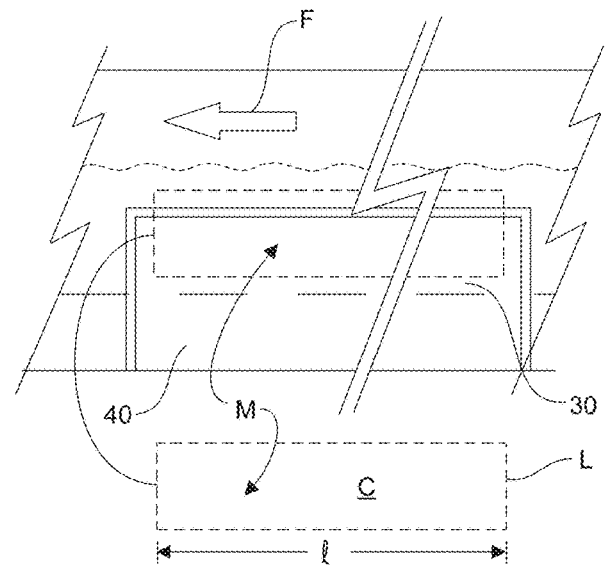
*Fig. 6B*
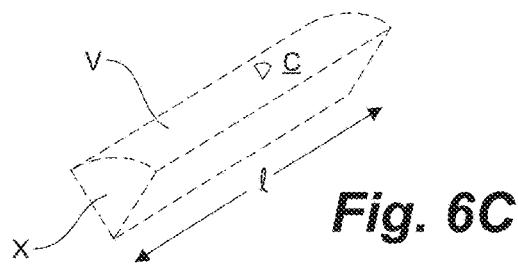
*Fig. 6C*
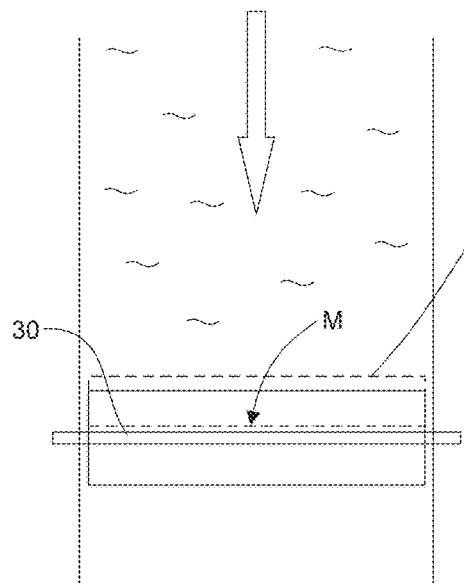
*Fig. 6D*
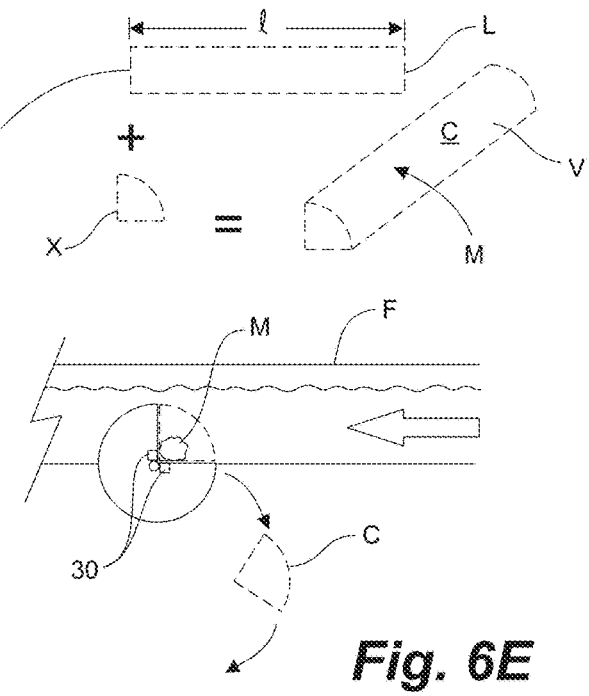
*Fig. 6F*
*Fig. 6E*

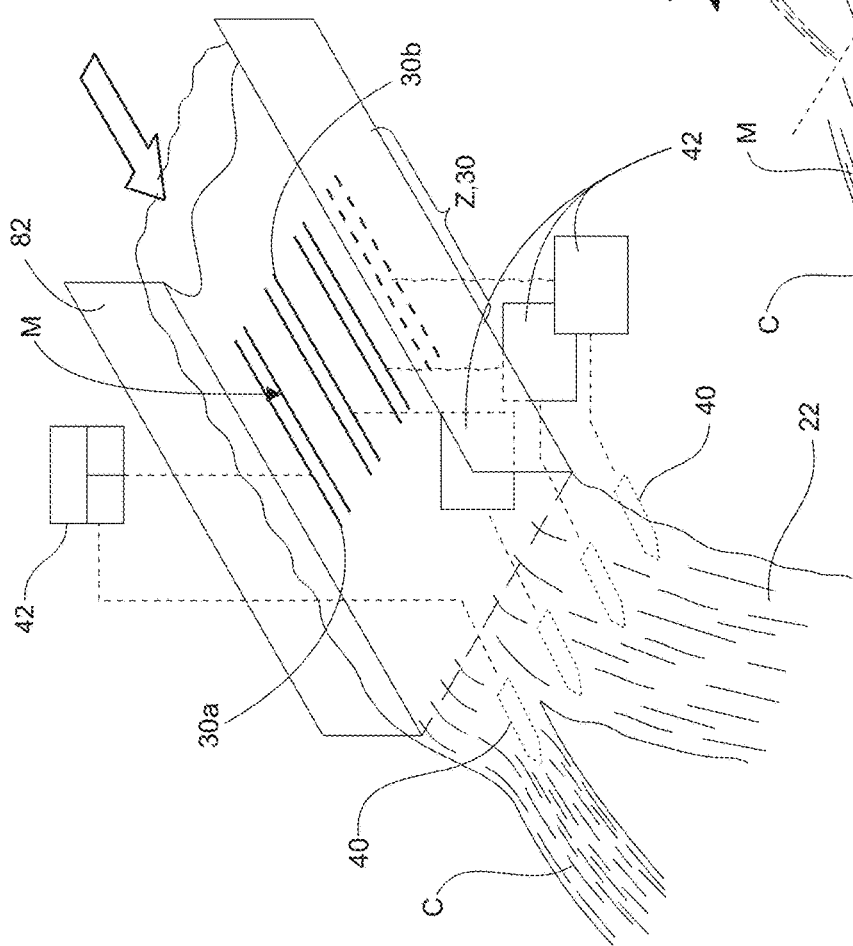

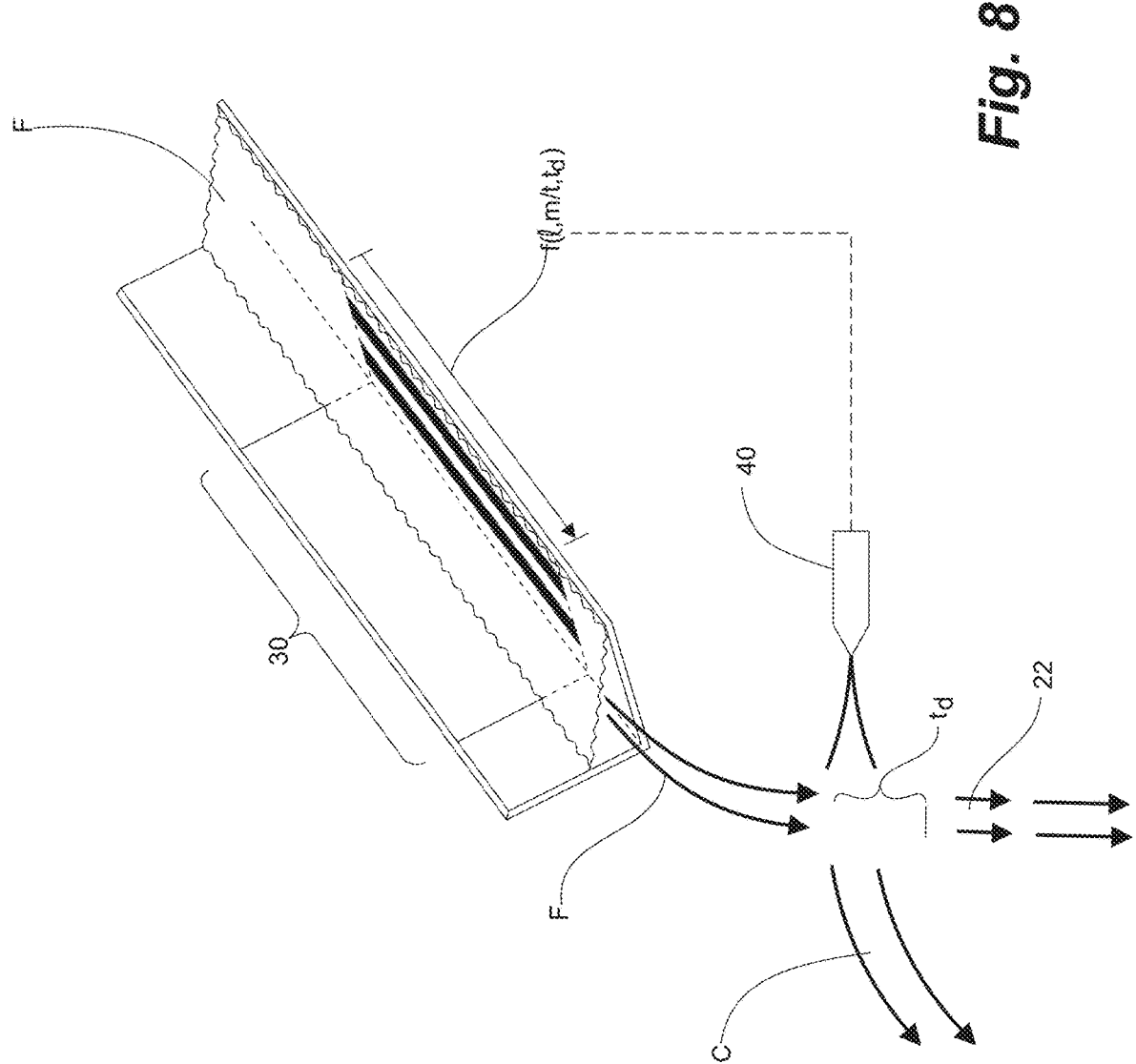

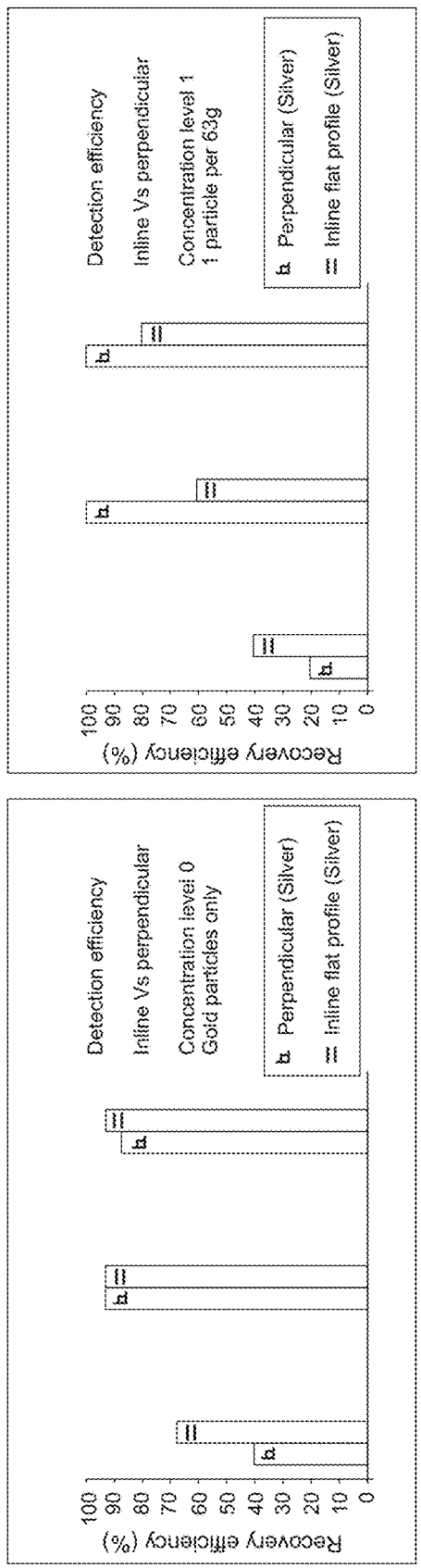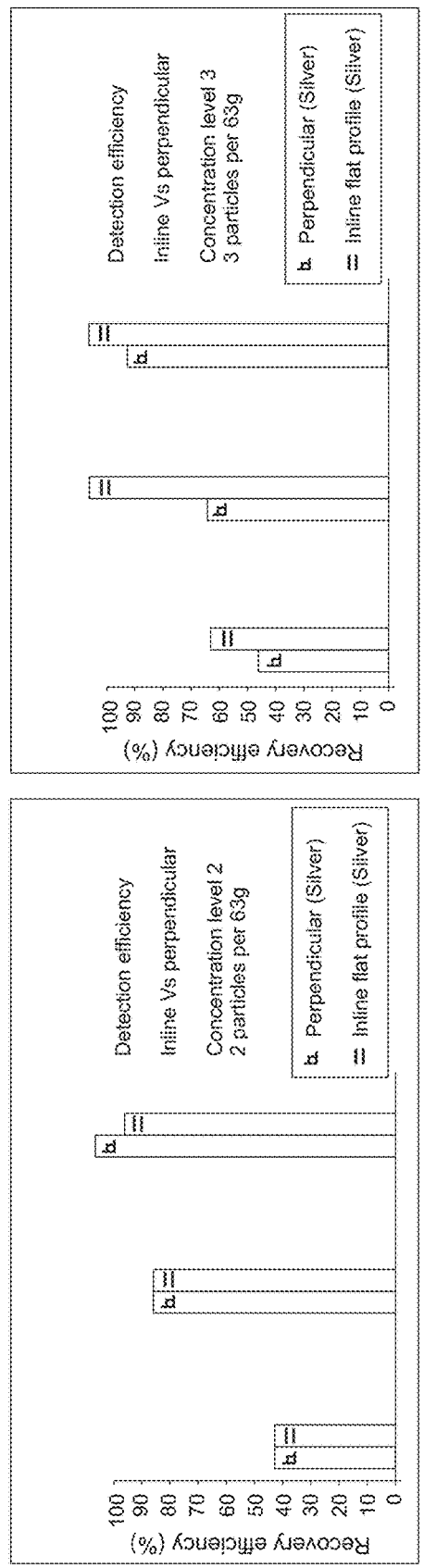
Fig. 11A
Fig. 11B
Fig. 11C
Fig. 11D

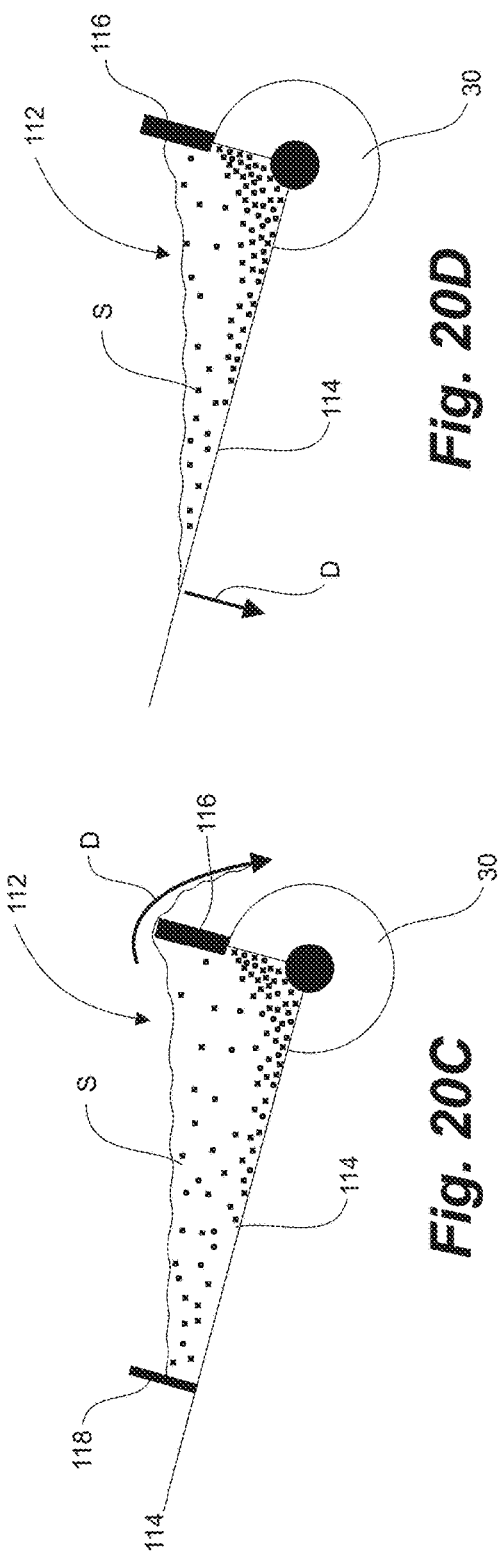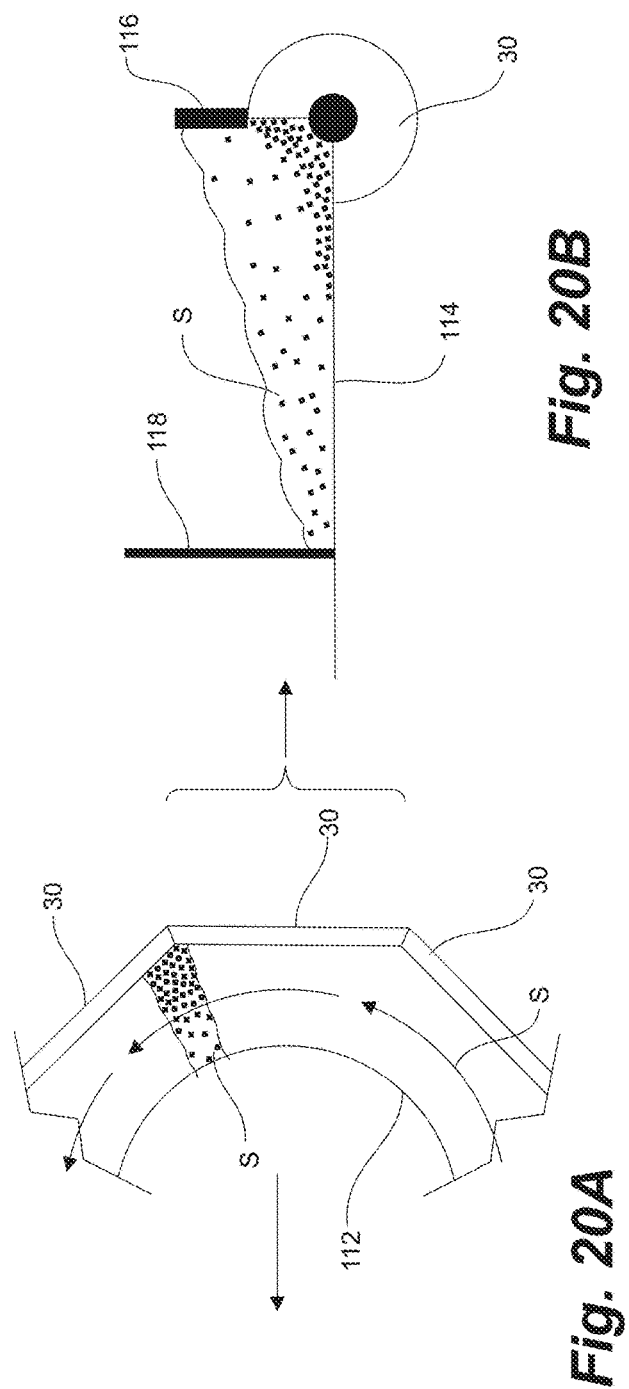
Fig. 20D
Fig. 20B
Fig. 20C
Fig. 20A

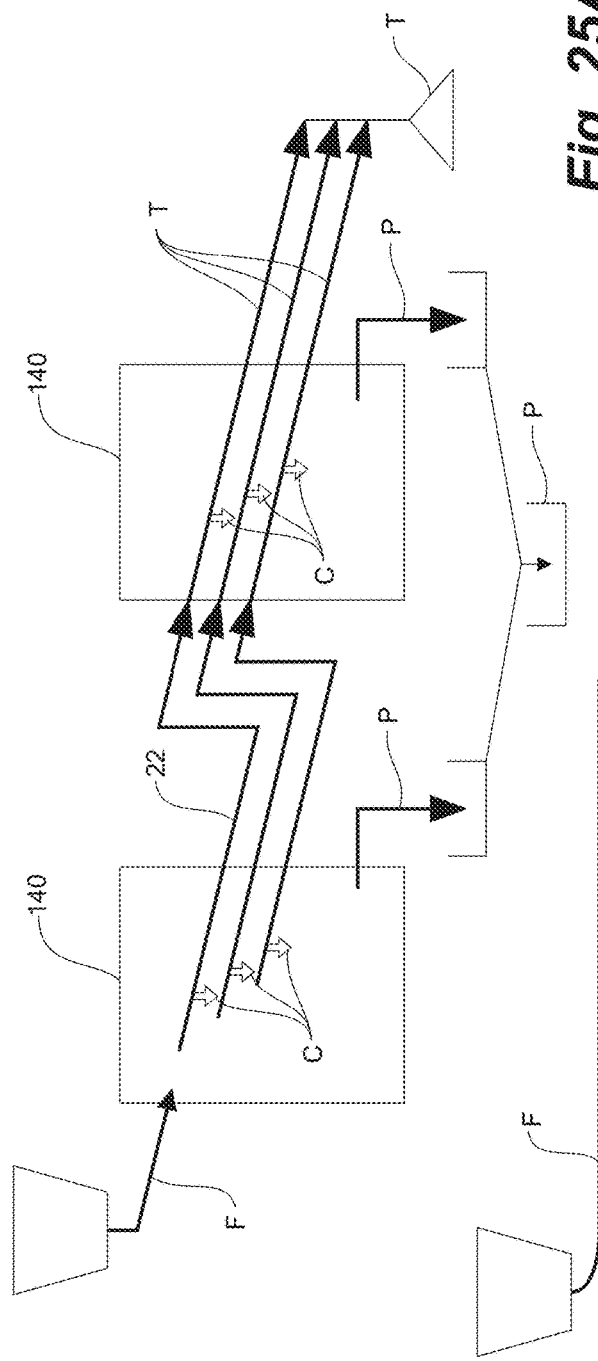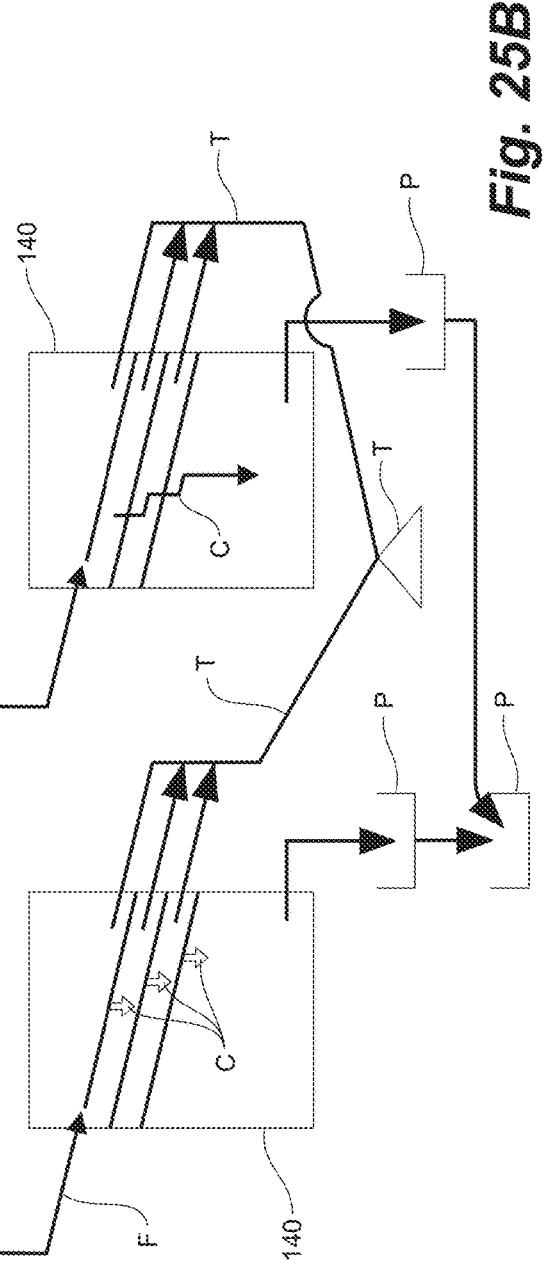

DETECTION AND RECOVERY OF METALS FROM ORE

CROSS REFERENCE TO RELATED APPLICATIONS

This application is a 371 of International Application No. PCT/CA2021/051864, filed Dec. 21, 2021, which claims the benefit of US Provisional Application 63/128,569, filed Dec. 21, 2020, the disclosures of which are incorporated fully herein by reference.

FIELD

Embodiments disclosed herein generally relate generally to apparatus and methods of use for the detection of particles of targeted metals in a stream of ore and, upon detection, a concentrate is removed therefrom for recovery. More particularly, one or more sensors are arranged along a path of the ore stream and upon detection of the particles in an associated portion of the path, a concentrate of the targeted metal and typically a subset of the path's ore stream is removed and a residuum of the remainder of path continues for further processing or tailings. More particularly gravimetric transport, be it dry and/or slurry transport, results in a low energy methodology having a small footprint at a low capital cost.

BACKGROUND

Bulk ores containing high value minerals, in the form of precious metals, such as gold, platinum, silver, are mined and their metals extracted in mineral recovery process. The ore may have its origin in rock deposits within the earth surface, or above ground such as in alluvial deposits in which the precious metals generally present themselves as fully liberated particles, albeit greatly disbursed, from the bulk ore. Often, in the case of refractory hard rock deposits, the bulk ore must be physically processed before detection, such as by crushing or comminution to liberate the metals.

The bulk ore typically passes through a separation process, where the precious metals are separated from the bulk ore to produce a concentrate. Typically, a very small percentage of the ore is metallic, and which is the high value content, which must be efficiently extracted from the bulk flow. The stream of material containing the metallic particles removed from the bulk flow is known as the product stream. The remaining waste material is referred to as tailings. A variety of detection philosophies are currently used in the recovery of metals and minerals. Processes range from simple gravity-based separation, to centrifuges or dense media, and x-ray diffraction.

Applicant, in a predecessor corporation, previously set forth apparatus and methodologies for the detection of native, free, or alluvial conductive metals in ores for the concentration thereof. In US patent application US2019035274A1, published Nov. 21, 2019, a process was disclosed in which an ore-bearing slurry was directed over an electrical conductivity sensor, are used to distinguish metallic from non-metallic particles within the bulk flow. Once detected, these particles and adjacent slurry was removed from the bulk flow, was concentrated, and ultimately directed to the product stream. Detectors were arranged in series, each detector comprising a pair of electrodes that generated a signal that actuated a roller to redirect the metals and a bolus of the sample slurry therein to the collection stream. Further, and of particular advantage in remote locations, management of concentrated product is secured through a semi-automated, end-of-line tamperproof storage for collection by an authorized operator or automated transport to a secured site.

While Applicant's prior experience with the various embodiments of the above teachings results in one form of detection of conductive metals and concentration thereof, several inefficiencies were identified including: detection apparatus, maintenance of the detectors, detector suitability for the particle size and distribution, particle extraction methodology and ore and detector interaction including transport and presentation of the ore stream to the detectors. Regarding transport, the prior slurry management was found to be subject to variations in slurry flow rates, density, particulate sizing, detector loading, and flow regimes.

Further, and with reference to prior art FIG. 1, being an extract of FIG. 1 of application US2019035274A1, the prior system was arranged in an areal array of chutes, the system capacity being increased using corresponding increases in width (parallel treatment trains—two shown) and in length (serial array of detectors) which presents a large footprint, consuming significant real estate with commensurate increases in supporting structure and capital cost.

Further, and shown in FIG. 1 and in FIGS. 2A, 2B and 2C, being extracted from FIGS. 4A, 4B and 4C respectively from prior art application US2019035274A1, a plurality of detector/ejector samplers are provided arranged transverse to a feed slurry of metal-bearing ore flowing in one or more channels. Each sampler is configured as a roller having a recess formed therein for receiving slurry. Detector electrodes are provided for detecting metals contacting the electrodes. As shown in FIG. 2A, the slurry fills the roller recess with a sample. If there is no metal detected in the sampled slurry, the sampler is not actuated, the flow continuing to the next samplers and eventually to waste. In FIG. 2B, if metal is detected, the sampler roller is actuated to rotate, into the direction of the flow, dumping the slurry sample through a slot in the bottom of the channel and to a collection channel therebelow for processing a subsequent stage. In FIG. 2C, a recently dumped sampler roller is rotated, empty, to its initial sampling position and return to the slurry stream. The actuation of the sampler is rapid so that the momentary alignment of the recess and the otherwise sealed bottom of the channel does not result in much loss of un-sampled slurry.

In the prior apparatus, some specific shortcomings were noted. The flow path of particles in a slurry resulted in target particles bypassing the electrodes of the detection zone, either by flowing over the detector roller, or by lying on top of accumulations of aggregate in the detection zone. Attempted dispersing of such areas of particle accumulations was aided with wash streams, however this also resulted in backdraft at the detector roller body, preventing smaller particles from reaching the detection zone. Further, the smaller particles, often associated with the size range of target particles, were prone to stay in suspension, again with less opportunity to contact the electrodes in the detector zone. Electrode material was unreliable despite initial emphasis on conductivity. The areal arrangement of the flow path was found to be cumbersome, particularly if applied in artisanal implementation, both in dimensions, weight and demands on energy.

Applicant has noted there is a need for improvements to the management of the ore stream, liberation of more metals from a greater number of ore types, improved presentation, detection and extraction of the detected particles, and further economic rewards through a reduction in the structure and footprint required per rate of ore processed.

SUMMARY

Generally, a stream of an aggregate of ore is transported along a path having one or more detectors arranged therealong for identification of target particles of commercial minerals, typically alluvial metals. In embodiments, capacity scale-up and recovery efficiencies are managed through parallel and serial processing using like units. The detectors receive particle characteristics and time of capture information. Particle ejection apparatus is arranged along the path in time and space related to the detectors, and receives actuation signals therefrom, for detection and ejection of the target particles. Ejection may be contemporaneous, or shifted in time, from the moment of detection. Ejection is related to detection of the target particles within the stream, and with multiple detectors covering discrete portions or sub-streams of the stream, there is the option to only eject a sub-stream related to the specific detector. In other words, the target particles are selected from the portion of the feed stream substantially upon detection or shortly thereafter. Ejected particles form a concentrated feed stream or concentrate for recovery as a product or as a subsequent feed stream for a further stage or stages of concentration before recovery as the product. That portion of the feed stream that is not ejected as a concentrate continues as a residuum for further phases of detection and ejection, or ultimately as tailings.

Gravimetric and inertial transport systems also segregate a higher density portion of the feed stream which enables optimization of sensor placement along the higher density portion underside of a linear feed stream, or radially outside of the feed stream. Sensors can be further tailored to the mobility characteristics of the feed stream. Mobility characteristics include wet and dry flow such as: slurry, typically for larger particle sizes; and dry flow embodiments suitable for most particle sizes and optimal for smaller particles typical of the prevalence of alluvial metals and to avoid background noise from masking the detection signals.

The transport mechanisms have been expanded to complement the characteristics of the feed stream. Hydromechanical transport is effective for moving aggregate relatively large in size through a mineral processing system and further facilitates density-based separation of materials along the flow path. However, hydro-mechanical entrainment operating parameters are closely linked to particle size and density and introduce contrary conditions for smaller particles, such as those less than about 1 mm in diameter. These ultrafine particles may be entrained in a slurry that is transports at flow rates sufficiently high to move larger particles. Contradictory flow rates result, being sufficiently low to move small particles along the detector electrodes without full entrainment versus being so low that throughput is compromised. Therefore, transport mechanisms such as dry transport are alternative or complementary to the prior hydrodynamic transport systems.

An ore stream may be segregated before and after comminution for optimal transport selection between alternate dry or slurry flows, or used in combination at different stages of the process. The ore stream may be advantageously subjected to beneficiation to optimize the detection and concentration steps including, for example, magnetic separation to minimize gangue before detection, and optimal spectral or optical detection for properties only distinguishable after prior concentration stages.

Feed stream and detector interaction is improved with particles forced to follow a path along the detector. Through mechanisms directed to passing the flow of denser particles, including target materials, along the detectors, non-optimal stagnant accumulations are minimized. Furthermore, multiple contacts of a particle and the detector is improved for increase reliability of detection. The principles of detection and ejection principle benefits from increased assurance of detection. Detector optimization includes reliability, accuracy of manufacture and use of detectors matched to the feed stream characteristics, including alternative material transport mechanisms as well as ejection mechanisms.

In addition, sensors for particle detection, and therein positioning in relation to the ore stream, have been modified to improve the interaction or presentation of particles thereto for improved efficiency of identification, concentration, and recovery. Further, the stream of ore is transported along a path that is compact, including multi-level quarter turn paths or along an arcuate path, such as circular, polygonal, or rectangular, for significant reduction in the areal footprint and the extent and cost of support structure required. The path may be continuous or cascading, the choice of which includes facilitating ejection technology. For example, cascading of the ore stream enables a fluid ejection system for ejecting a portion of the cascading stream corresponding only to the sensor that identified the target particle. For example, two or more sensors, i.e. three sensors, are arranged transversely across the flow path of the ore stream. Three corresponding fluid ejectors can be arranged transversely across an unsupported or unconstrained gravity free fall cascade of the stream for discrete actuation of the fluid ejector corresponding in time and location for removal of a slice or tranche of only one third of the ore stream, that portion of the stream only containing the target particle. In an embodiment, more two or more fluid ejectors may be parallel to one another, resulting in a common receiving concentrate collection structure regardless of which or all of the ejectors are actuated. The cascade typically presents as a thin sheet in a free fall trajectory, however, insofar as there is a thickness, such as at lower transport rates, the target particles tend to migrate or settle to the bottom in transport and thus are on the underside of the cascade. In such instances, where sensors are not already located along a bottom of the transport path, there is advantage in locating non-contact sensors to sense the underside of the cascade.

Use of non-contact sensors and an unobstructed cascade stream for exposure of the particle therein enables use of a conveyor system for particle transport. Non-contact sensors can include multi-frequency excitation sources, typically infrared or visible light, and corresponding capturing sensors, including those receiving spectral reflectance therefrom.

In embodiments, the fluid ejectors can be nozzles connected to a source of high-pressure fluid, such as water or air. The ejector nozzles are actuated in response to an actuation or triggering signal from its corresponding detector, the actuation signal arriving to correspond when the target particle is flowing past the ejector nozzles. The discharge of fluid is directed against that portion of the cascade, in transverse dimension and time, in which the target particle was detected, which in the case of multiple sensors could be a two-dimensional extent of the cascade. The ejected portion of the stream is directed into a concentrate stream for further processing or recovery.

The above improvements, and other embodiment disclosed herein, result in an efficient identification and recovery system which is amenable to small scale artisanal operations and in basic embodiments, can be simply scalable in multiplicative duplication to the level of industrial operations. The efficiencies above result in low energy demand which, in the case of artisanal operations, can be accommodated with portable and renewal energy sources.

In greater detail, ore is processed according to the deposit, or available facilities, for preparing an aggregate of an ore stream. The resulting stream of ore may have a coarse or fine gradation and an ore transport system is applied commensurate therewith. Slurry or dry transport are options and may be chosen depending on the downstream particulate detection equipment employed. In preferred embodiments, using electrical sensors, slurry may be best employed with larger particle sizes where the resolution of electrical detection of target particulates in the slurry is not approaching the electrical properties of the slurry itself. In such embodiment, for coarser ores having ore particles greater than about 1 mm, a hydro-mechanical transport (i.e. slurry) is effective in which the target particulates are less than about 1 mm. For ore streams in which the target particulates are predominately less than 1 mm in diameter, a dry ore stream could be more effective. Dry transport may be associated with mobility assistance provided by vibratory and antistatic control measures such as ionizing devices. Dry transport also be advantageously associated with higher density, or characteristic-specific sensor placement and more efficient ejection of amount-limited or discrete portions of the stream.

The sensors and the efficiency of the identification of target particles has been improved, firstly through improvements in Applicant's prior attempts at implementing electrical conductivity sensors. The presentation of the particles to the sensors is improved through an orientation of the sensor with the flow path of the ore stream. Further, manipulation of the flow dynamics of the ore stream past the sensors can improve detection efficiency, particularly for physical contact sensors. In embodiments disclosed herein, the vector of individual particles and their exposure to sensors is influenced by the flow dynamics of the predominant population of the ore stream. The individual particle detection at sensors is further improved with manipulation of the ore stream, and target particles within, for increased opportunity for sensor engagement, sensor configuration to encourage greater exposure to each sensor and more energy at the interface of contact therewith. Such improvement include, for sensors with extended sensor surfaces, strategic placement of the sensors in the ore stream, substantial co-alignment orientation of the ore stream and at least some of the extended sensors, multiplication of the sensors per unit of flow, and changes to each sensor's flow regime experience to improve the incidence and energy of particle contact which includes variation of the flow of the ore stream, variation in the particle's angle of attack relative to the sensor, and higher energy contact interfaces. For non-contact sensors, such as optical sensors, adjustments of the flow regime better isolate and distinguish the target particles from the gangue.

Further improvements include the ejection apparatus used to recover the target particles upon detection including, embodiments using an active or selective ejection or a passive diversion system. Passive diversion includes a time-delimited diversion of the entire ore stream that includes the target particles. Active diversion includes a system for staged intervention with the ore stream to extract a discrete portion therefrom that includes the target particles. If a cross section of the path is fit with multiple sensors in parallel along the path then it is more efficient to remove a part of the generally parallel flow stream containing the identified target particles, rather than the entire cross-section thereof. The feed stream is deemed to be directed in multiple sub-streams, an independent detector being assigned to each sub-stream. Sub-streams need not be entirely distinct and separate from one another, but three detectors could each represent one third of the stream. Further, sensors having a shorter lineal exposure or detection zone to the ore stream permits ejection of a more measured or precise timed portion of the ore stream.

In the embodiment directed to rotational ejection device of the prior art, the roller is an active diversion which takes the entirely of the cross-section of the ore stream and ejects target particles and the limited gangue portion of the ore stream that is within the ejection device while the remainder of the ore stream continues along the path. Improvements to the rotational device of the prior art include changes to the means for actuation and seals for momentary sealing of the rotational device between the ore stream and the recovery stream during diversions of the target particles and gangue portion of the ore stream.

Passive diversion is characterized by the inclusion of a significant gangue portion, the simplicity of which is balanced with a variety of factors including ore grade and ease of material handling. Active diversion embodiments include using more directed ejection methodologies including introducing an energetic fluid or mechanical intervention to the ore stream, typically transverse thereto, at the moment of detection to eject that portion of the ore stream containing the identified target particle and a localized gangue portion of the ore stream associated therewith, if any, all of which occurs whilst the ore stream continues along the path.

The compact areal footprint and recovery efficiency is conducive to low capital cost and low energy in operation. Scalability is manageable with small changes implemented at a unit level and larger scaleup increases with parallel units.

Applicants has determined, as evolved, that electrical detection is robust but size of the lineal contact area of the detection sensor is also associated with a non-trivial mass of gangue that is co-recovered upon detection. In embodiments, other detection technologies, such as magnetic and optical systems are more appropriate in earlier or in subsequent stages of the process.

In a broad embodiment, a process is provided for selecting particles of commercial metals from an aggregate ore stream comprising: directing a feed stream of flowable aggregate of the ore stream along a path and detecting metals therein at each of one or more sensors arranged along the path. Triggering ejection of a concentrate stream containing the detected metals and a portion of the aggregate associated with the detection thereof, the concentrate stream joining a recovery stream. The balance of the feed stream is a residuum stream.

In a small scale embodiment, two or more stages of sensors and ejection devices are provided, such as two or three stages, along an arcuate transport path, the residuum stream from a first stage being processed in at least a second stage, each stage's concentrate stream combining with the previous stages' to form a recovery stream and the residuum stream forming a tailings stream.

As the commercial metals of interest typically have a greater density than the gangue, they are amenable to some gravimetric separation. In either hydro or dry-transport systems the feed stream undergoes an in-transport gravimetric separation, concentrating the higher-density commercial metals along a bottom layer of the feed stream. The sensors for the detector devices can be advantageously arranged adjacent the bottom layer, either in direct contact with the gravimetrically-concentrated portion of the feed stream, such as in an embodiment along a bottom of the trough, and non-contact sensors directed at the underside of a falling feed stream.

In embodiments, each of multiple corresponding detector and ejection phase can be arranged in series for successive culling of the concentrate from the gangue. Each phase can discharge its concentrate to separate recovery for subsequent combination, or to a common recovery stream.

In a hydro transport, a pump is provided for forming a slurry of the feed stream and the arcuate path of the slurry has a downward slope. In a dry transport, the feed steam is conducted along a vibrating channel to each stage. The ore stream rates and path dimensions can be balanced to produce a generally monolayer ore stream, being predominately a single particle in depth, avoiding complex deep bed segregation phenomenon, and providing certainty of particle and sensor interface. As before, in small scale apparatus, the vibratory transport path can be a space, structure and weight saving arcuate configuration. In vibratory processes, the path may or may not have a traditional downward slope, however the particular transport behavior of the feed stream has a net forward advance to each stage. Vibratory amplitude and oscillation can be chosen from typical linear, elliptical, and circular depending on the path and boundary conditions. Vibratory Dry transport enables implementation of alternate active ejection devices.

In embodiments, the concentrate stream can be directed as a metal-concentrated feed stream to successive detection/ejection stages before formal designation as the recovery stream. Further the residuum stream can form either a metal-depleted feed stream to successive detection/ejection stages or designated as tailings.

In embodiments, the subsequent stages may be like detection and ejection steps of the prior stage or alternate detection and ejection processes more suited for the metal-concentrated stages or following metal-depleted streams.

In one embodiment the flowable feed stream is a slurry of water and aggregate ore. In another embodiment the flowable feed stream is dry aggregate of the ore. In embodiments the dry aggregate is rendered mobile along the path through gravity transport, vibratory transport, or a combination of both.

In embodiments, the particles are commercial metals that are electrically conductive, and one or more of the sensors comprises a conductivity detection zone and a sample ejection zone. Each of the sensors comprises one or more pairs of electrodes, each pair being spaced by a gap. Detection of metals occurs in the detection zone when metals straddle the electrode gap at one or more locations along an active length of an electrode. Straddling the gap results in an electrical response, and in some instances an electrical short circuit. Measurement of the properties of the electrical circuit is measurable distinguishable signal for triggering ejection of the related stream containing the particle or particles. The ejected metal-bearing stream is the volume of the ore stream associated with the type of ejector and the extent of the detection zone, including the entirely of the discrete ore stream along the specific electrode.

In additional embodiments, each sensor has a detection zone in which the metal-bearing stream resides, the ejection thereof including all of the ore stream within the detection zone. In embodiment, the detection zone comprises the entire area within the wide and length of the path along the sensor. Multiple sensors in parallel enables multiple sensor detection zones across the width of the plan and more specific ejection of the detected particle. The feed stream can be deemed divided into multiple sub-streams, each sub-stream of the feed stream being was exposed to a different sensor. The feed stream or each sub-stream is directed along a path which is in-line with at least a first elongate detection zone, the elongate portion align in-line with the path for enhanced opportunity of detection therealong. Further opportunity of detection is provided by directing the higher gravity portion of the feed stream to travel along at least a first electrical detector along the path and along subsequent detectors arranged downstream as needed for recovery efficiency above a design threshold.

As initially introduced in Applicants predecessor patent application, a combined rotary, or roller detector/ejector actuated from a sampling position to a dump position to dump a stream of slurry present within the detector into the collection stream or concentrate.

In embodiments, after a first phase of detection and ejection, the residuum stream of flowable aggregate is directed to at least a second phase for successive recovery of residual metals in the feed stream missed by the prior phase before discharge as tailings, or as feed stream to a further apparatus for refinement and capture of less concentrated metals.

In embodiments, the process is operated in a batch mode, with the slurry being circulated in a closed loop, circular stage, and repeated flows along a finite number of detection/ejection phases until a target recovery threshold has been met, namely until the number of detections falls below a threshold. Alternatively, the batch can be directed from apparatus to apparatus.

In embodiments, the arcuate path is generally circular about a vertical axis and in continuous processes can be generally helical, inclined and descending. As above, the arcuate path in a batch mode, can be generally horizontal and recirculatory. The arcuate path is an open channel and the flow streams are constrained between inner/inside and outer/outside slurry-retaining portions of the arcuate path. While the arcuate path stimulates hydrodynamic separation, the process may also employ stratifying the density of the slurry by centripetal force about the arcuate path and strategically locating the detectors, or the sensors within the detector along the path having a greater concentration of metal particles. Detectors are located within the flow path for optimizing the higher-density target particles in the detector zone, either by manipulation of the flow path to best interact with the detector zone or vice versa.

In other embodiments, in a hydrodynamic process in which the feed stream is a slurry, the feed stream can be decanted so that a gravity segregated, low-density portion of the feed stream is removed, most effectively at a first stage of handling the feed stream. Commensurate with the stacked stages, the subsequent ejected concentrate stream is received in a subsequent stage positioned below the first stage, receiving the concentrate from each triggered detector in the stage above. Thus, one can configure the received stream as a subsequent feed stream, yet concentrated; each subsequent feed stream arranged above a subsequent collection stream, forming a plurality of sequential stages of detection, triggered discharge and increasingly concentrated recovery of conductive metals.

More likely implemented in industrial applications, beneficiation of the aggregate can remove a bulk of the mined ore before processing in the embodiments disclosed herein. Depending on the particles of interest, magnetic separation or gravity separation can be employed. In more substantial embodiments, using more flow streams, and energy movers, in unit decanting, recycling can also maximize detector utilization.

Flow paths can be managed to direct the feed stream along a path to present the target particles to the detectors, such as concentrating a high-density portion of the particulates in the feed slurry along the sensors of the detectors. In embodiments, flow path is a closed loop, repeatedly passing the feed stream along the same detectors with an ever-diminishing load of target particles until a target detection and recovery has been met, namely until the number of detections fall below a threshold. A depleted batch can be discharged to tailings, whilst the concentrate can be directed as subsequent stage batches from apparatus to apparatus, or to alternate series processes.

In embodiments of the invention, apparatus is provided which results in a flow of aggregate ore containing target meal particles vertically stacked stages of one or more detectors, the feed stream flowing in a generally polygonal or circular path flow path along each stage. The metal-enriched concentrate ejected form one stage is directed as feed to a next stage. In embodiment, each stage is a horizontal, circular flow path about an axis. For horizontal transport, a slurry is readily managed. The slurry is processed in a batch at each stage to enable maximum detection and extraction from the circulating slurry. In another embodiment, each stage conducts the feed stream along a generally circular path, but that path is also inclined in an helix. Either slurry or dry feed streams can be employed in a gravimetric transport. As the helical path has a start and an end, once the feed stream has traversed the flow path, the slurry may be recirculated back up to the start if recovery efficiency is below a design threshold of directed to a second separator apparatus for further processing, or simply directed to tailings if recovery efficiency is at or above the recovery threshold.

Hydrodynamic transport, such as a slurry, has advantages for larger aggregate, amenable to segregation in the feed stream. Slurry can be directed along an arcuate flow path for imparting both a hydrodynamic separation and a gravity separation of high-density particulates from lower-density particulates, the high-density portion being preferentially directed to pass over the electrical detectors. Beneficiation can be achieved along the feed stream by decanting the slurry from the feed stream, and provide some economy as recycling the decanted fluids as makeup water. Detection of target metals in the higher density portion of the feed stream triggers discharge of the target particles and a portion the slurry associated with the detection for collection as a concentrate or a next stage of detection and further concentration. Concentration of precious metals can be arranged in vertical stages of arcuate paths for minimizing the footprint of the process apparatus.

Vibratory transport provides for alternate detection and ejection detection and has advantages for improved detection resolution in smaller aggregate. Dry aggregated flow and slurry are both amenable to multilevel conveyor phases, for flow of the feed stream along a channel fit with detectors to discharge therefrom in a cascade flow to a next phase of detectors and so on. A free flow of aggregate from that phase, in a cascade, enables high pressure fluid extraction or interference diversion of all of the cascade, or merely a portion of cascade specifically associated with a positive detection of a target particle or particles. Multiple parallel detectors along the conveyor enables capture of the detected target particles with only a partial inclusion of the gangue materials associated only with that detector. Multiple phases also permits use of detectors more appropriate to the characteristic of the ore, including greater presentation of color or reflectance as the concentration increases.

The apparatus described above utilizes a small footprint with the associated capital cost savings. The apparatus is ideal for small operations, such as artisanal operations which benefit from a low capital cost, a small footprint and can be operated off the utility grid. Sensors and control of the actuation of the detectors and dump valves can be powered by solar or other onsite power generation, and ejection actuation can be through onsite pneumatics. In hydrodynamic transport, pumps are low output and dry transport using vibrators only require rudimentary devices, all of which can be pneumatic or low energy electrical supplies.

BRIEF DESCRIPTION OF THE DRAWINGS

FIG. 3C is a flow chart illustrating optional solar and pneumatic power sources and pneumatic actuators illustrated in FIGS. 3A and 3B and including pneumatic and vibratory actuator embodiments such as used in vibratory transport options;

FIGS. 6A and 6B are schematic end and side cross-sectional views of a roller having an in-line flow embodiment and illustrating the ejected volume of particle and gangue material, the volume related to the width of the path and the discrete in-line segment captured in the ejector at the time of detection;

FIG. 6C illustrates the volume of the ore stream ejected as concentrate;

FIGS. 6D and 6E are schematic end and side cross-sectional views of a roller having a transverse flow embodiment and illustrating the ejected volume of particle and gangue material, the volume related to the width of the path and the discrete angular segment captured in the ejector at the time of detection;

FIG. 6F illustrates the volume of the ore stream ejected as concentrate;

FIG. 7A illustrates a chute-type flow path of an ore stream, the bottom of which is fit with a plurality of parallel detectors for multiple detection zones, and in which a target particle having been detected on only one detector, the control circuit activation of only one of a plurality of ejectors for minimizing gangue in the recovered concentrate;

FIG. 7B illustrates the time-shifted ejection of the ejector of FIG. 7A, in which the velocity of the particle in the ore stream determines the timing of the commencement of ejection and the length of the sensor determines the duration of the ejection;

FIG. 8 is a schematic perspective view of a trough and cascade type presentation of the ore stream for detection of target particles and ejection thereof;

FIGS. 11A to 11D are charts illustrating the detection efficiency for different feed concentrations measured in Example 1, for a linear detector element having a perpendicular flow presentation of the prior art according to test apparatus FIG. 9A and a linear detector element having an in-line flow presentation according to test apparatus FIG. 9B;

FIG. 20A is a plan view of an arcuate segment of a stage, illustrating the feed stream flowing in an arcuate path along a polygonal arrangement of serial roller-type detector/ejectors, heavier particles concentrating along the detectors;

FIGS. 20B and 20C illustrate radial cross-sections of the path of FIG. 20A, illustrating an outwardly and downwardly sloped bottom channel, a revolution of which forms a circular, conical washer, the particles segregating into the flow stream radially outwardly;

FIG. 20D illustrates radial cross-sections of the path of FIG. 20A, illustrating a flow channel operated with hydrodynamic and centripetal forces to urge particles radially outwardly;

FIG. 25A is schematic flow chart illustrating multiple units, such as those of FIGS. 24A and 24B. arranged in series for increased recovery from a feed stream;

FIG. 25B is schematic flow chart illustrating multiple units, such as those of FIGS. 24A and 24B, arranged in parallel for increased throughout from multiple feed streams, the series and parallel arrangement being optionally combined for increased throughout and recovery;

DESCRIPTION

Generally, apparatus and processes are provided for gravimetric transport of an ore aggregate is directed as a feed stream along a path having one or more detectors arranged therealong for identification of target particles of commercial minerals, typically alluvial metals. The detectors implement sensors for determining at least particle characteristics distinguishing the target particles from gangue. Actuation signals are generated for ejection of the target particle and a gangue associated therewith. Ejection apparatus is arranged along the same path in time and space related to the detectors, and receives the actuation signals for timely ejection of the target particles. Ejection may be contemporaneous or shifted in time from the detection. Ejection is related to detection within the stream, and multiple sensors enable more specific detection within discrete portions of the stream and subsequent ejection of only subset of the stream with the target particles.

Ejected particles form a concentrated for recovery as a product or as a feed stream for a further stage or stages of concentration before recovery as the product. Gravimetric transport systems provide a downward transport separation which enables optimization of sensor placement along the underside of the ore stream, and sensors can further tailored to the mobility characteristics of the feed stream. Mobility characteristics includes wet and dry flow including: slurry, typically for larger particle sizes; and dry flow embodiments for most particle sizes but is optimal for smaller particles.

Figure 3A:
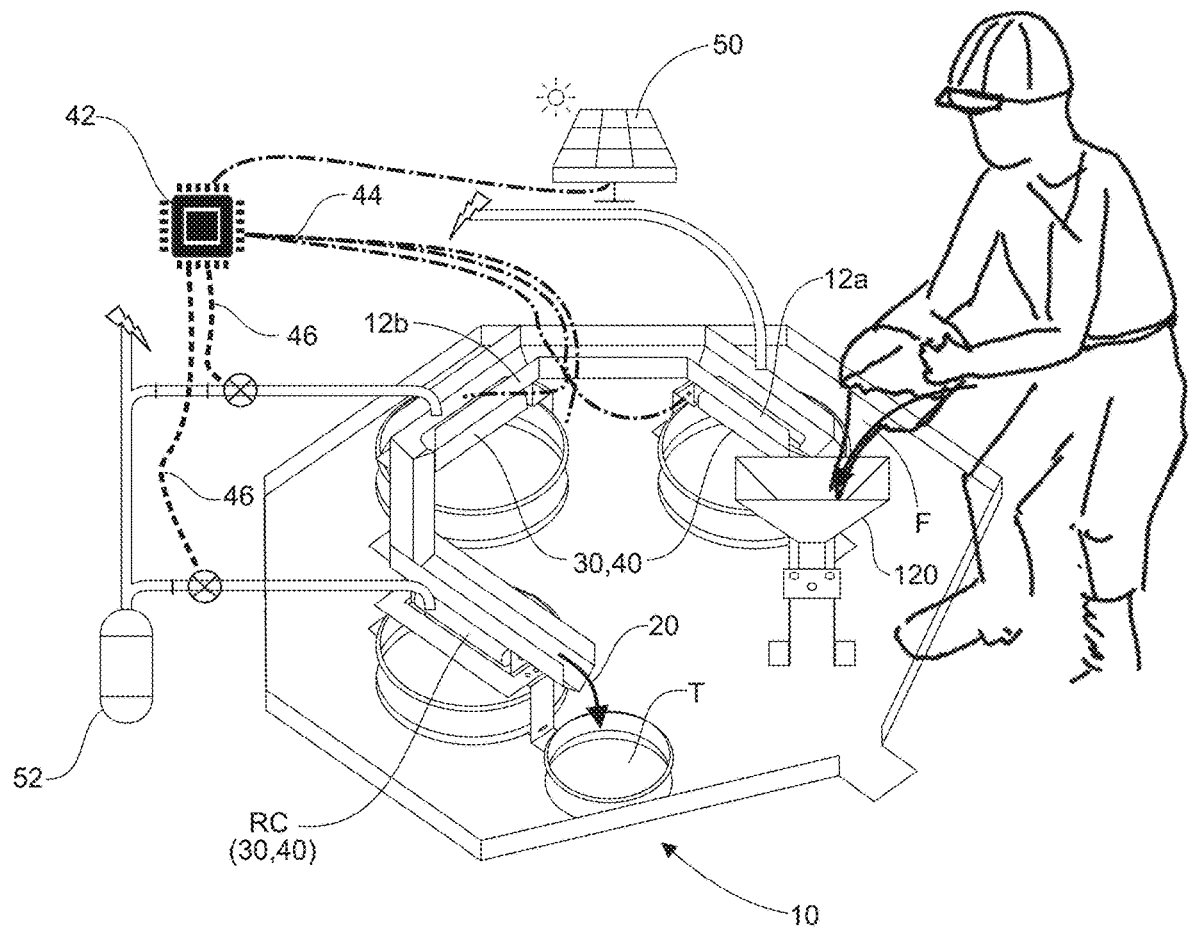
FIG. 3A is a perspective view of one embodiment of a test unit receiving a slurry feed stream of aggregate containing gold, the arrangement of which is an example of Applicant's prototype artisanal extraction unit with solar and pneumatic energy sources.
Figure 3B:
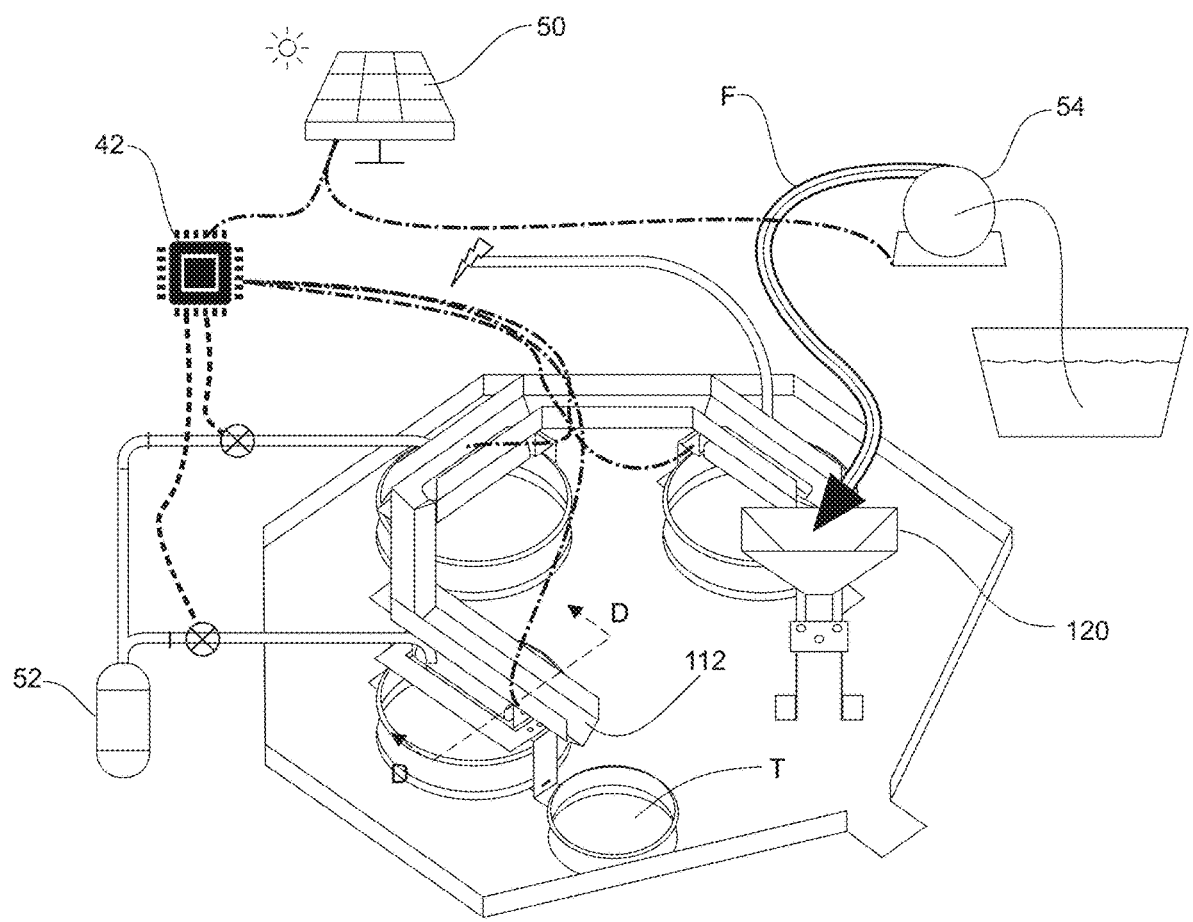
FIG. 3B is a further embodiment according to FIG. 3A in which the feed stream is provided by a pump, powered by solar energy.
Figure 3D:
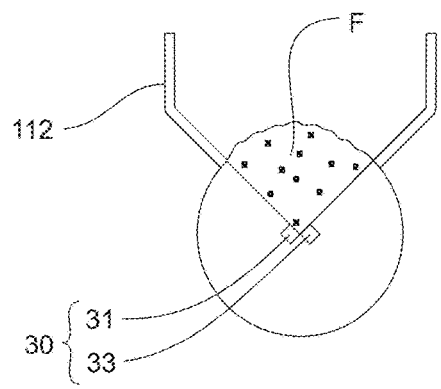
FIG. 3D is a cross-section of a detector and a channel according to section D-D of FIG. 3B.
Figure 3C:
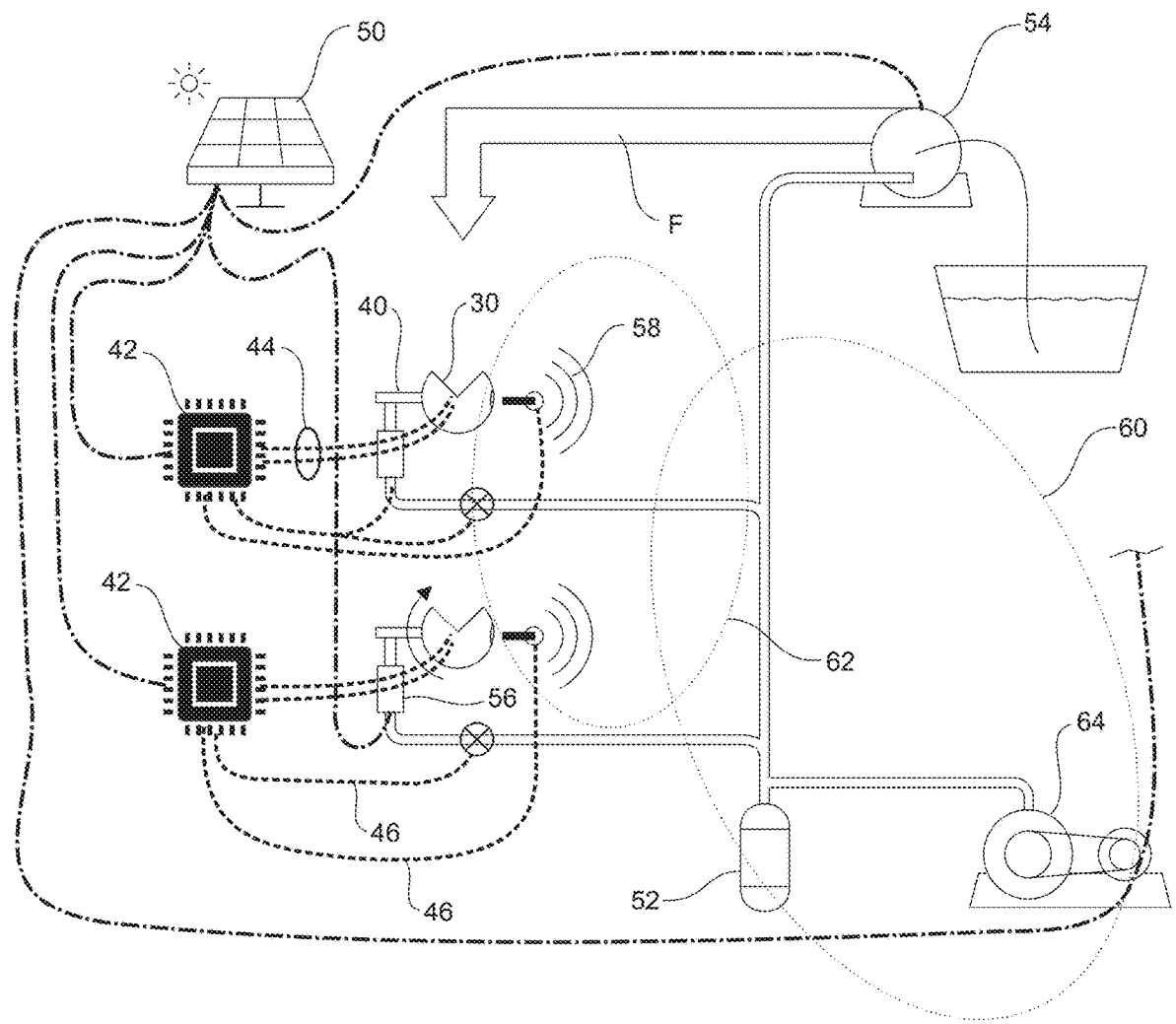

With reference to FIGS. 3A through 3C, one simple embodiment of a metals extraction apparatus 10 is illustrated with three phases 12a,12b,12c of detection/ejection are arranged in a serial arrangement forming a single stage 14a. In a stage, a feed stream F of aggregate containing metals is introduced, directed in a path along the three phases of detection/ejection, and the residuum 20 is directed to tailings T. The feed stream is directed to the first detection zone of the first phase 12a first detector 30. The residuum of the first detector 20 is directed to the subsequent detector zone of the subsequent detector 30 of the subsequent phase 12b, and so on.

The illustrated apparatus 10 is also a test unit used for receiving a feed stream F of a slurry aggregate containing gold particles M. Each phase 12a,2b,12c comprises a detector 30 and an ejector 40, seen more clearly in FIG. 3C. Each detector 30 is connected to a controller 42 for receipt of sensor signals 44 and sending actuation signals or triggering signal 46 to the ejectors. In embodiments, as shown in FIG. 3C, each detector may have its own controller 42,42 . . . . In testing, using three detection/ejection phases 12a,12b,12c, recovery efficiency of 99.2% was achieved for 3 mm cube particles and 2 mm particles, meaning only 0.8% on average of the 3 mm and 2 mm particles in the residuum ended up on tailings. A recovery efficiency of 90.0% was achieved 0.8 mm cube particles, and a recovery efficiency of 57.0% achieved for 0.5 mm cube particles. Further, recovery efficiency of 79.8% as achieved for 0.5 mm thick, flat irregular flakes. As part of the gangue is ejects as well, the concentration level from Feed to concentrate was 16-20 times.

While power utilities may sometime be available, off-the-grid operations can be powered by solar, or a combination of solar and pneumatic. In this embodiment, the detectors and controllers are powered by solar power 50 and the actuation of the ejectors can be pneumatic energized by a pneumatic accumulator 52. Such offline power and actuation methodology is advantageous is artisanal extraction units which operating remote locations without access to utilities.

Turning to FIGS. 3B and 3C, further embodiments illustrate the feed stream F provided by a pump 54, the pump being powered by pneumatics or, as illustrated, from solar power 50. FIG. 3C shows ejector actuators 56 for ejectors 40 powered by solar 50, or optionally by a pneumatic system 60. Transport of the feed stream F can be optionally provided by vibratory systems 62. Pneumatics, such as the accumulator 52, can be recharged using manual pumps or electrically powered air compressors 64, again powered by solar 50 when remote from utilities.

Figures 2A, 2B, 2C:
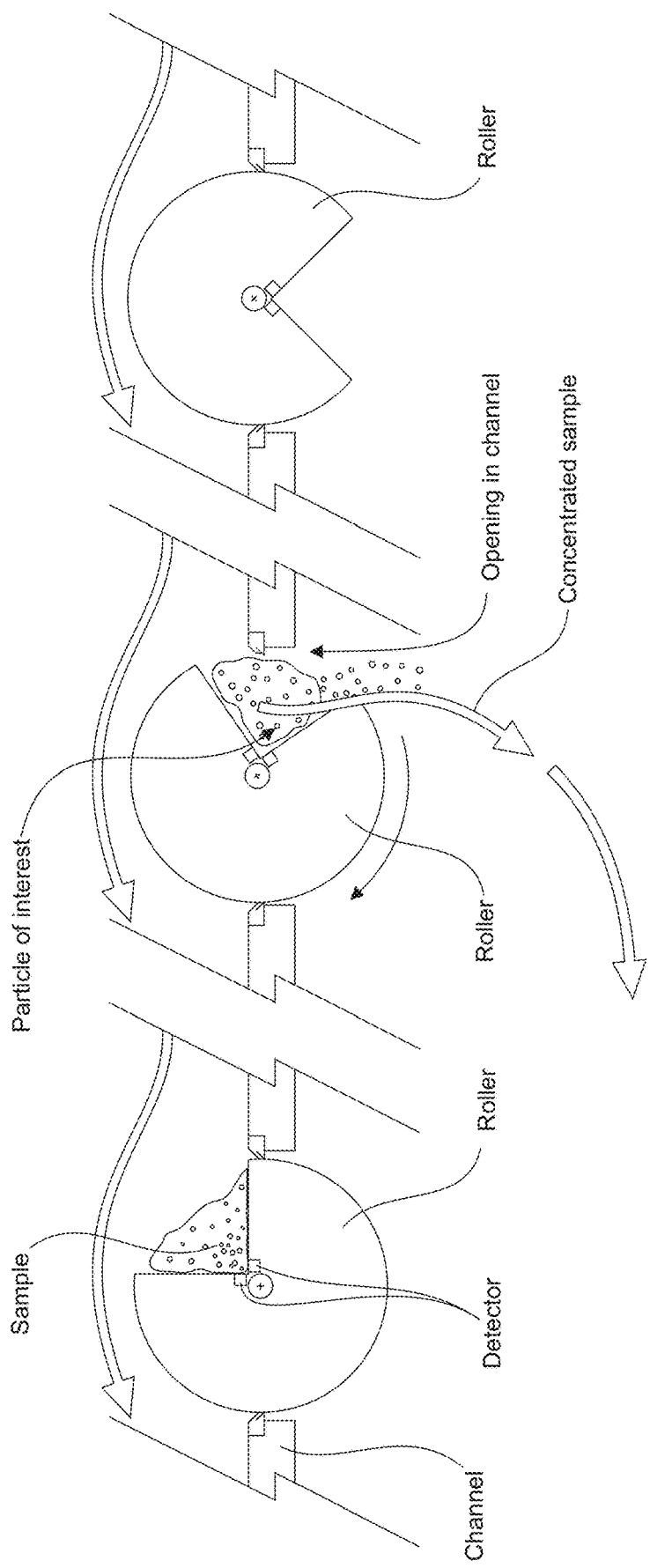
FIGS. 2A, 2B and 3C are partial cross-sections of Applicant's prior art arrangement of successive combined roller detector and ejectors.
Figure 4A:
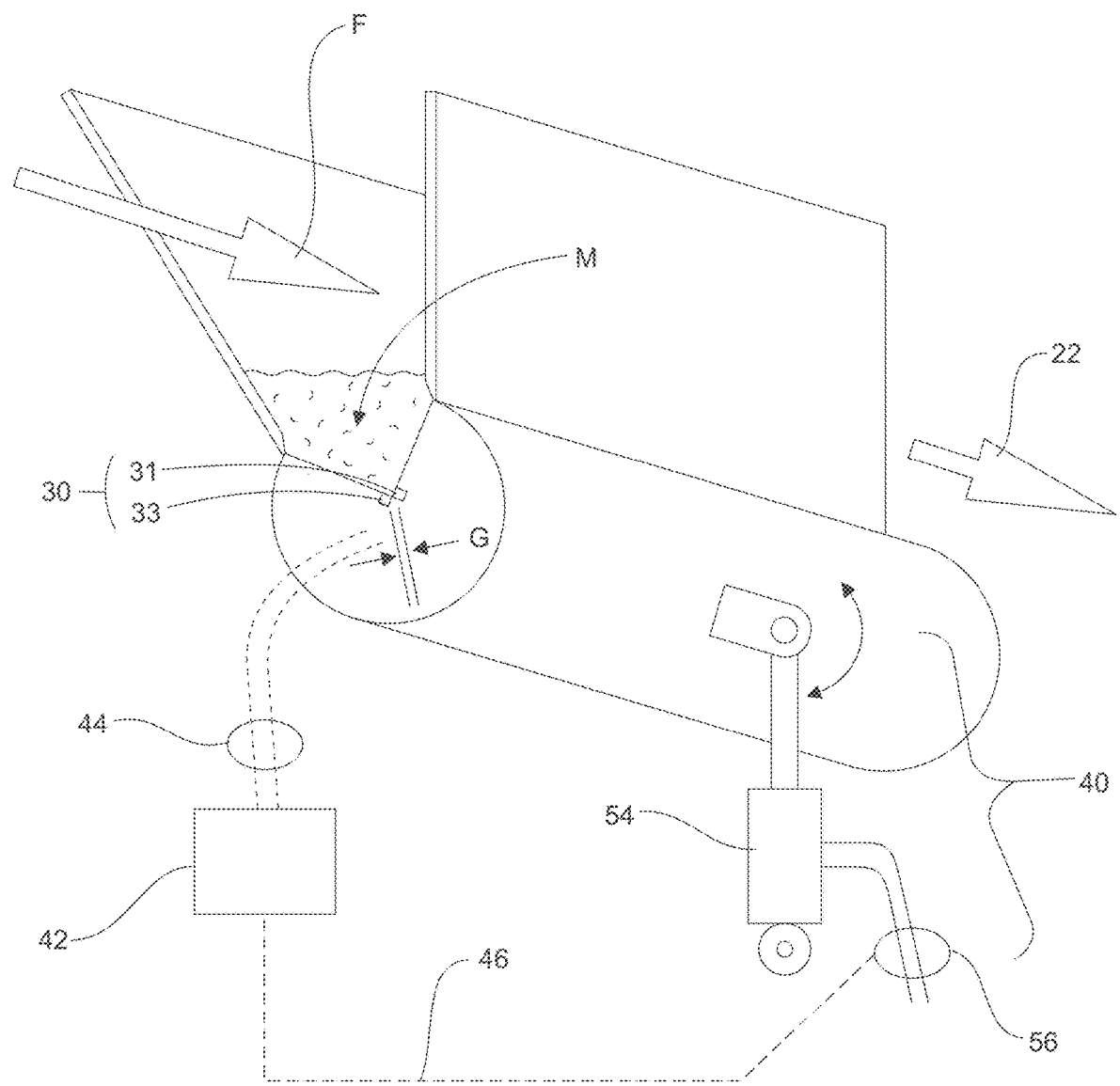
FIG. 4A is an embodiment of an improved roller detector/ejector and the control circuit therefor.

With reference to FIG. 4A, generally, a combined detector/ejector 30,40 is provided. With reference also back to the structure of FIG. 2A of the prior art roller-type detector/ejector, the detector 30 comprises one or more pairs of electrodes 31,33 as sensors, each pair being spaced by a gap G equal to or smaller than the effective diameter of expected conductive particles M in the feed stream F. As described below, in-line alignment of the feed stream and detector provide improvement in recoveries of product P over the prior art. The illustrated detector 30 is a roller that also acts as an ejector 40 that can be rotationally actuated by actuator 56.

Figure 18A:
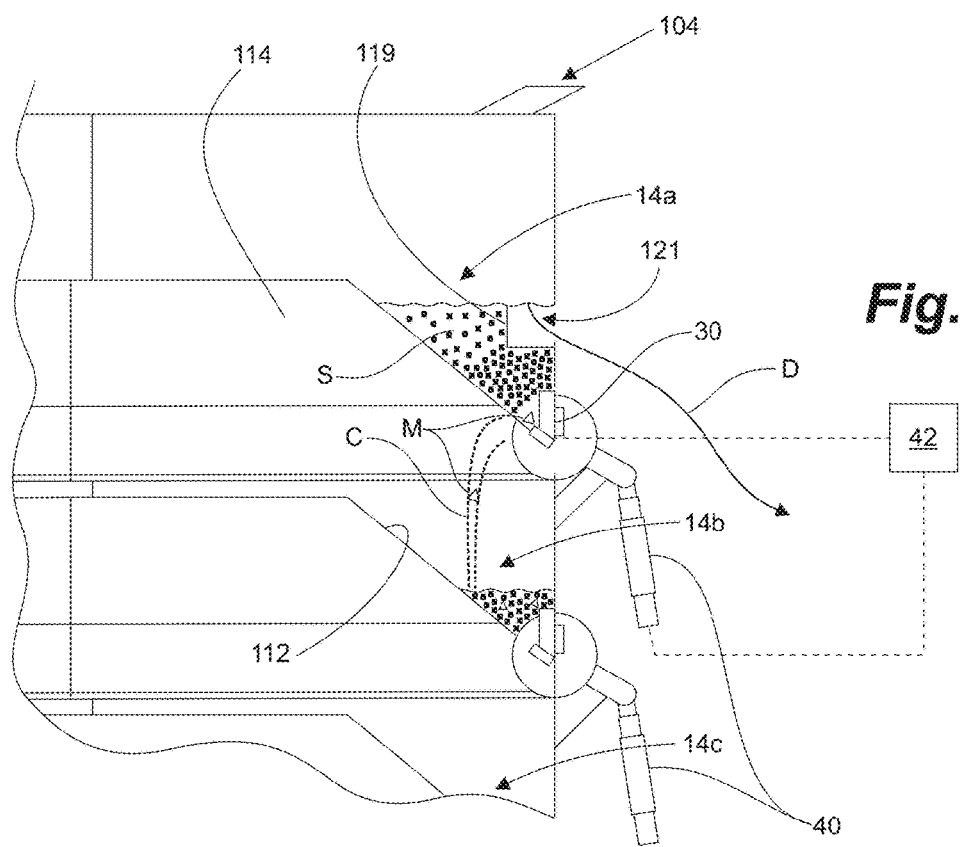
FIG. 18A is a partial sectional side view of the first, top stage of the unit of FIG. 17C illustrating the sloped channel and peripheral roller unit, the top stage having a slurry decanting outlet.
Figure 18B:
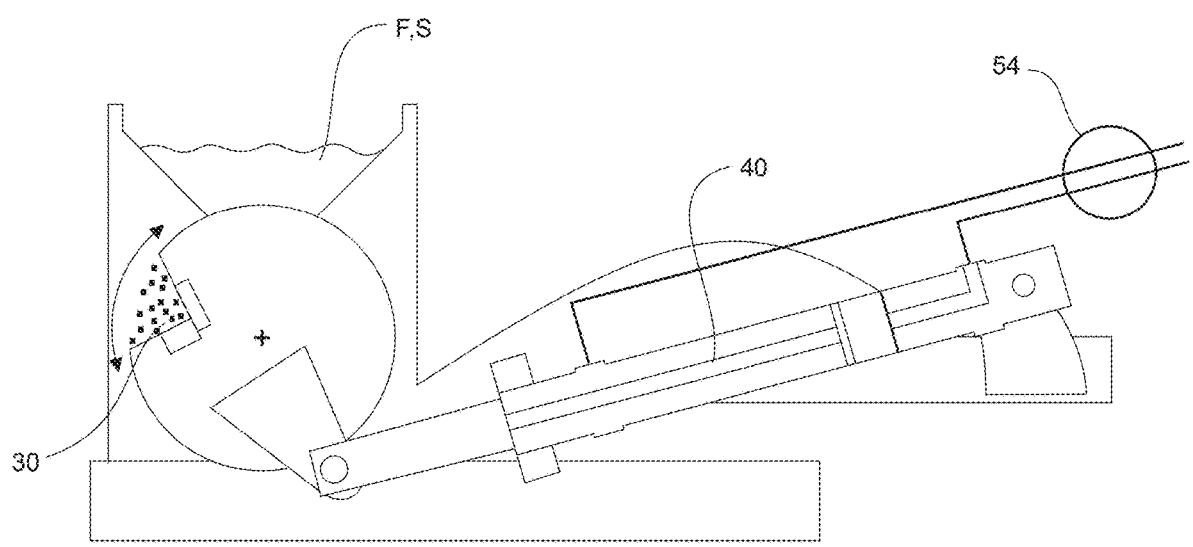
FIG. 18B is a cross-sectional end view of a rotary detector/ejector and a pneumatic actuator for rotational ejection of a chorded section of the feed stream.
Figure 19:
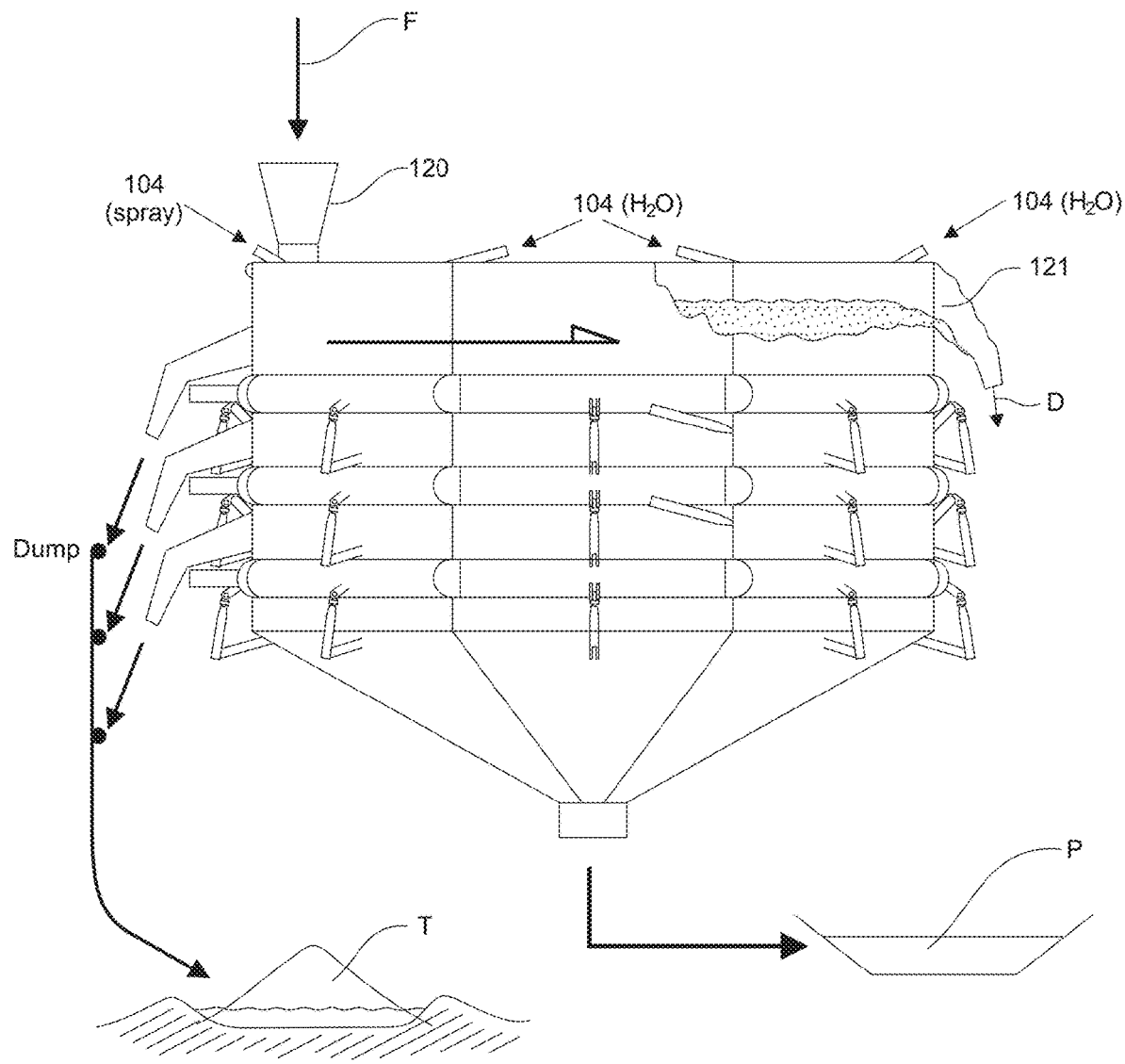
FIG. 19 is a side view of unit of FIG. 17C with various flow streams illustrated thereon, including the feed stream, an initial decant, concentrate dump streams and tailings.

Rotational ejectors 40, can be devices according to Applicant's prior design, being actuated rotationally with a stepper motor along the detector axis, or as shown in various figures, or in FIG. 18B, using a lever device and valve controls, using a linear actuator and an arm. The linear actuator can be selected according to the utilities provided. In remote locations where both electrical sources are absent or expensive, and technical expertise is at a premium or not available at all, embodiments using the stepper motor are less attractive. Accordingly, one might turn to the embodiments of FIG. 19B, using linear actuators actuated by pneumatics, hydraulics, or simple electrical solenoids.

The electrodes 31,33 reside in a recess in the detector, for improving the opportunity and probability of exposure to the target metal particles M, and extend along at least a portion of the detector. Note that "L" oriented electrode recess orientation in a detector 30, an example of which is shown in FIG. 20B, can be optionally oriented, as shown in FIGS. 4A and 6A, to form a "V"-shaped channel, which places the typical placement of the electrodes 31,33 at the bottom apex which also forms the bottom of the channel 112. Gravity segregation of the higher density portion of the particles, including the target particles M, concentrates the higher density portion along the bottom of the feed stream F and thus provides greater incidence of target particles M upon electrodes 31,33 in the bottom of the detector 30. Similarly, with arcuate flows, subject to tangential forces, segregation of the higher density portion of the particles, including the target particles M, concentrates the higher density portion radially outward and along the bottom of the feed stream, in which an "L" oriented channel or in which the apex is slightly inclined downward.

Upon detection of a metal particle M, or particles M,M . . . , contacting across the electrode gap G, the detector/ejector 30,40 is actuated from a sampling position to an ejection position to direct the target particle M and a portion of the feed stream present within the detector out of the feed stream and into a concentrate C collection stream (not shown here).

With reference to FIG. 4B, and FIGS. 7A to 7D and FIG. 8, the detector 30 and ejector 40 can be separate devices. As shown, the feed stream F, whether slurry or dry transport, can alternatively be directed along a series of multilevel stacked conveyors 80,80,80 for transport of the aggregate in the feed stream F from phase to phase. The feed stream cascades from conveyor to convey providing an ejection opportunity using an ejector 40 coordinated with the detection of the metal particles M. As discussed in later embodiments as shown in FIGS. 26 through 30, in the context of dry transport embodiments, the ejector can be a high pressure fluid jet ejector 40J. The conveyor may be a channel or chute, such as that suitable to contain slurries or dry flows, including a corrugated plate forming two or more troughs, dividing the feed stream into multiple sub-streams and, depending on the stream depth, naturally constraining the sub-streams therealong, and as a natural constraint of that sub-stream portion of the feed stream to a specific detection zone of multiple parallel detectors 30,30 . . . .

Transport is usually a gravity transport encouraged by a downward incline. In the case of a dry feed stream the direction and flow rate can be induced by gravity, controlled using vibratory actuators, or both as discussed in more detail below. Inclined feed streams, arranged in a multilevel arrangement with cascades therebetween are a departure from the contemporaneous detection/ejection of the roller type of detectors. Further, other types of ejection, spaced downstream from the coupled detection can be employed such as triggered mechanical interference.

Figure 5A:
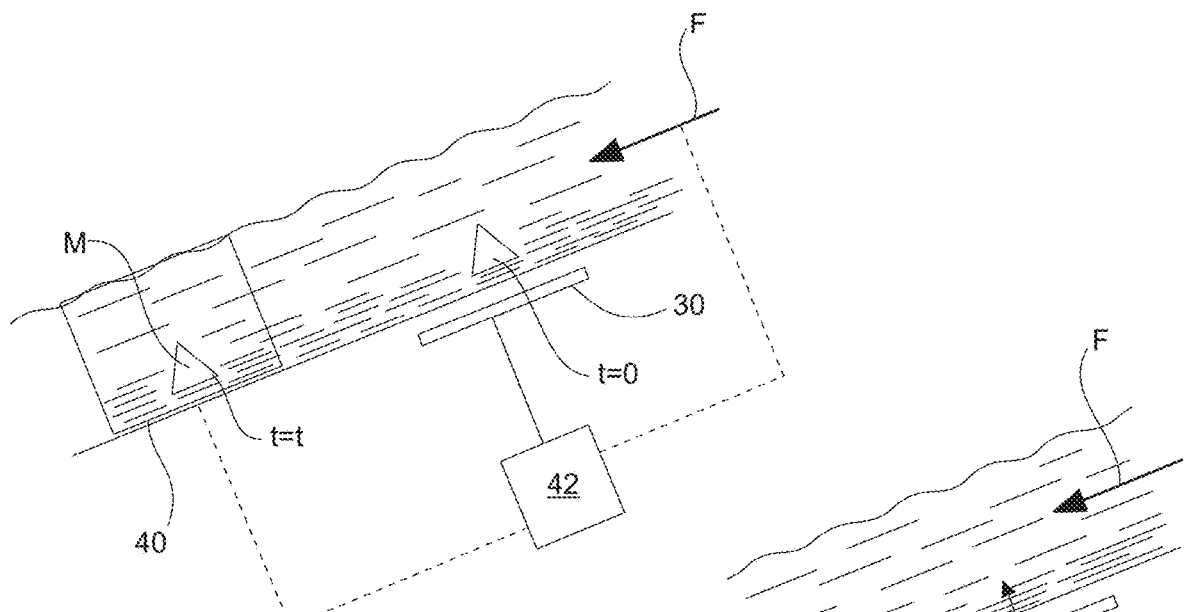
FIGS. 5A and 5B illustrate schematic side and plan views of embodiments of a particle detection with timed downstream ejection and contemporaneous detection and ejection respectively.
Figure 5C:
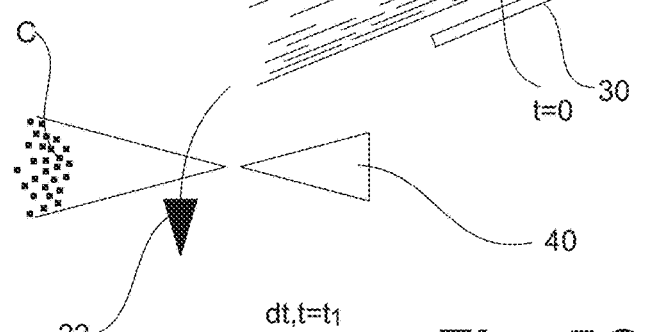
FIG. 5C is schematic side view of alternate methodology for particle detection with timed downstream ejection from a cascade of the particle-containing stream
Figure 5B:
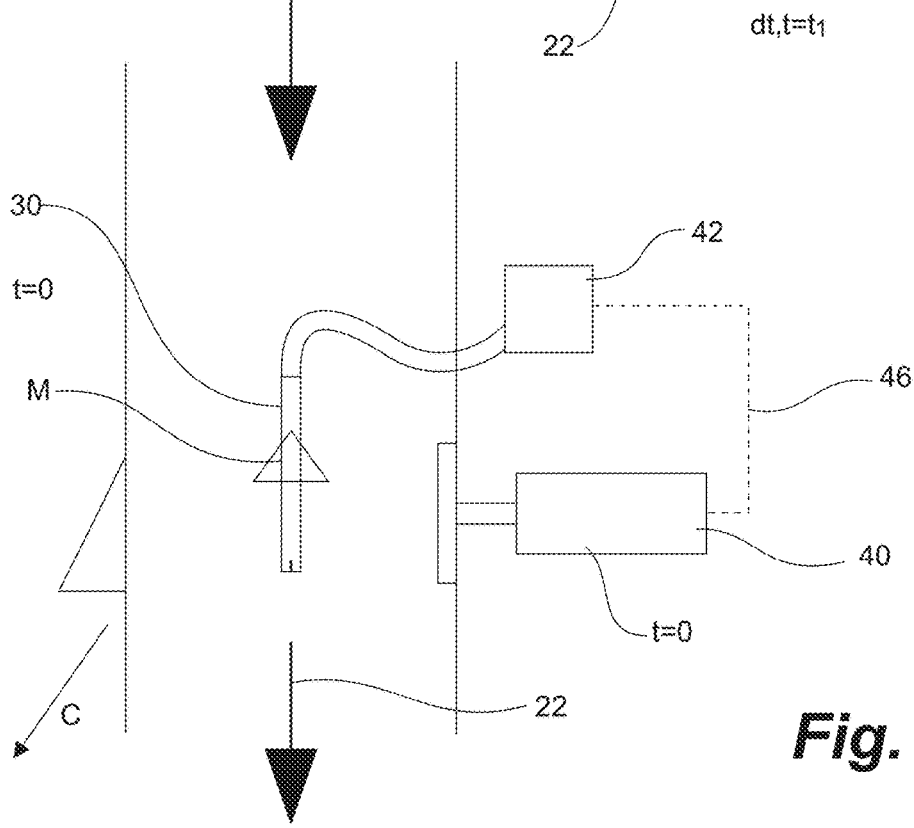

With reference to FIGS. 5A to 5C, the spacing of the detector 30 and ejector 40 introduces some options for increased flexibility in ejection technologies, and reducing the amount of gangue included with the concentrate C. In FIG. 5A, the basic relationship of a detector 30 and an ejector 40 spaced downstream thereof comprises detection at some triggering time t=0. The triggering signal is generated by the controller 42, and ejection then occurs at some later time t=t1, and for a duration dt as determined by the controller 42 using parameters such as average velocity of the feed stream F, the length of the detector, the time needed for the tranche of feed to travel the distance between the detector 30 and ejector 40 and the length or duration (td) the feed stream needs to be ejected to capture the detected target particles M in the concentrate. For a mechanical-type diversion, such as a pusher or paddle, the length of the feed stream to be diverted is generally fixed and duration is not a factor. For a cascade type ejection (FIG. 5C) or passive wholesteam diversion (FIG. 5B), the duration of ejection or diversion is a factor.

Turning to FIGS. 6A through 6E, the roller-type apparatus provides a simplistic and convenient example of the nature of the concentrate ejected upon contemporaneous detection/ejection of a target particle M. Both of the in-line detector arrangement of FIGS. 6A, 66,6C and prior perpendicular arrangement (FIGS. 6D and 6E) are shown. The roller type of detectors 30 enable momentary displacement of the electrical detector corresponding to the triggering signal for ejecting the feed stream contained in the detection zone.

With reference to FIG. 6C, the portion of the in-line feed stream that is ejected upon ejection. The feed stream present in the detector has a cross-section X, based on the depth of the feed stream F in the detector, the detector zone sector dimensions and the length of the detector l "ell". The ejected concentrate is the volume in the detector of the target particle and gangue therein, being X*l=V as shown in FIG. 6C. The relevant detection zone is an elongated detector zone Z represented by entire length l of the electrodes along the in-line length of the detector 30. Shorter electrodes 31,33 and detector 30 overall result in less gangue ejected, but provide less opportunity for detection of a target particle that is not immediately available at a material/detector interface.

With reference to FIGS. 6D and 6E, in the transverse roller ejector 40 apparatus of the prior art, a similar sector X has a transverse width l for a like volume V. while the volume of the feed stream F ejected is the same as the in-line arrangement above, the relevant detection zone Z is not elongated, but is short, represented by the brief moment the target particle was captured in the cross-section X. The perpendicular arrangement provides transverse coverage of the width of the feed stream, but provides limited opportunity for a target particle to be noted as it flow past the relatively narrow gap G of the electrode pair. Arrangements of electrode pairs as the detector 30, at a non-cartesian angle to the feed stream, could provide compromise to the advantages of either perpendicular or in-line, but are technically more challenging except perhaps in the case of flat-bottomed feed stream channels. Multiple detectors 30,30 . . . distributed across the feed stream, effectively creating multiple feed sub-streams, provides both the side to side resolution of the perpendicular detector but the detection opportunities of the elongated detection zone of the in-line detector.

Figure 7C:
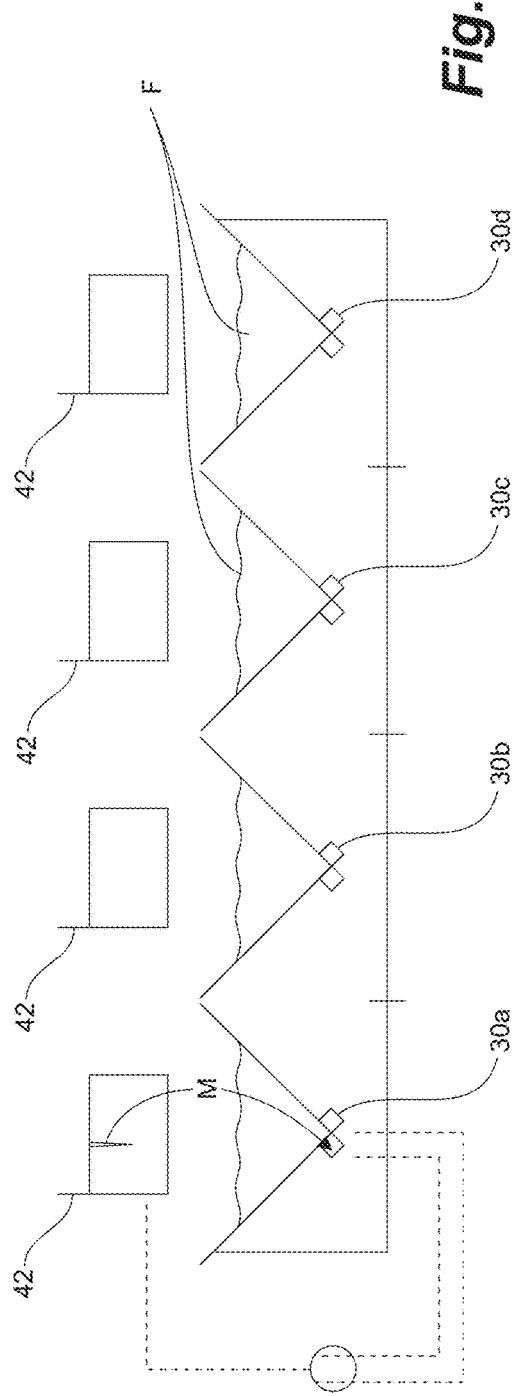
FIGS. 7C and 7D are end cross sectional views of multi-sensor detectors, namely a four-trough sensor detector with two particles present for subsequent ejection, and a three sensor roller detector/ejector embodiment with two particles present, respectively

With reference to FIGS. 7A and 7B, the use of multiple in-line detection zones of detectors 30 increases the resolution of detection across the feed stream, enabling specific detection within a portion of the width of the feed stream F. Using a specific ejector 40, such as fluid pressure jets, that is associated with a smaller, sub-stream of the feed stream enables recovering a concentrate having less gangue associated therewith. In FIG. 7C, a corrugated conveyor can multiple detectors, four detectors shown 30,30,30,30, arranged along the feed stream. As shown, if only one detector 30 detects a target particle M in its respective detection zone, then only one ejector 40, of four, needs actuation. Detection by one detector 30 is shown as a mini-signal chart by controller 42, here being the leftmost detector. As shown in FIG. 7B one ejector 40, of four associated fluid pressure ejectors 40,40,40,40, is shown and actuated for ejection of the particle M and the volume V (a timed triggering signal for ejection t=dt) of the stream including the particle M and the gangue. Better shown in FIG. 7A, only one quarter of the feed stream flow needs be ejected as concentrate C with the target particle M, for a fourfold concentration of the ejected material. The remainder three quarters of the feed stream continues as residuum to the next phase of detectors 30,30,30,30 and ejectors 40,40,40,40 or on to tailings T.

FIG. 8 illustrates the relationship between multiple electrode pairs 31,33/31,33 of multiple detectors 30,30 within a single trough of a conveyor, for increased detection density or resolution within a single feed stream, but having a single ejector downstream thereof. The time (t) to, and duration (td) of, ejection is still a function of sensor length, velocity and time t between the detection and ejection.

Figure 7D:
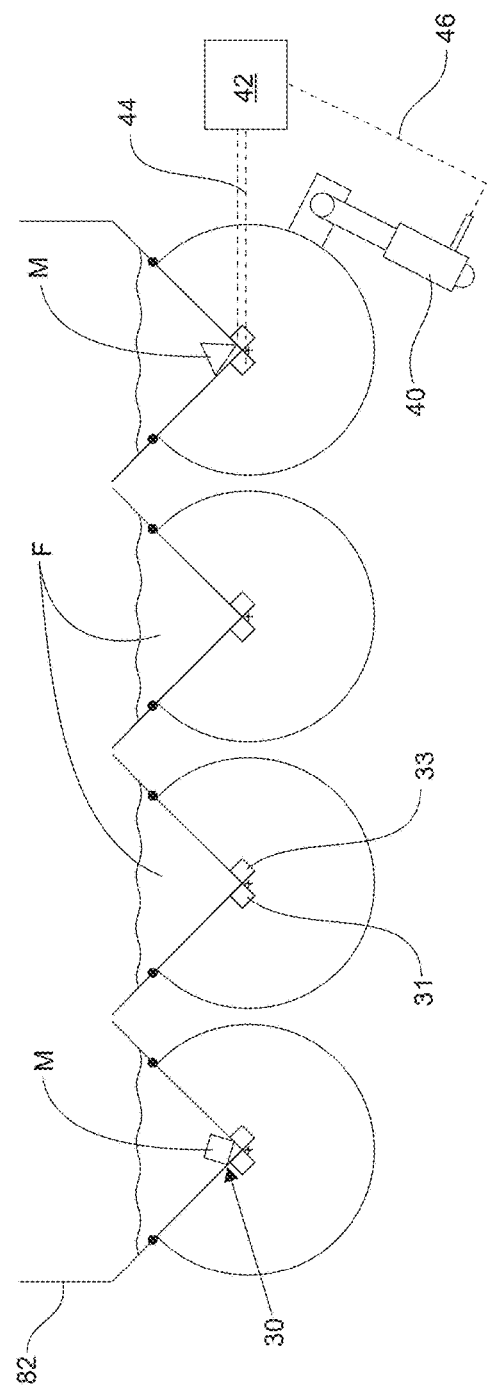

With reference to FIGS. 7D, a corrugated conveyor having multiple, parallel integrated, in-line roller-type detector/ejectors 30,40, three shown, permits individual ejection of a sub-stream of the feed stream, being ejection of concentrate C from either one third, two thirds or the entire stream. As shown in the example figure, two detector/ejectors are shown with target particles M,M, and the leftmost and the rightmost ejectors 40,40 can be actuated, leaving the middle sub-stream to continue as residuum 22 to the next phase of detection/ejection 30,40

As introduced initially above, using the electrode-type detector 30, Applicant noted improvements in detection efficiency and recovery efficiency with changes to the orientation or presentation of the feed stream F to the detectors 30 and in the case of an electrical detector using electrode sensors, changes to the electrode materials and electrode profiles.

Example 1—Detector Orientation

Figure 9A:
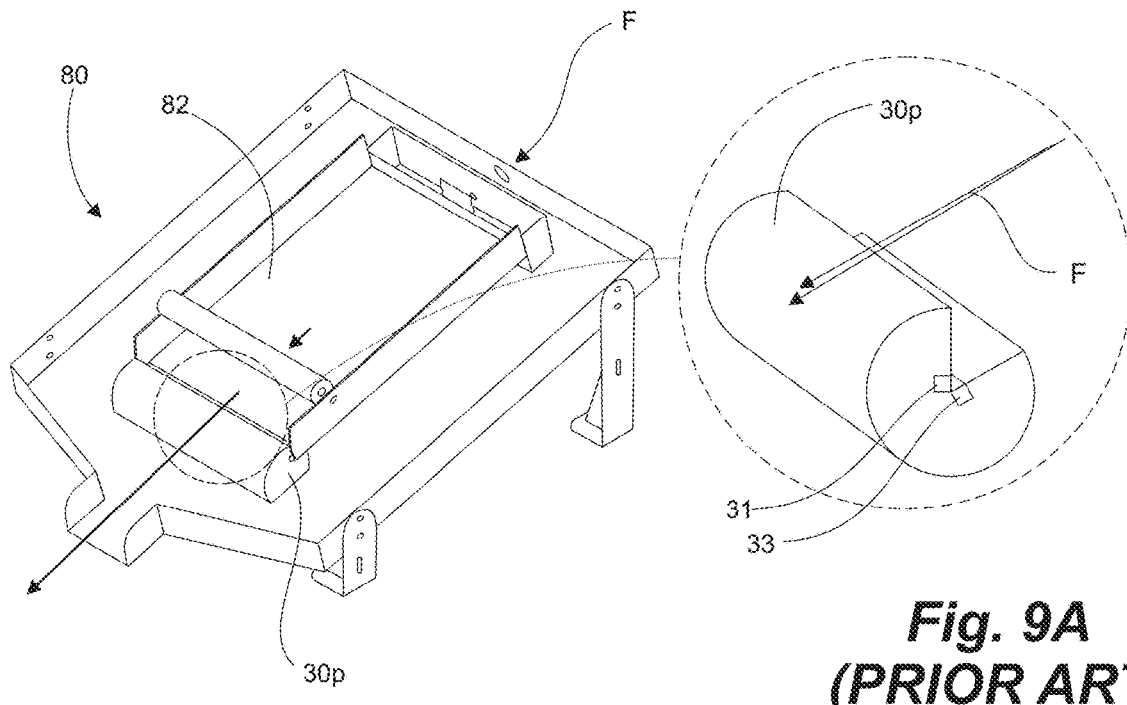
FIG. 9A is a perspective view of a test apparatus having a flow chute, a roller embodiment extending transverse thereto and an expanded view of the roller and flow relationship, the unit operated according to Example 1.
Figure 9B:
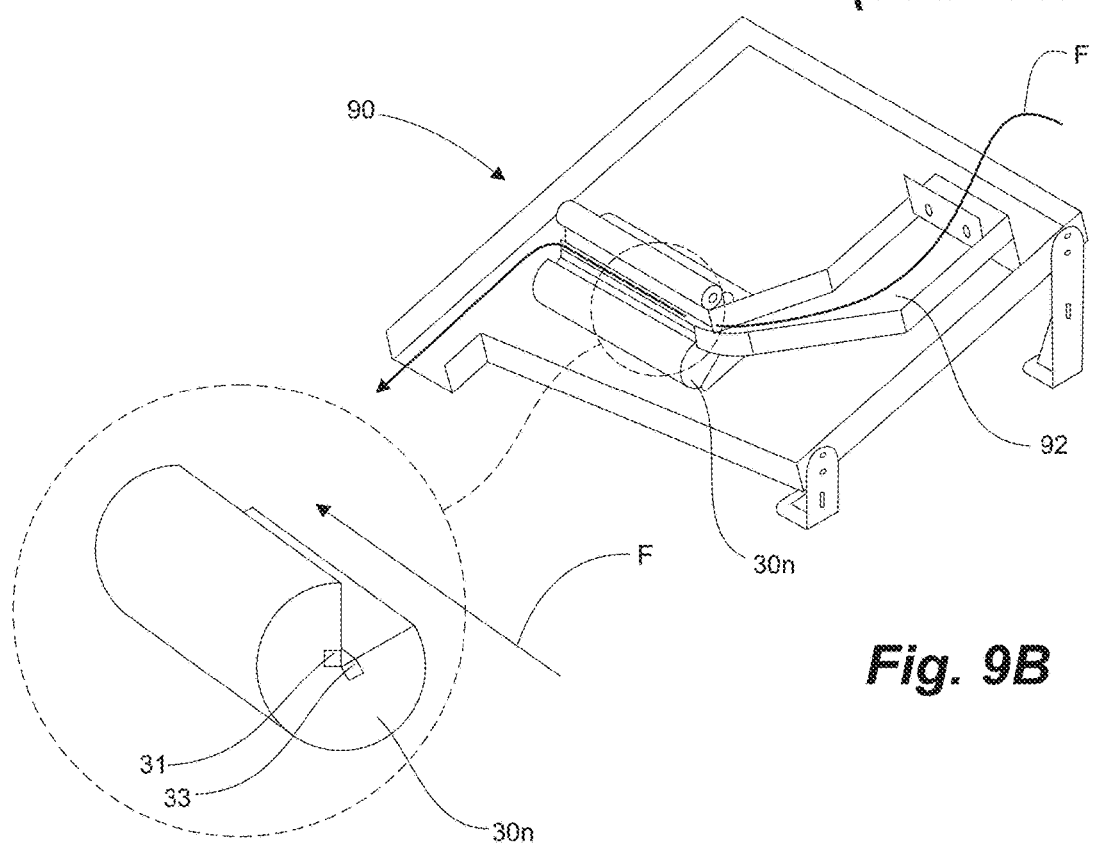
FIG. 9B is a perspective view of a test apparatus having a flow chute, a roller embodiment extending in-line thereto and an expanded view of the roller and flow relationship, the unit operated according to Example 1.

In a first series of experiments, and with reference to FIGS. 9A and 9B, with a view to testing the advantage of the improved in-line orientation of a detector over the transverse or perpendicular presentation of the prior art. In-line presentation refers to the direction of the feed stream F is aligned with the detector's sensors. For each of the perpendicular and in-line test units, one roller detector element arrangement was provided, but with the ejection disabled. Each test apparatus represented a single detector zone.

In FIG. 9A, a test apparatus 80 having a conveyor or channel 82. A single detector 30p of the prior art arrangement, was oriented perpendicular to the feed stream F. The apparatus 80 was evaluated against a second apparatus 90 having a channel 92 for directing the feed stream along the single in-line detector 30n (FIG. 9B). Detector gap G was set to 0.250 mm.

The experiment was directed to quantify the effectiveness of the in-line 90 vs. the perpendicular 80 apparatus. The performance of the detectors 30p,30n was ultimately defined as its ability to identify and remove metallic particles M from the bulk flow F. The detectors 30 were electrode pairs 31,33. The conductivity of the target particles is measured across the gap, so the opportunity for detection is greater the length of gaps is exposed to the feed stream. The detection zone comprises the exposure of the electrode pair to the flow passing thereby. In the perpendicular electrode arrangement of FIG. 9A, and FIG. 2A, a single particle has a very short detection zone to engage the gap, typically only on opportunity. In the in-line electrode arrangement of FIG. 9B, a single particle directed into the detection zone has a greater probability of contacting the gap, anywhere along the entire length of the electrode pair, or multiple opportunities to make contacts therewith. In other words the detection zone is much greater as the path of particle is in-line with the electrode pair.

The electrode's key performance indicators were detection efficiency; recovery efficiency; and yield. Particle detection, by completing a circuit across the gap, was recorded as a spike on oscilloscope reading. The completed circuit, or short circuit created across the detector electrodes, in the presence of a metallic particle, generates a spike in the oscilloscope voltage reading (such as voltage drop) although current or resistance could also be parameters measured.

Both gold and steel particles were provided in separate test feed streams F. Both slurry and dry feed streams F were tested. Different shapes of metallic particles were also informally evaluated including 0.8 mm, 2 mm, 3 mm and 0.5 mm cubes, 0.8, 0.4 and 0.5 mm flats and 0.5 mm thick irregular shapes. It was noted, that irregular shapes (e.g. 0.8×0.7×0.25 mm), more like alluvial gold, was best detected by the electrode gap.

In the numerous cases evaluated, both in presence of water and without, metallic particles M presented to the detectors, created an electrical circuit detected by the detection circuit 42, and the detection circuit was successful in transmitting this signal to a receiving device, in this case an oscilloscope and an LED light for visual confirmation. Further, three detection electrode sensor material types were considered for this evaluation, being silver alloy, surgical grade stainless steel and high-speed machine steel. As metallic particles rolled along the detector plate, spikes were noted on the oscilloscope. Short single spikes demonstrated a single detection. In many cases, as the metallic particle M moved along the electrodes, numerous spikes are seen. These represented a particle making numerous contacts with the detection plates along its path. When a particle is detected but remains trapped on the detection plate momentarily, Similar results were achieved for both gold and steel particles of varying shapes and sizes. A long spike is seen on the oscilloscope.

As noted, for the testing the usual ejection function was disabled, thereby eliminating the complexity of a test apparatus with a rotating roller and the rotatable electrical connection, seals, and actuators associated therewith. The detector electrodes for each arrangement were identical therefore isolating particle presentation as the only variable. The short circuit of metallic particles created across the detector electrodes, generated spikes in the oscilloscope voltage reading (See FIGS. 15A to 15D). Furthermore, an LED light was connected to the detection circuit output, to provide a visual reference of effectiveness for the operator.

A 100% barren, metals-free ore sample was generated and divided into 3 size fractions, namely: 0.8 mm; 2.0 mm and 3.0 mm. Each size fraction was batched in 5×63 g portions, each of which constitutes a blank sample. A test sample is generating by adding an accurately measured amount of pure gold and steel particles to a blank sample, to achieve a test sample of a specific metallic content percentage. The metallic content percentages selected were 1 particle/63 g, 2 particle/63 g and 3 particle/63 g. Each sample type as presented to the apparatus of FIGS. 9A and 9B. Advancing from prior work, only one representative flow rate was deemed necessary, at 1 kg/min or 4 seconds for the 63 g sample. Each test was repeated 5 times. All test cases were also repeated with only gold particles, without the accompanying barren ore.

With reference to FIGS. 10A to 10D, a sampling of a series of typical oscilloscope traces were taken to represent typical behavior and detection of metallic particles. In FIG.

Figure 10A:
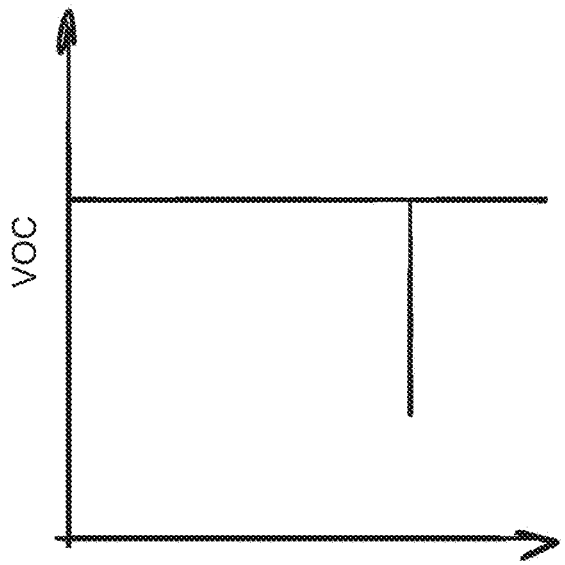
FIGS. 10A, 10B, 10C and 10D illustrate oscilloscope output respectively for electrode detectors arranged along the in-line roller ejector of FIG. 9B (Example 1) for illustrating the response for a single particle detection, multiple spaced detections; multiple detections, and multiple and continuous (particle stopped) detections.
Figure 10B:
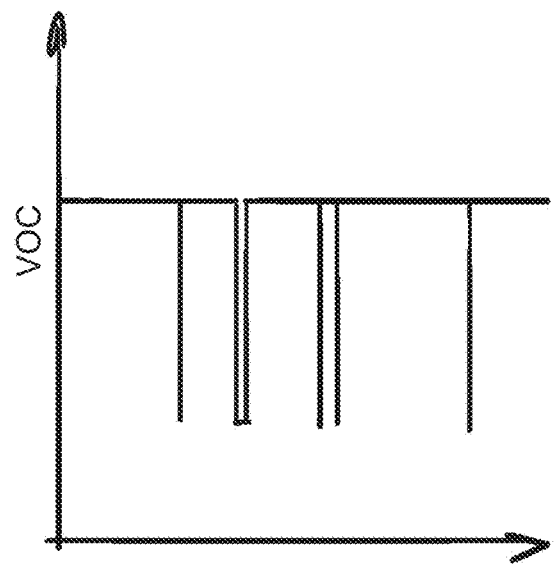
Figure 10C:
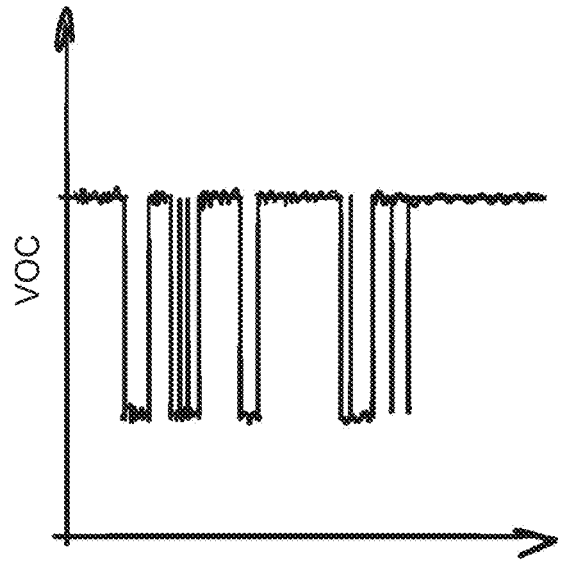
Figure 10D:
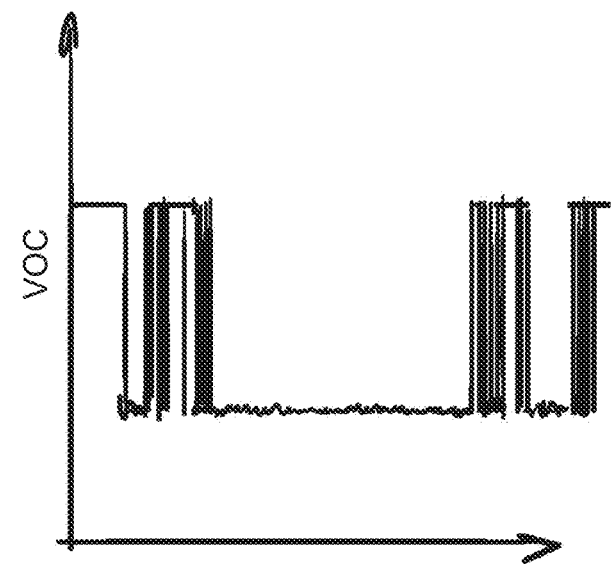

10A, a single contact of a metallic particle M was captured, showing a single spike. In FIG. 10B, multiple spaced detections of one or more particle is shown, being one particle rolling or bouncing or multiple particles, any of which qualifies for actuation for ejection to the concentrate c. Similarly, in FIG. 10C, multiple detections are noted, which could be indicative of rolling behavior, and in FIG. 10D, the trace shows multiple and various continuous detections which could represent a particle M stopped along the electrode and remaining in contact, then subsequently began to roll again. The behavior and the resolution of the output signal is readily distinguishable for implementation of an algorithm for actuation of that portion of the stream to the concentrate. Note that rolling and bouncing behavior is predominately an advantage obtained in the in-line model of FIG. 9B.

Algorithms include, if a signal is over a detection threshold, then triggering immediate actuation for ejection or, for example in the case of an ejector being spaced downstream from the detector, the actuation being a function of the detector length, feed rate, the receipt of a signal, an appropriate time delay and ejection duration.

While not quantitative, hundreds of qualitative observations, with oscilloscope results, were also made using numerous metallic particle types, shapes, and sizes, and feed streams that were both wet (slurry) and dry over the electrodes. The broader scope of detector behavior as confirmed for metallic particles in an aggregate, whether wet of dry and regardless of typical particle geometry.

Additional hydrodynamic principles apply due to the flow path. The paired electrodes 31,33 of the current detectors extend along the detector axis. The electrodes are immersed in the slurry S, and aligned generally tangentially to the periphery of the flow path. The flow of slurry S is now directed along the detector and electrodes axes, in other words parallel therewith, rather than the previous transverse orientation thereto of FIGS. 2a-2c and FIG. 9A. Such parallel flow provides multifold, potential incidences of contact between target particles and the electrodes as the target particles advance long the electrode. As discussed below, the addition of a circular flow in an arcuate flow channel, and detectors positioned along this periphery, imparts a centripetal force to the slurry S to further subject the gravity-separated slurry to a radial separation by density, with heavier target particles concentrating towards the radial periphery of the flow path and again, moving along the electrodes, oriented along the arcuate path.

With reference to FIGS. 11A through 11D, the improvement in using in-line presentation over perpendicular was confirmed. Both gold and steel particles were tested across 3 mm, 2 mm and 0.8 mm size fractions. In-line presentation provided an average of 9% (Recoveries of 67% to 76%) improvement over perpendicular presentation. However, the biggest improvement was noted with the smallest metal particles of 0.8 mm (800 microns). Recovery potential for smaller particles was raised from 40% to 53%. As noted herein, dry transport could raise the recovery potential of these ultra-fines by eliminating the conductivity and other micro-aspects of the water, including viscosity or surface tension factors interfering with ultra-fine contact with the electrodes. Of course, exclusion of water improves the environmental stewardship of the process, reducing water requirements and contamination.

The In-line material presentation versus perpendicular material presentation, was verified as a viable concept (evaluated with gold and steel particles) across 3 mm, 2 mm and 0.8 mm diameter size fractions. In-line presentation provides an average of 9% (67% to 76%) improvement over perpendicular presentation. This is however more emphasized with the detection of the smallest gold particles. Recovery potential for smaller particles was raised from 40% to 53%.

Further it was noted in the first stage of the evaluation that particle detectability seemed to be higher when particles were passed upward along the detector electrode. Accordingly, a further test was performed, using profiled electrode plate, where the particle can move slightly upward along a ramp of one detector electrode and then to fall and then rise again.

Example 2—Electrode Surface and Material

As discussed above, the electrode pairs in the perpendicular vs. in-line were identical, and each of the two electrodes, in a pair, were linear, or flat forming a uniform gap G therealong.

With reference to FIG. 12A to 14D the test of Example 1, with the in-line apparatus of FIG. 9B was expanded to include detector electrode pairs 31,33 having various different profiles along the base electrode, the base electrode being located along the bottom of the ore stream and benefiting from gravimetric manipulation and exposure to the heavier, metallic elements in the ore stream.

Figure 12A:
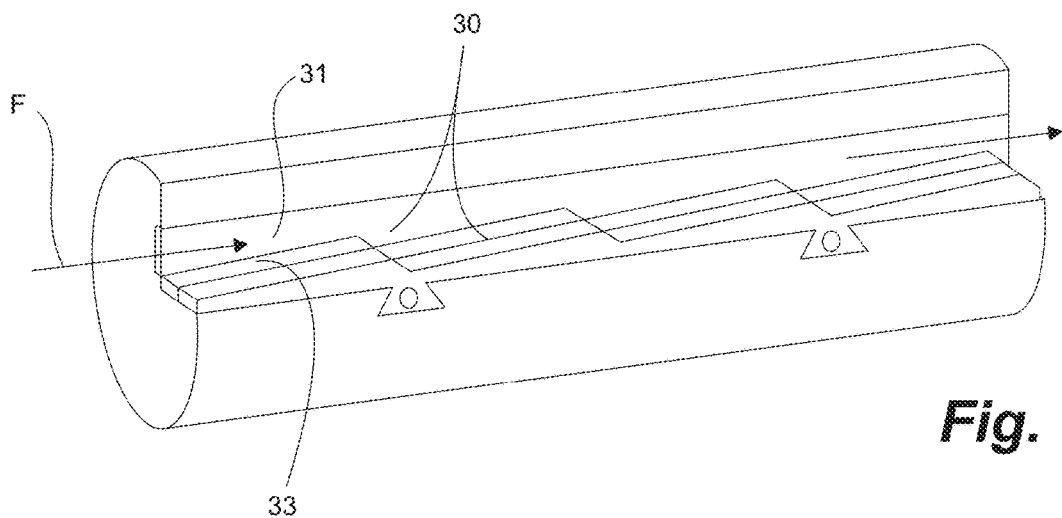
FIG. 12A is a perspective view of an in-line roller having a profiled detector an in-line flow direction illustrated thereon for testing according to Example 2.
Figure 12B:
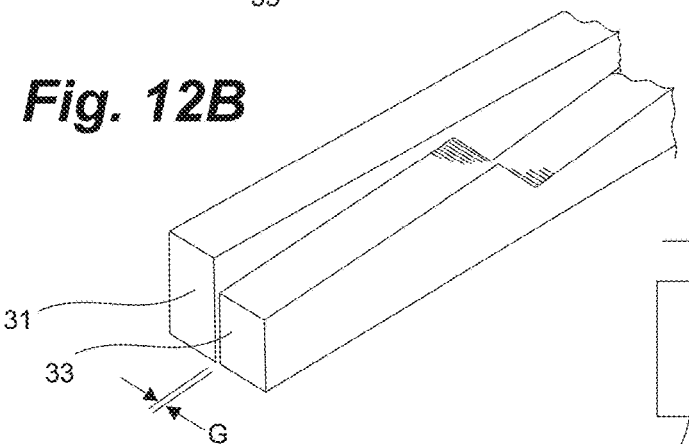
FIGS. 12B and 12C are partial perspective and end views respectively of a flat electrode of an electrode pair of a detector of FIG. 12A, juxtaposed with a profiled electrode, with a gap defined therebetween.
Figure 12C:
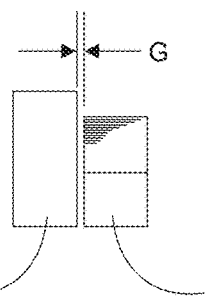
Figure 13A:
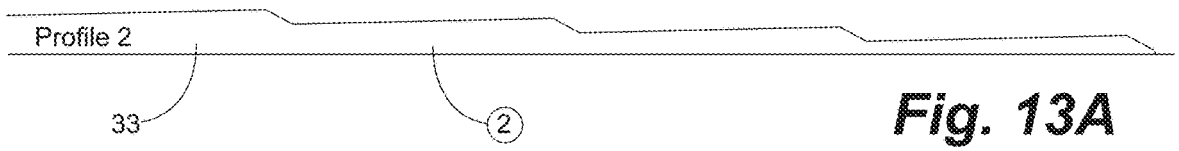
FIGS. 13A, 13B and 13C are side views of three different profiles employed in a roller test apparatus such as that of FIG. 9B.
Figure 13B:
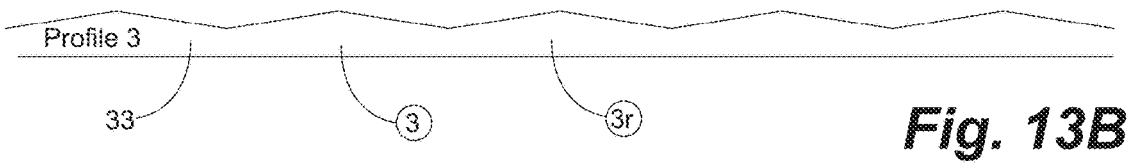
Figure 13C:
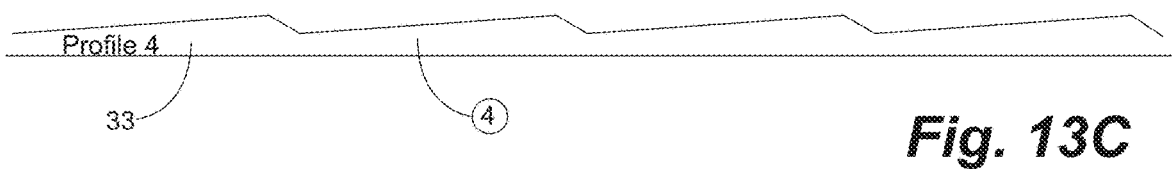

With reference to FIG. 12A, the detector of FIG. 9B was replaced with another detector having a sensor comprising a first electrode 31 with a linear side face, and a second, bottom electrode 33 having a linear side edge to form the gap G with the side electrode, and an undulating top surface exposed to the underside of the ore stream. As shown in FIGS. 12B and 12C, the gap G is formed between the side, flat face of the first electrode 31 and the flat side face of the second, undulating electrode 33, the gap being uniform therealong.

As shown in FIGS. 12A, 12B and 12C, aside from the original electrode pair 31,33, being flat-on-flat and deemed profile 1, three additional undulating profiles for the second electrode 33 were tested, labelled as "Profile 2", "Profile 3", and "Profile 4". The roller length was 200 mm and was installed with a 10 deg downward incline. As shown Table 1, the profiles of electrode 33 were:

TABLE 1

| | | 200 mm Electrode 33 | | | |
|---|---|---|---|---|---|
| Profile | FIG. | Length in Fig. mm | Rise L, h mm, mm | Drop L, h mm, mm | Number Rise&Drop per 200 mm |
| 2 | 13A | 200 | 45, 1.5 | 5, 1.5 | 4 |
| 3 | 13B | 200 | 20, 3 | 20, 3 | 5 |
| 4 | 13C | 200 | 45, 3 | 5, 3 | 4 |

Each rise and drop profile is a repeating pattern which undulates relative to a datum line drawn through the side electrode. Profile 2 had a long length uprising ramp with a relatively short descending drop-off, repeated four times. Profile 3 had a medium length uprising ramp with an equally medium descending drop-off, repeated four times. Profile 4 is a more severe form of Profile 2, having a long, steep uprising ramp with a short and steeper descending drop-off, also repeated four times.

Figure 14A:
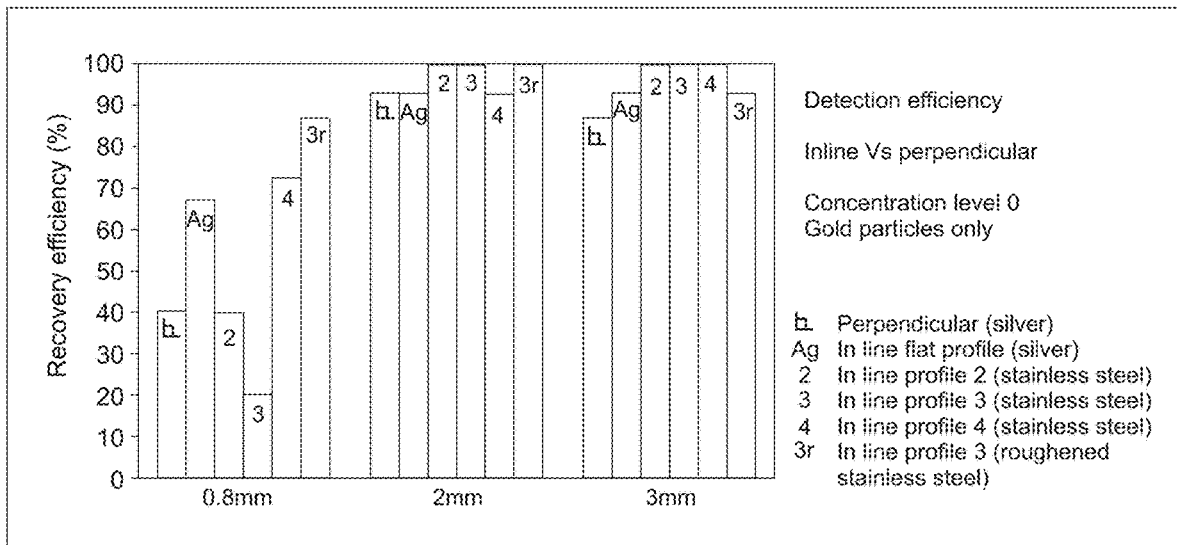
FIGS. 14A through 14D are charts illustrating the detection efficiency of a linear electrode profile of the prior art according to FIG. 9A and three in-line, profiled rollers according to FIGS. 13A,13B and 13C respectively, and the third profile of FIG. 13C also retested with a roughened surface.
Figure 14B:
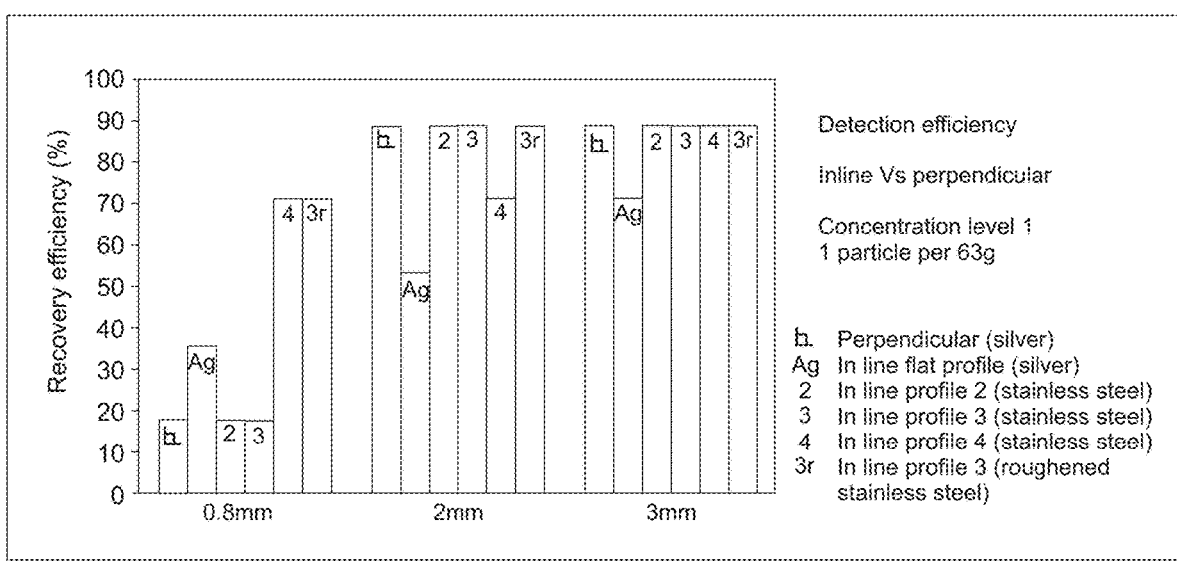
Figure 14C:
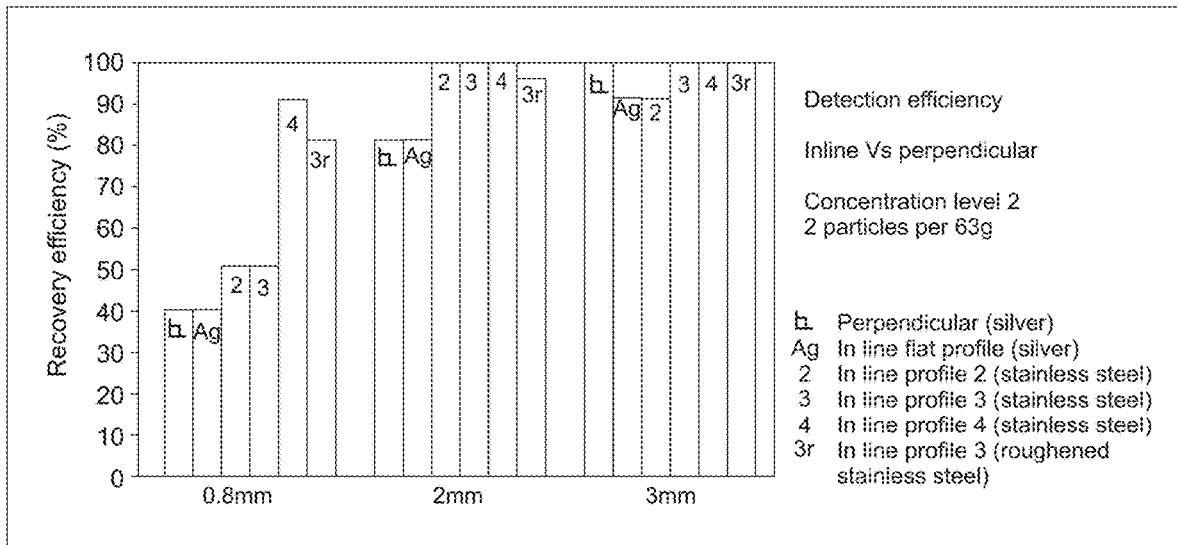
Figure 14D:
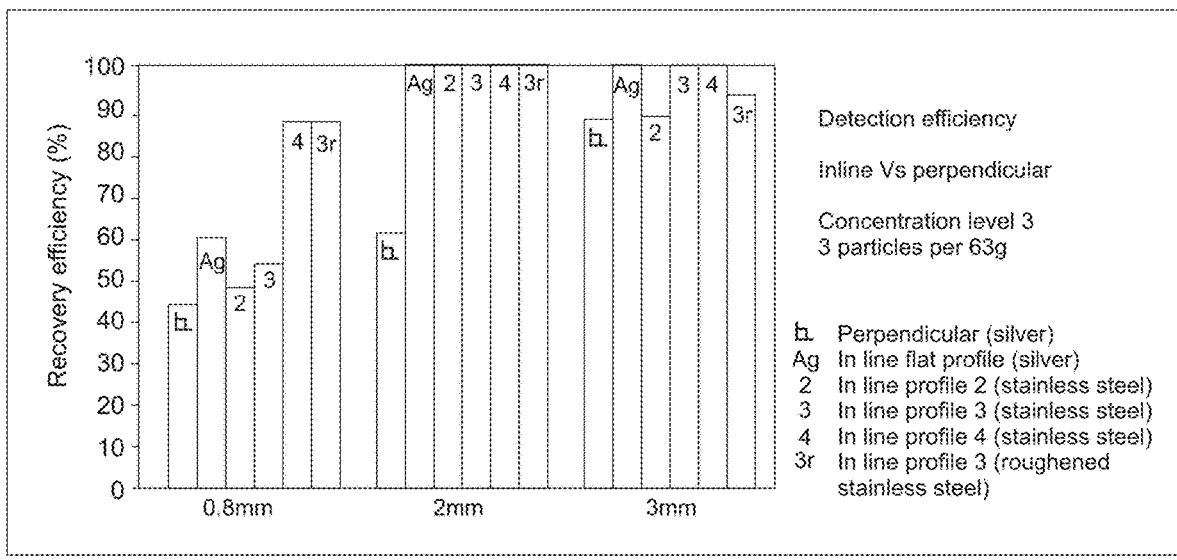

The prepared ore samples were tested on each profile. Alternative detector plate profiles (Profiles 2, 3 and 4) were evaluated providing, on average across all 3 size fractions, a further 8% improvement in performance. With reference to FIGS. 14A though 14D, the results are presented herein on testing for gold particles alone and for gold particles in ore for all three sized fractions and for 5 different electrode configurations.

By deploying a detector electrode design where particles repeatedly move gradually upward, then fall abruptly downward, the particle/electrode contact is improved. Furthermore, the periodic vertical movement of the flow was observed to enhance the density-based settling of metallic particles for increased exposure to the sensors.

With reference to FIGS. 14A to 14D, all results demonstrated the superiority of the detector orientation determined earlier in Example 1, and also shows improvement in efficiency with electrodes 31,33 that are profiled for enhanced particle electrode contact. Electrodes 31,33 formed of materials more durable than silver performed equally well.

For the 3 mm and 2 mm size fractions a 100% recovery potential was remained below 65%. Profile 4 achieved 97.5% recovery potential for 3 mm and 2 mm particles but furthermore achieved a greatly improved 80% recovery for smallest particles Inspection of the surface finish of Profile 4, revealed that the surface contained 100 micron surface roughness. It was therefore proposed creating the same surface finish on Profile 3 and retesting to establish the effect. The modified Profile 3 detector (with rough surface) achieved 98.5% recovery efficiency for 2 mm and 3 mm particles, and 80% for smallest particles. It is therefore clear that surface roughness increases detection potential for 0.8 mm particles.

In further observations, in wet, or slurry-type feeds, the detector response for small particles becomes less distinguishable, with the current detector circuit, from the underlying background conductivity and other interference of the carrier liquid. As discussed below, early manufacturing techniques did not accurately maintain the electrode gap G. Careful design and manufacturing as resulted in precise gap maintenance of 0.250 mm, used in the all the test detectors. Usefully, current studies have shown that a large percentage of gold particles reside in the −800 to +300 micron size range.

Electrodes 31,33 as sensors are subject to the abrasive environment of a moving aggregate and corrosion in the presence of air and water. In earlier experiences, some electrode material was inappropriate as oxidation of the material rendered the detectors less sensitive or insensitive to the presence of metallic particles requiring regular, at least twice daily, cleaning of the electrodes. While the use of silver for electrodes has the highest conductivity, oxidation appears to have been a negative factor as a detector electrode. Stainless steels have conductivities less than order of magnitude less than silver but are inexpensive and hardy. A variety of materials (various grades of stainless-steel, high speed machine steel) were considered as alternative detector electrode materials for reliability, maintenance, and cost. While the starting electrical conductivity of stainless steel is lower that silver, the continued and adequate response under voltaic potential across the gap, and longevity, make the material suitable. The results of the testing showed that medical grade stainless steel (SAE 316SS) is a viable alternative. Across numerous days of testing no oxidation was noticed. The stainless steel material is also significantly more durable and far harder than silver. Using the same electrical circuit, detectability appeared to be at least the same compared to silver.

Example 3—Detectors in Series

Using the parameters from the above examples, more comprehensive embodiments are disclosed as follows: in-line presentation of the feed stream detectors in multi-deck or extraction stages, arcuate flow paths such as polygonal paths shapes with each side characteristic by a detector/ejector, horizontal and inclined transport, and alternate detector placement.

Figure 15:
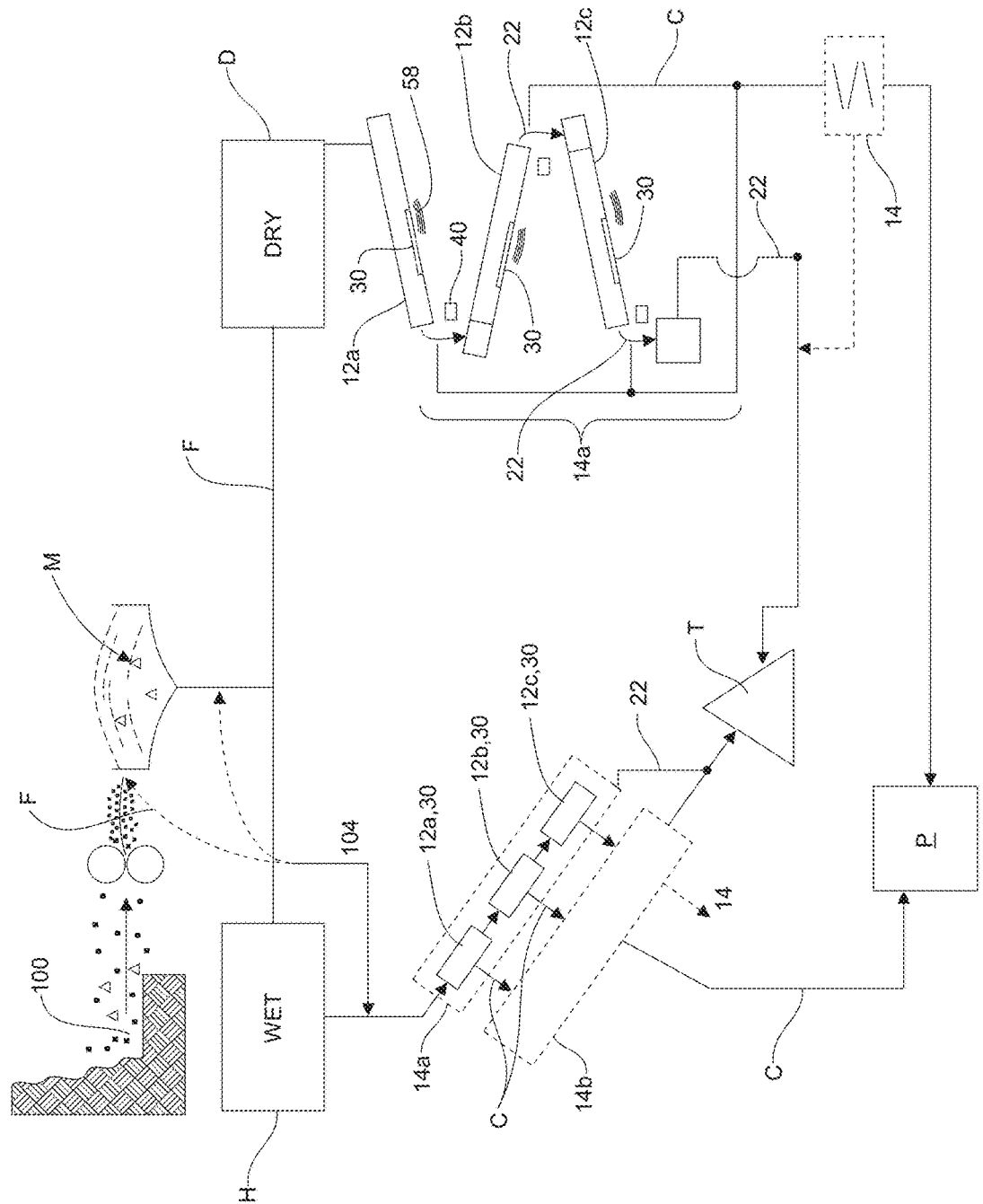
FIG. 15 illustrates flow schematic for alternate wet and dry transport systems.

With reference to FIG. 15, mined ore 100 can be comminuted into aggregate with a sizing device 102 for preparation as a feed stream F. Depending on the size distribution, one might choose between hydro-transport H or dry transport D. In the hydro-transport H process, water 104 is added to the aggregate ore stream before presentation to the detectors 30. Three phases 12*a*,12*b*,12*c* of detectors 30,30, 30 are shown in a first stage 14*a*. The concentrate C ejected from each detector is directed to a subsequent stage 14*b*. A stream of residuum 22 from each phase 12*a*,12,*b*,12*c* of a stage 14*a* . . . 14*n* is directed to the next phase or at the end of that stage 14*a*, is directed to tailings T. In the dry transport D process, the aggregate ore stream before is presented to the detectors 30, using vibration actuators or vibrators 58 as needed. One or more phases 12*a*,12*b*,12*c* of detectors 30 are shown in a first stage 14*a*. Concentrate C is ejected from a cascade of the feed stream F, the residue or residuum 22 flowing as a feed stream to the subsequent phase 12*b*. A stream of residuum 22 from each phase 12*a*,12,*b*,12*c* of a stage 14*a* . . . 14*n* is directed to the next phase within the stage or, at the end of that stage 14, is directed to tailings T. The concentrate C ejected from each detector can also be directed to a subsequent stage 14*n*. The concentrated C is collected as product P.

With reference back to FIG. 3B, an embodiment of a unit was tested having a compact arcuate flow path in-line with the detectors. The particle concentrations of Examples 1 and 2 were applied to the multi-phase, three detector/ejector arrangement.

As shown in FIGS. 16A to 16D, recovery efficiency was measured for the system of three in-line detector/ejectors 30,40 arranged in series. The concentrate was collected individually for the test. The detectors were electrode-type detector/ejectors each pair 31,33 having a 0.250 mm gap G. The feed stream was provided as a slurry at a variety of flow rates between about 0.5 kg·min to 5 kg/min. The particulate loading in the slurry was water flow managed by water addition, adjusted by particle size for each of the 3 size fractions, and ranged from 15 liters/min and 8 l/min. The 90 deg. V-trough of the detector was oriented vertically, with the electrodes at the apex thereof.

Figure 16A:
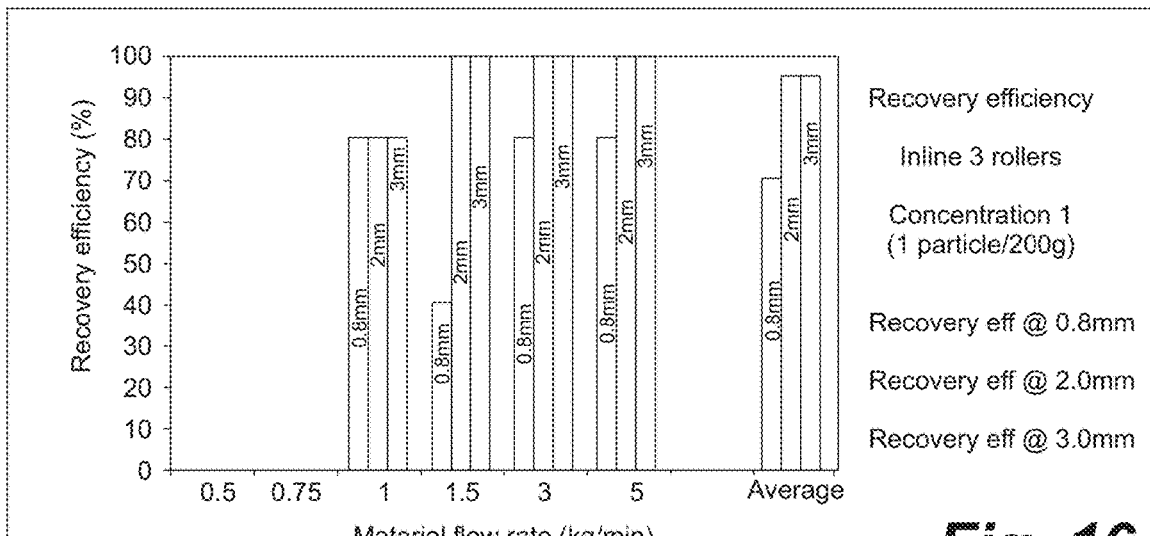
FIG. 16 is a chart of recovery efficiency for electrode detectors for three size fractions of the aggregated feed stream when processed along 3 phases of the detectors/ejectors.
Figure 16B:
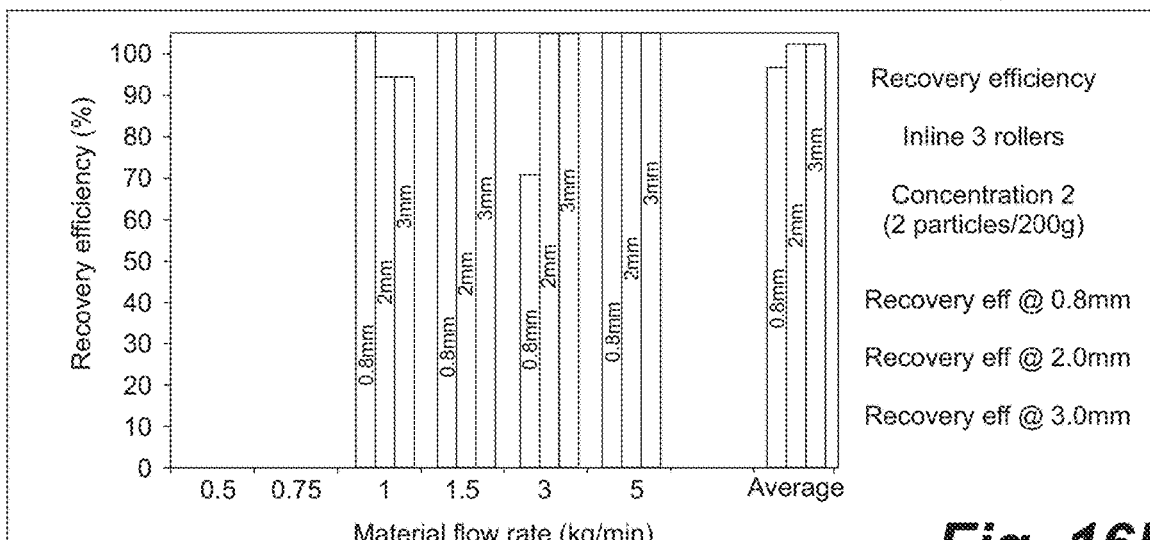
Figure 16C:
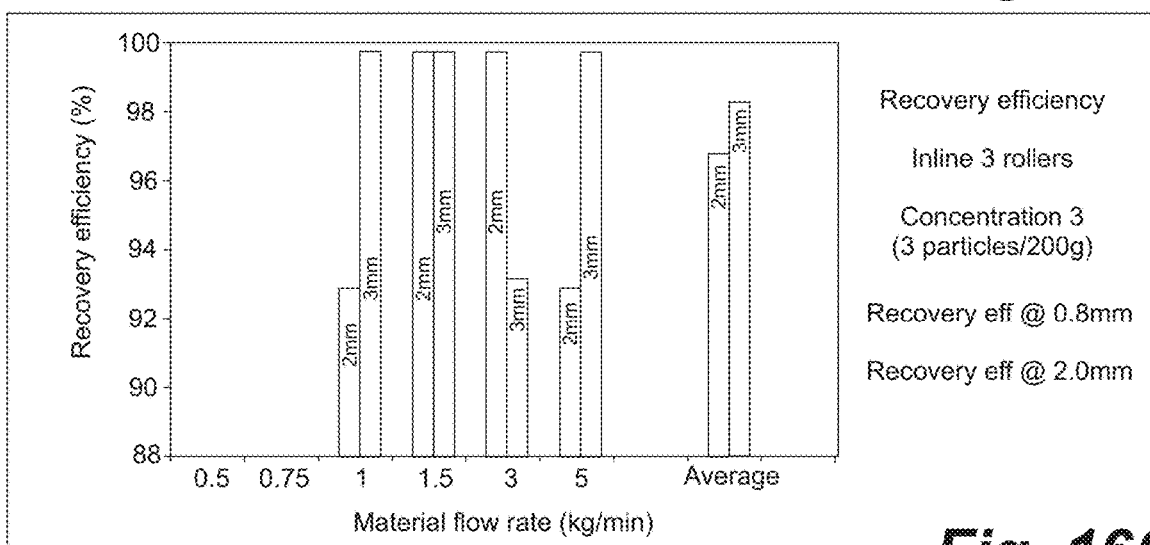

With reference to FIGS. 16A to 16C, using a hydrodynamic transport over three phases of in-line detectors, 100% recovery of the target particles in the 2 mmm and 3 mm sizes was achieved at low flow rates and over 90% average recovery across the flow rates of 1 to 5 kg/min. For the smaller particles, of 0.8 mm, the recovery was less pronounced, ranging from about 65 to 80% recovery for the lower concentrations of target particles and at low flow rates.

Multi-Stage and Multi-Phase Embodiments

Turing to FIGS. 17A to 19, and FIGS. 23A and 23B, various compact embodiments are illustrated with various configurations for multi-level stages of concentrate recovery and multi-phases of recovery enhancement.

Figure 1:
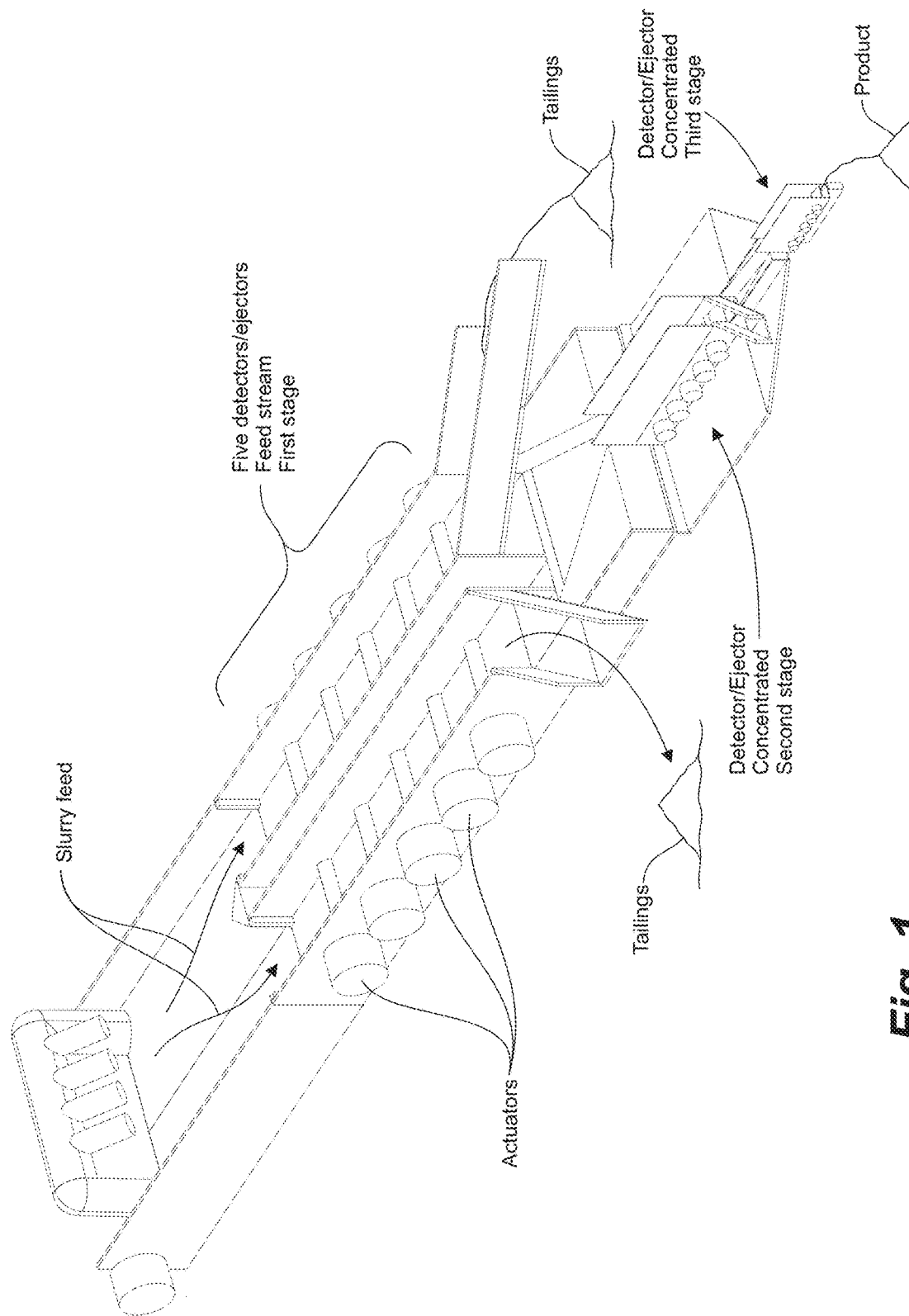
FIG. 1 is a perspective view of a separator of the prior art.

In one embodiment of the invention, apparatus 110 is provided which result in a flow of slurry S along each of vertically stacked extraction stages of detectors 30, the slurry flowing in generally circular path along each stage 12. Recall that the prior art FIG. 1 comprised two parallel trains, and long, linearly extending slurry channels having a plurality of detectors spaced therealong representing three stages of collection. The need for linear extension of the apparatus for increasing concentration capability, and side-by-side expansion for increasing processing capacity, consumed significant real estate. Arcuate channels results in a small footprint.

Figure 23A:
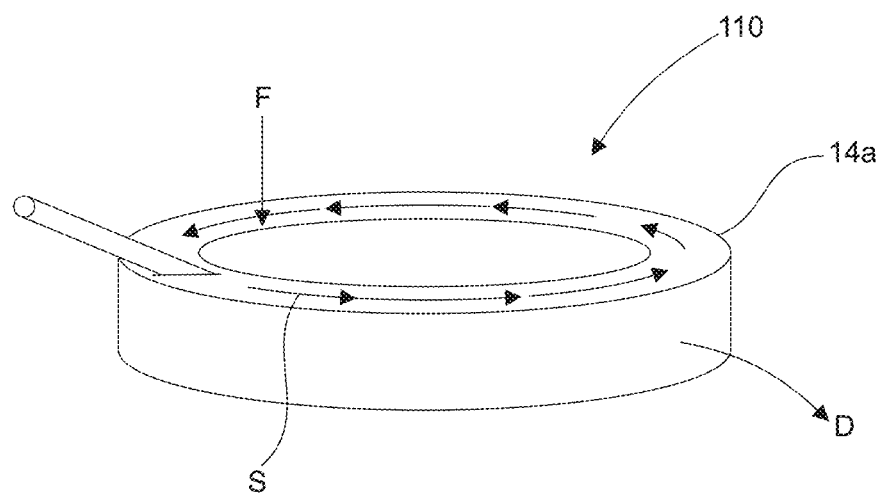
FIG. 23A is a perspective illustration of a closed loop flow path in which the feed stream is circulated and optionally recirculated until the target particle detection events diminish below a threshold.
Figure 23B:
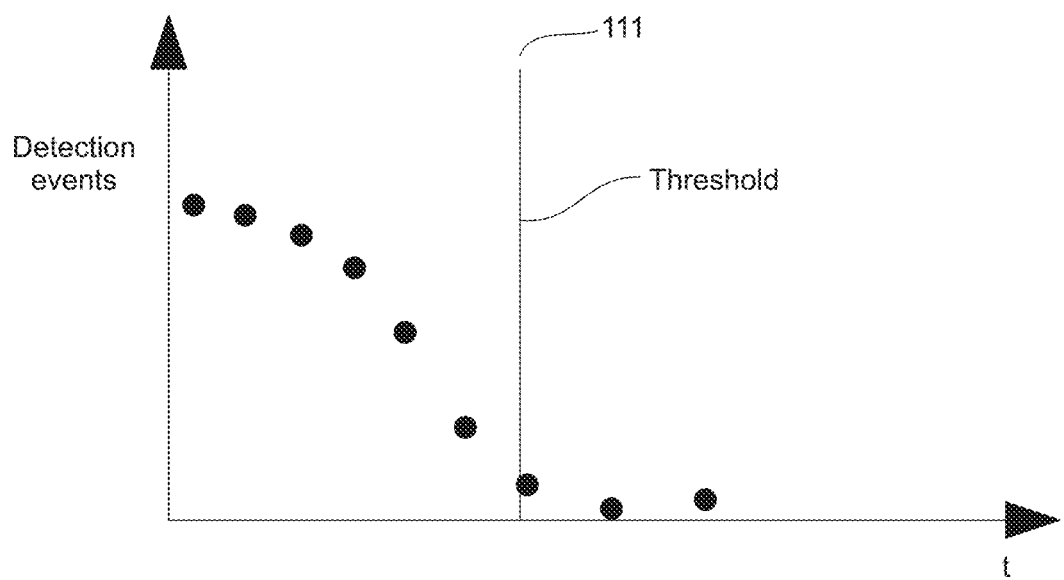
FIG. 23B is a chart illustrating perspective illustration a stage of a closed loop flow path in which the feed stream is circulated in a batch process, and optionally, recirculated, until the target particle detection events diminish below a threshold.

FIGS. 17A-19 are horizontal embodiments in which each stage 12 is operated in batch mode, the feed stream F directed repeated across multiple phases of detection/ejection, ever-diminishing numbers of target particles M in the feed stream being ejected at each phase until economic exhaustion, before like processing of the concentrate in the successive stages. FIGS. 23A and 23B are embodiments represented by a continuous once-through path, using multiple phases of detector/ejection, each phases detecting lower and lower presence of target particle in the residuum 20 of the feed stream. The ejected concentrate C is also processed in subsequent phases.

Figure 17A:
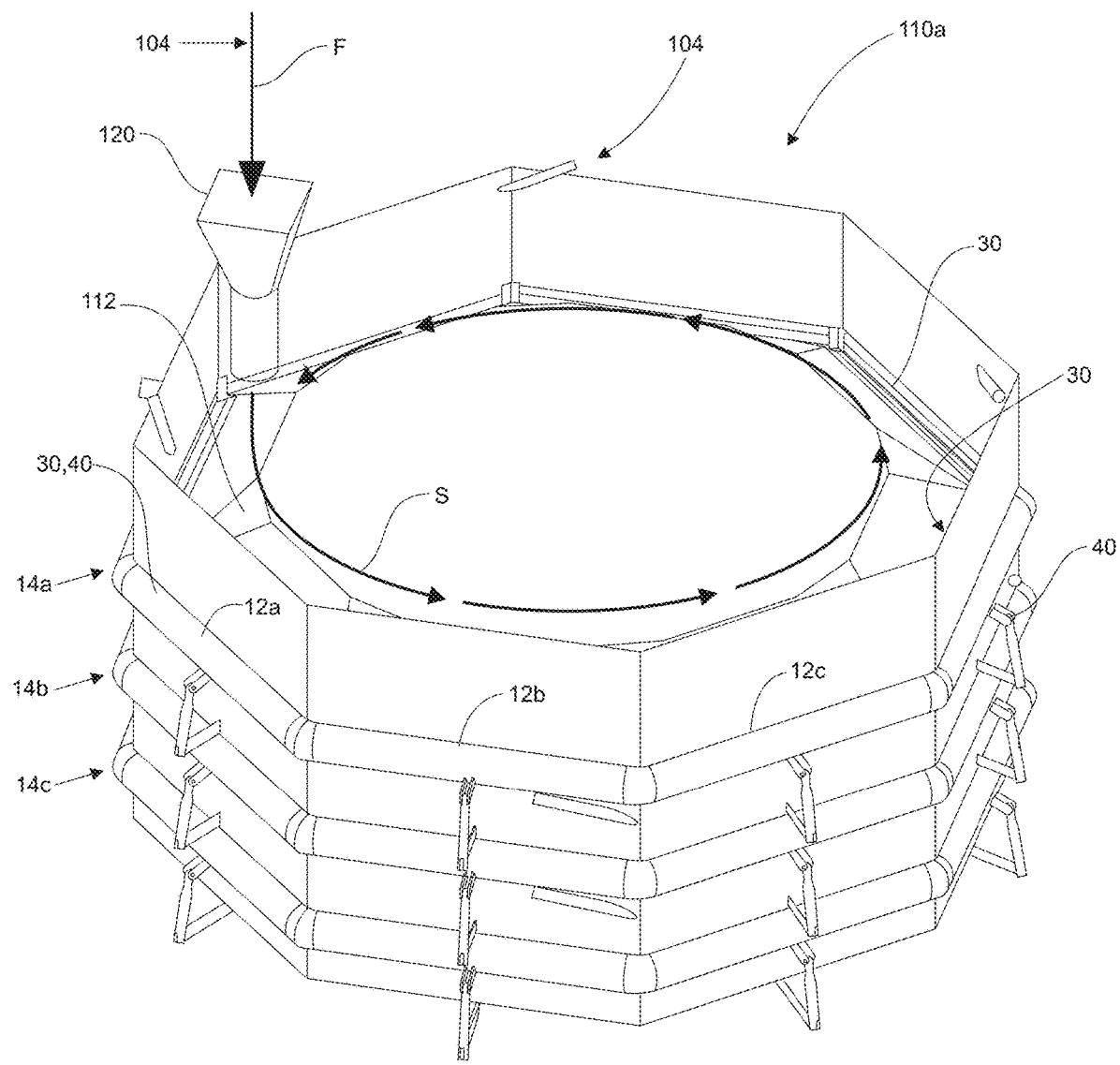
FIG. 17A is a perspective view of a three stage, arcuate unit for receiving an ore stream, this embodiment implementing a hydrodynamic transport, each stage having a horizontal path with fluid mobilization and multiple phases of peripheral, roller-type detector/ejectors.

Back to FIGS. 17A, and 23B, in a multi-stage, horizontal unit 110, the feed stream F is introduced to a first, top stage 14a of the unit 110. This embodiment is disclosed in the context of a hydrodynamic flow of slurry, but might also be managed in a dry mode with strategic vibration, such as in a horizontal half-torus channel (not shown) with oscillatory and like vibration algorithms.

Figure 22:
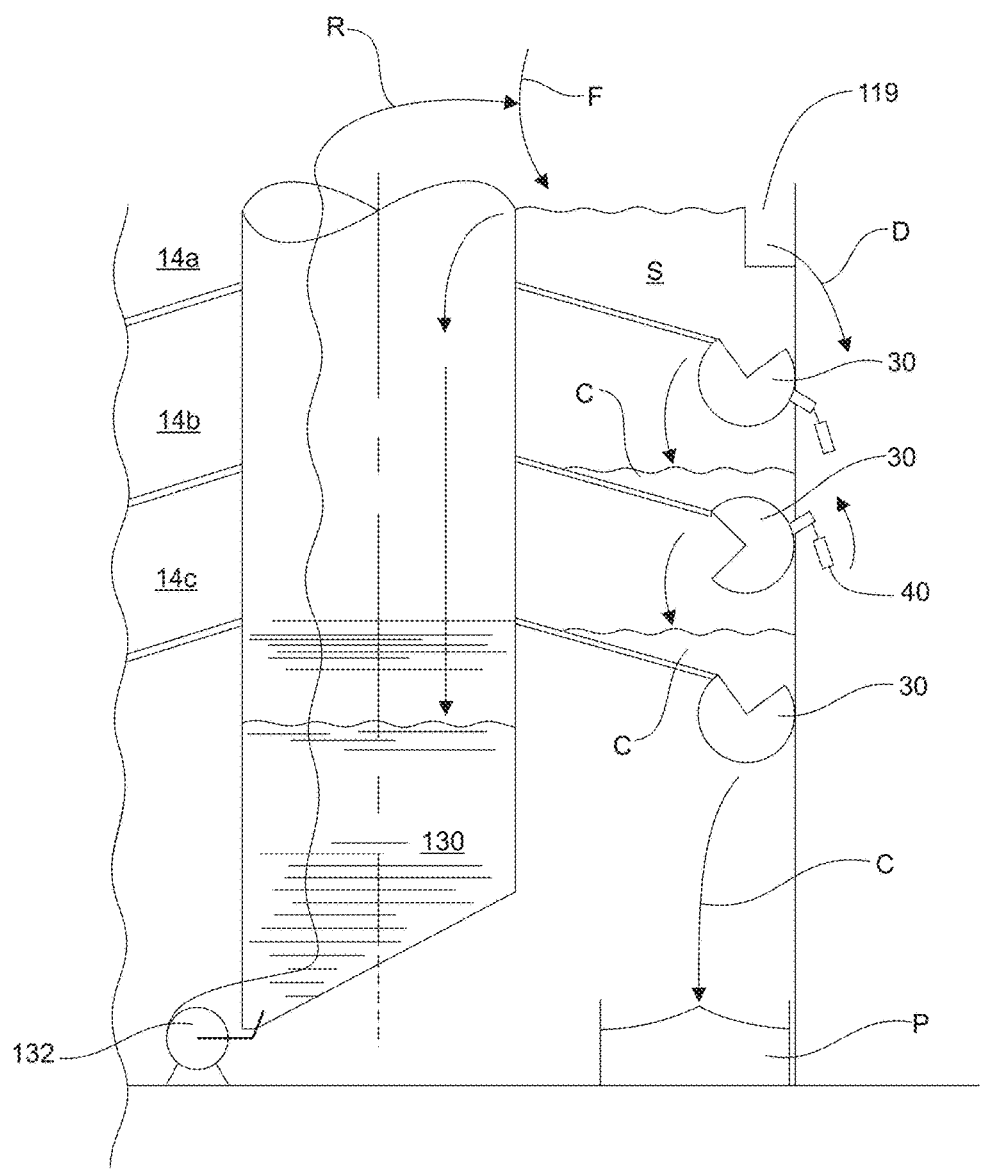
FIG. 22 illustrates a partial side cross-sectional view of a three stage unit for a slurry feed stream and the top stage and one or more additional stages decanting clarified stream to a central cylindrical sump.

As shown, unit 10 uses a feed stream as a slurry S in a circular path. Hydrodynamic and gravity separation conditions in the flow path enable pre-separation of the target particles M from the gangue, gravity concentrating the target particles M along the detectors 30 positioned along the based on the stage 14a and optimize detection of the metals M at those detectors 30. The heavier target particles segregate by settling to the bottom of the stream whilst the stream clarifies with lower density particles remaining entrained higher in a clarified portion of the stream. As shown in examples shown in FIGS. 18, 19 and 22, the clarified fluid D can be decanted off for disposal, treatment, and recycling for mixing with the feed stream as slurry. The detectors 30 are arranged along the periphery, oriented in-line with the flow path for improvements in the incidence of detection of metallic particles M from the balance of the slurry stream S. The metallic particles M, primarily precious metals, are effectively conductive and suitable for detection with the electrode-based detectors. High value precious metals, such as those of Groups 10 and 11 of the periodic table, are examples of such suitable and conductive metal particles M.

The ore to be processed has been comminuted to a size corresponding generally equal to or larger than the electrode gap G of the electrode-based detectors 30 or vice versa. Note the examples above illustrating the success of detection and recoveries for size 0.8 mm to 3 mm using and electrode gap G of 0.250 mm. Ores with target particles of <1 mm would not be well served by electrode gaps G of >1 mm. Further, where conductive metal particles M is occluded by non-conductive elements, finer comminution can liberate a greater number of conductive metals for detection.

Figure 17B:
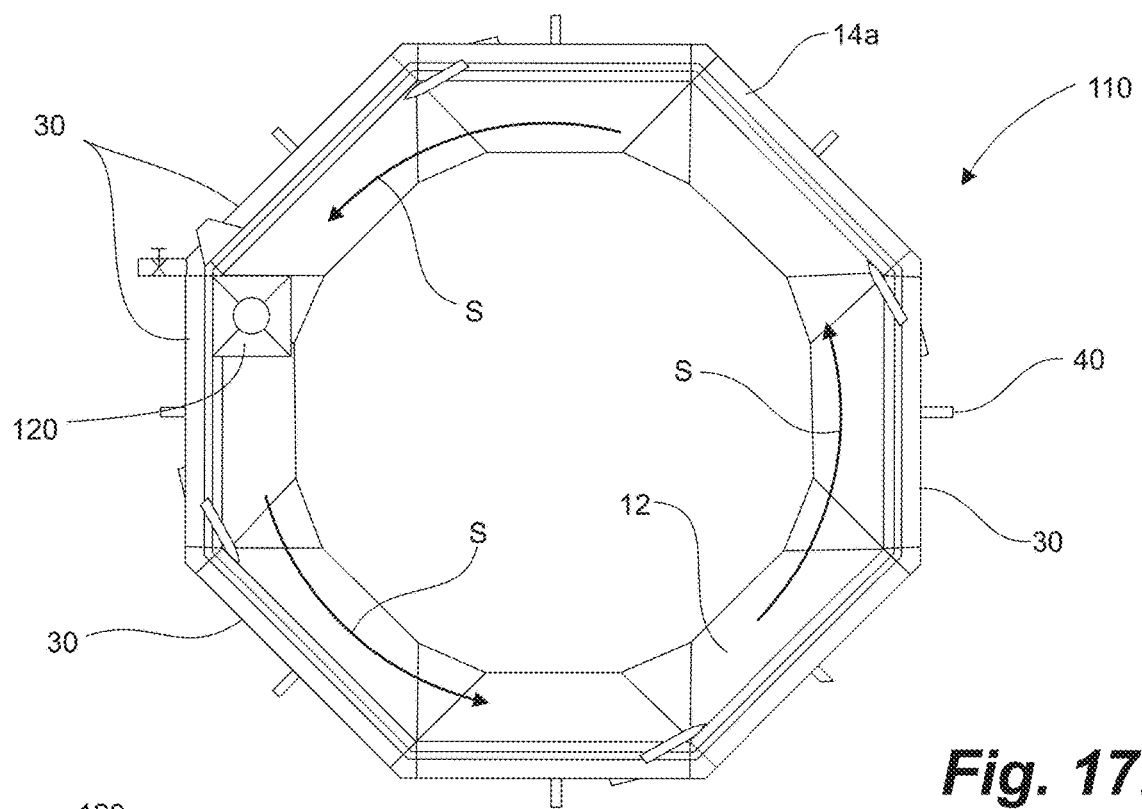
FIGS. 17B and 17C are plan and side views respectively of the pentagonal unit of FIG. 17A.
Figure 17C:
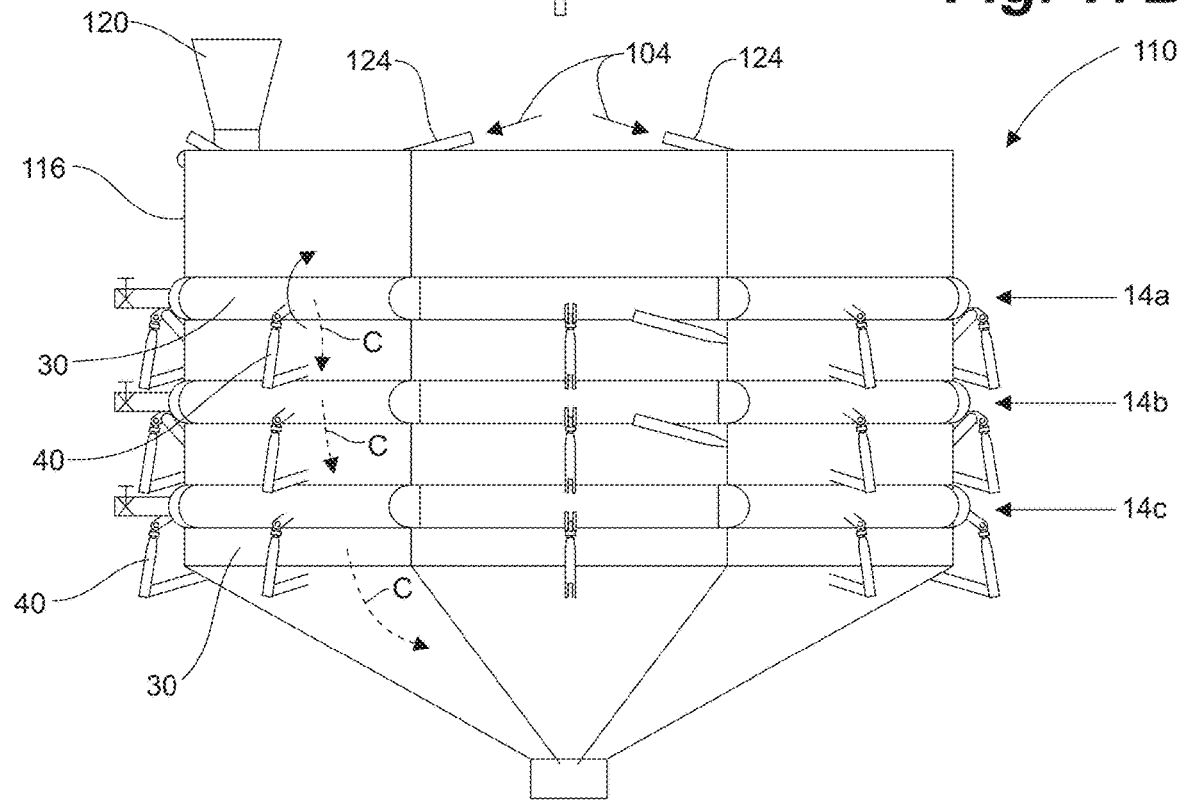

In FIGS. 17A to 17C, depicting the separator unit 110, the feed stream F is managed in an arcuate, generally circular path and each subsequent recovery stage 14 is located in the same areal arrangement, stacked vertically along a vertical axis Z within the same efficient and areal footprint. The separator unit 110 comprises of three stacked modules of circular separation stages 14a,14b,14c. As shown in FIGS. 17A and 20A, as the stream S is directed along the arcuate path, centripetal forces act on the particulates in the flow stream to direct higher density target particles radially outwardly and into more consistent and repeated contact with the detectors 30 arranged tangentially to the outer periphery of the channel 112.

With reference to FIGS. 20A, 20C and 20D, each stage 14a,14b,14c comprises an embodiment of a horizontal flow channel 112 having a bottom 114 shaped as a conical washer with an elevated inner periphery and an enclosing outer wall 116 at an outer periphery. FIG. 20B illustrates a flat washer form of bottom 114, the design of which might include higher flow rates to employ centrifugal segregation of target particles to the outer wall and the detectors arranged therealong. As shown in FIGS. 20C and 20D, subsequent stages 14b,14c . . . may also implement a vertical wall 118 at the inner periphery. Elevational control of the slurry load at the walls, or use of launders 119 (See an example of a launder in FIG. 22), can enable use of decanting, shown as decanting at an outer wall in FIG. 20C. As discussed above, as the flow stream circulates, the higher-density particulates flow radially outwardly. Conversely, the slurry S also clarifies at the inside radial portions. Thus, in an optional operation shown in FIG. 20D, clarified portions of the slurry S, primarily water, can decant D at the inner radial extend of the channel 112, discharging through one or more openings or along the edge thereof, for recovery and reuse.

As shown in the plan view of FIG. 17B, and side view of FIG. 17C, detector/ejectors 30,40 are shown to form a portion of the slurry-retaining portion about a base of the outer periphery of the channel 112 of unit 110. The outer walls 116 can add height to the detectors 30. In the depicted embodiment, the detectors 30 are a plurality of linearly-extending devices that are arranged end to end forming an eight-sided, polygonal periphery. In other embodiments, a fewer or larger number of detectors 30 can be arranged as desired to form a periphery with the desired number of sides. A slurry feed hopper 120 directs a feed stream F of comminuted ore or slurry S down into first stage 14a. If the feed stream F is not already a mobile slurry S, water 104 is added, provided through directional nozzles 124 to dilute and urge the slurry S along the arcuate flow path about the first stage 14a.

As shown in the side or elevation view of FIG. 17C, three stages 14a,14b,14c of the separator unit 110 are shown as identifiable by the horizontal line of detectors 30 shown in end-to-end arrangement. The top stage 14a circulates the slurry S and can be controlled at greater depths as appropriate for pre-processing and decanting D removal of low-density gangue for disposal or recycling. High-density target particles M are detected ejected from the respective detectors 30 in the first stage 14a as concentrate C to a lower collector stream of the next stage, subsequent 14b.

As shown in FIG. 18A, the first stage 14a is shown processing slurry S and optionally decanting a clarified liquid D. In this horizontal embodiment, the slurry S can be recirculated until the probability of a particle M remaining therein is below a threshold. As shown in FIG. 23A, feed stream is circulated about the closed loop flow path until the target particle detection evens diminish below a threshold. FIG. 23B illustrates the sequence of detections as the number of target particles remaining in the batch of slurry D diminishes below a threshold 111 that is no longer worth pursuing.

At that point the remaining slurry can be discharged and a fresh feed stream added to the first stage. As shown, when a detector 30 identifies a target particle M, the controller 42 triggers actuation of ejector 40, and a stream of concentrate C is dumped from first stage 14*a* to the subsequent stage 14*b*. The concentrate C is less likely to stratify into high gravity and low gravity component and may not include a decanting step.

Figure 21:
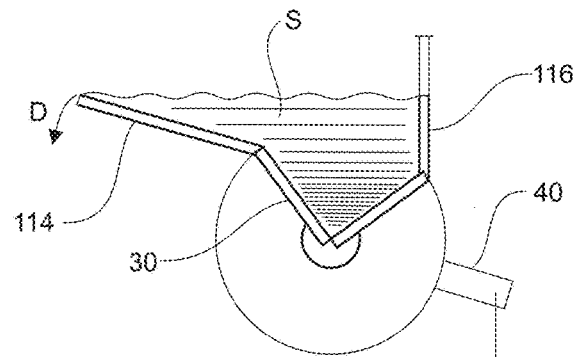
FIG. 21 illustrates radial cross-section of the path of FIG. 20A, illustrating an outwardly and downwardly sloped bottom channel, having a rotating ejector with an upward "V" detector channel and optional radially-inward and optional radially-outward decanting options.

The decanting of a clarified liquid has a particular effectiveness in the first stage 14*a*, and either the outer or inner periphery (FIGS. 19,21 and FIG. 22 respectively) can be fit with one or more decanting outlets 121 for removal of clarified slurry S for removal of largest clarified portion of the slurry that need not be communicated to subsequent stages 14*b*,14*c* . . . .

While a subsequent collector stream may form sufficiently concentrated stream sufficient to be a product stream P, concentrate C streams containing an even greater concentration of metal particles M, less gangue, can be generated using successive stages. The stages 14*a*,14*b*,14*c* are implemented in sequence, the concentrate collector stream of a prior stage forming the feed stream for a subsequent stage and so on. Depending on the nature of the feed stream, the detectors of the first stage 14*a*, may be tailored more so for the coarser aggregate, e.g. larger gaps G, that are the subsequent concentrate streams.

Using hydrodynamic or vortex principles, high-density particles in slurry S are separated by inertia to migrate to the outside of the path. Factors include slurry characteristics including particle density in the slurry, the particle size distribution, viscosity, and flow rates. Further, the dimensions of the channel's cross-section, the flow rates and flow regime, including turbulent, laminar, Newtonian and non-Newtonian flows, all affect particle stratification and concentration adjacent the detectors 30. Each subsequent stage will have a smaller concentrate stream and the configuration of the detector or the characteristic of the stream, can be characteristics, such as dilution with water, can be made.

Referring again to FIGS. 20A through 20D, the presentation of the slurry S to the detectors 30 is managed by the arcuate slurry path, the detectors aligned in-line with the feed stream F of slurry S, the detectors being on the outside of the arcuate path and exposed to the highest density portion of the slurry flow. In FIGS. 20C and 20D, the detectors are at the lowest point of the channel 112 and the lowest point of the detector 30.

In FIG. 20B, the detectors are simply at the outside of the arcuate path and exposed to the highest density portion of the slurry flow. High-density particles settle and stratify downward by gravity to move along the channel bottom, only a portion of which are reliably in contact with the detectors 30.

Fouling of the electrodes 31,33 reduces effectiveness, yet can be managed using periodic flushing of the detectors 30, or to minimize deposition in the first place.

Returning to FIG. 22, in a unit with incorporates many of the discussed principles, the first top stage, processing the feed stream F of slurry, can use a launder 119 to decant D clarified water either outward for collection (not shown) or conveniently, radially inward for collection in a central cylindrical sump 130. The clarified decanted water D can be recycled R, such as by pump 132 and directed to the feed stream F for forming the slurry, or to water jets for agitation of accumulations.

While Computational Fluid Dynamics (CFD) can be used to define the initial parameters of the flow channels 24 and flow conditions generally, such techniques are less useful for multiphase flows. Modelling can be performed for a particular comminuted ore and empirical review performed to optimize the design. Factors to consider can include management of flow velocities so as to avoid deposition and settling of particles P along the detector. The fluid velocities and depth of the flow are managed depending on the path, including the slurry particulate distribution, densities, and path geometry. Depending on the gravity settling parameters, including that dictated by principles such as Stokes law, the Reynolds number and the Manning Equation, the flow is generally above a minimum rate to provide a stratified suspension of the particulates, with particles of interest—the higher density, target metallic particles M concentrating along the detector, and no-or-low value and low density particles suspended and spaced higher in the flow, suspended above the detector 130. Particle deposition and accumulation in unsteady state conditions is preferably followed by re-suspension into the stream S by a change or re-establishing of the slurry flow or strategic flushing to render the particles available for detection.

In transport systems for slurries, it's important to avoid settling of solids by keeping the fluid velocities in the channels above certain rates. For water-based slurries, the flow rates depend primary on the type and size of the particulate solids in the slurry S.

As an example of open channel particulate dynamics for water, generally fine sand particles smaller than 200 mesh may require minimum flow velocities in the order of 1-1.5 m/s, sand in the 200 to 20 mesh require 1.5-2 5 m/s and coarse particulates of 20-4 mesh require 2-4 m/s.

One simplistic approach to sizing might be to design the length of the flow path and the number of passes based on the rate of detector events in a period of time. A batch of slurry S might be recirculated in a stage 14*a* as needed to ensure a certain percentage of the expected metals M are recovered therefrom. The number of detector events over time, and ejection events to the next stage diminishes over time as remaining metal particles M are extracted from the slurry S, eventually reaching a point of uneconomic return. The depleted slurry S is then dumped to waste or for remedial processing.

Alternatively, and as demonstrated in Example 3 above with three phases of detectors/ejectors, if the apparatus is right-sized or oversized, one might typically see individual sequential detectors 30 demonstrating reduced triggering at each successive detector 30 in series as the slurry S becomes depleted of metals M, and basically having few, or no, target particles remaining at the last phase of detectors. Modelling or empirical determination will assist with sizing of the apparatus to optimize the number of detectors 30, the dimensions of the flow channel 112 and the slurry conditions.

Figure 24A:
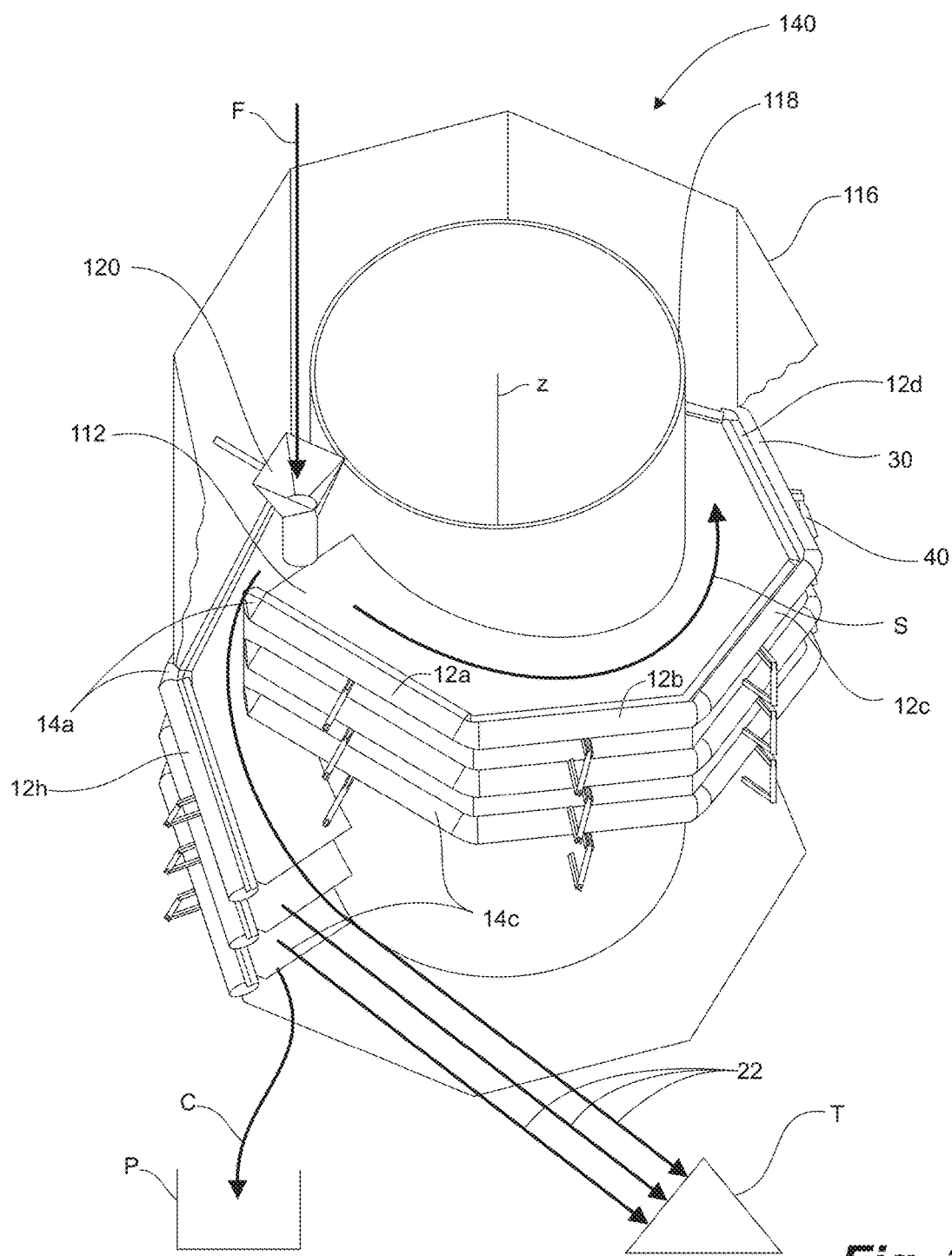
FIG. 24A is a perspective view of a three stage, once through unit in which the feed stream in a first stage is processed along multiple phases of the detection/ejection devices, eight shown, the concentrate ejected from each stage being processed in subsequent like stages, the residuum from each stages discharging to tailings and concentrate from the last stage being recovered as product.
Figure 24B:
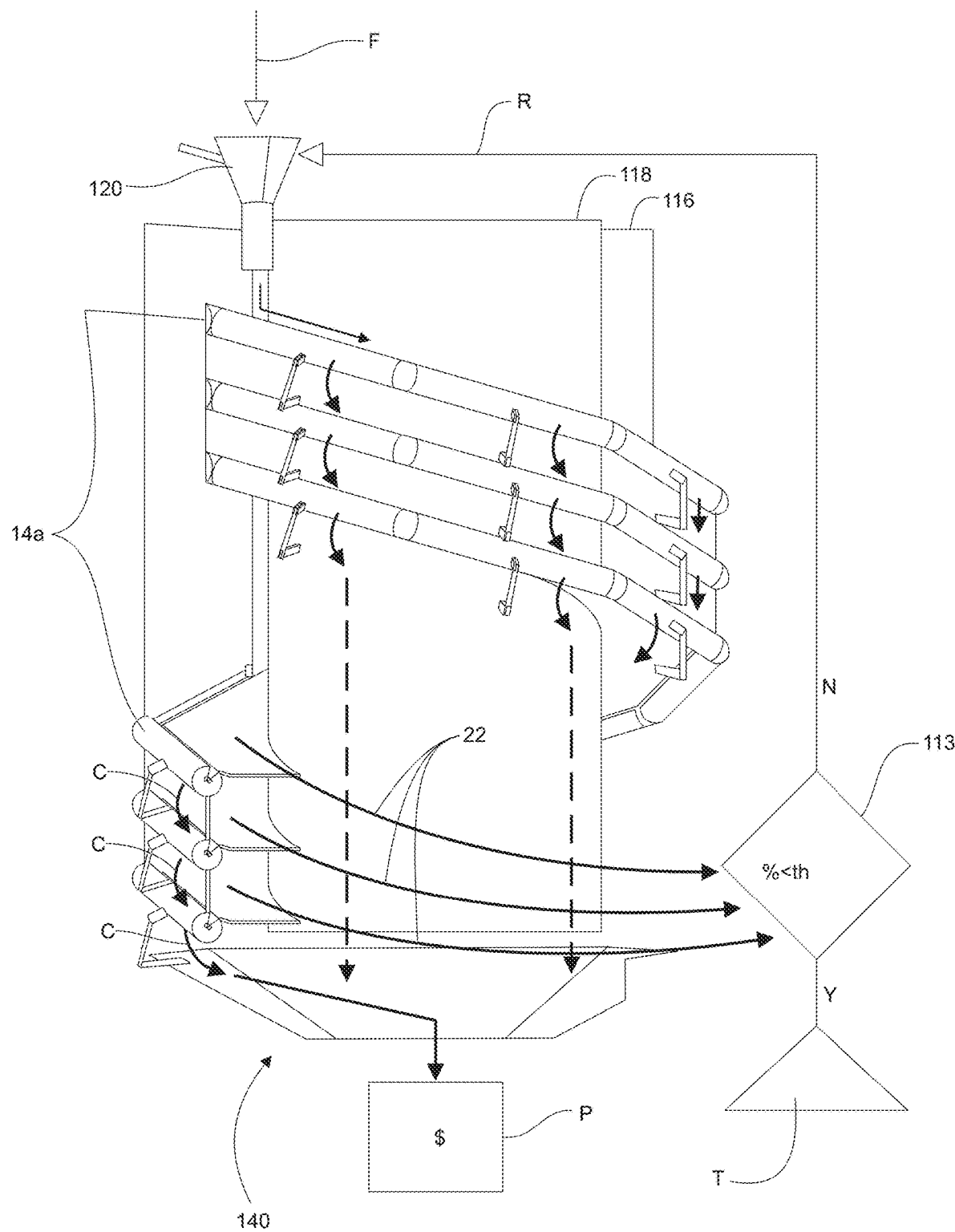
FIG. 24B is a side view of the three stage unit of FIG. 24A, with a tailings recycle option if the detection events or concentration for each stage remain above a threshold, with recombination and recycling optional for each of the multiple stage residuum 22,22,22.

With reference to FIGS. 24A and 24B, in another embodiment of a separator unit 140, each stage 14*a*,14*b*,14*c* is a channel 112 forming an inclined or helical flow path about a vertical axis Z of the separator 140. Herein spiral and helical may be used interchangeably as the context suggests. Not shown, but not excluded from the embodiments herein, is an embodiment in which the channels 112 of one of more stages might spiral outwardly for in-stage variation of the flow dynamics of the slurry S and particle separation. For example, it is contemplated that one or more of the effective diameter of the arcuate path, the cross-section of the channel 112 and other flow characteristics might vary as the slurry S changes, along the channel 112, from stage to stage 14*a*, 14*b*,14*c*, or from separator to separator in series.

For example, in an embodiment, a successive stage 14*b*, 14*c* . . . , having a more concentrated, higher density slurry stream S might have a narrower channel 112, or a steeper helical incline, or even a spiral arcuate path, the change in radius decreasing or increasing particle stratification and detection.

Similar to horizontal channels 112 of FIG. 17A, the helical embodiment of FIGS. 24A,24B have a feed chute 120 for directing the feed stream F of slurry S to the first stage 14a. Unlike the embodiment of FIG. 17A, which may be operated in batch mode, this embodiment has an inherent continuous flow operation as the slurry S flows downwardly past successive phases of detectors 30. As the detectors 30 are arranged along an incline, the detectors can be are slightly longer, or more detectors be arranged about the same diameter, for maximizing target particle ejection before the residuum 22 is discharged. This arrangement has an improved contact opportunity for the same footprint of the separator apparatus.

As shown in in the FIG. 24B, if the residuum 22 of the slurry S reaches the end of the arcuate path and still contains an economic percentage of metals within, not yet below a design threshold percentage 113, the partially-spent residuum 22 can be recirculated R back up for further processing.

Due to a coincident vertical arrangement of first feed stage 14a and concentrated stream stages 14b,14c, aligned one over another, only one 360 degree revolution is shown. Multi-start helixes stages can be located in one separator 140 with greater spatial efficiency, for example, having a second 3-stage system 140 axially offset and intertwined between the first 3-stage start.

With reference to FIGS. 25A and 25B, and using the helical separator 140 as an example, increases in recovery efficiency and in throughput can be managed with separator units 140 arranged in series or in parallel respectively.

In FIG. 25A, such further series processes for increased recovery efficiency may use the same separator unit 140 or also another unit having different configuration including a flow path crafted to the characteristics of the concentrated feed stream, or apply different detector design for a change in the slurry particulate load and characteristics.

Increases in efficiency may also be effected using separator unit 140 for an initial processing and a different process for refining the concentrate therefrom.

Dry Transport

In the embodiments above, hydro-mechanical transport is shown as effective for moving larger aggregate through a mineral processing system. However for the transport of smaller particles such as less than 1 mm, it is believed that the use of dry transport under the influence of gravity and with the optional addition of vibratory transport can either supplement or replace hydro-mechanical transport. Vibratory transport is known in materials handling systems, particularly in mineral processing systems and the food industry. It is also known in the diamond recovery industry.

Design of vibratory feeders are specific to application. Vibratory action of can further enhance metallic particle availability for detection. In thin layer systems, more-dense particles migrate downward migration through the aggregate.

Further, in electrode detection systems described above, vertical vibration alone generates more positive contact due to relative vertical motion of particles and detector electrodes. This vibratory transport is ideally suited to further enhance the performance of the profiled detector electrodes of Example 2.

Further, in the hydrodynamic transport embodiments coupled with electrode-type detectors, in the processing of small particles in slurry, signal resolution between particle contacts and the slurry itself can become indistinguishable. Currently slurry embodiments uses a controller having circuit sensitivity set just high enough that it is marginally below the threshold at which water flow is detected. Thus, transporting a feed stream without water obviates obscuring particle signals with a background signal and the detector sensitivity can be increased significantly. Therefore dry vibratory feed provides for increased recovery efficiency of very small particles. Vibration of a plate, such as an inclined plate, including a circular trough, can be energized with a pneumatic driven vibration mechanism where electrical power is limited.

The ejection of particles, through the axial rotation of a detector roller, ejects a significant amount of gangue with the detected target particle and requires complex sealing interfaces between the detector roller body and the material transport chute. As illustrated above, the amount of gangue material is the entirely of the stream in the roller-type detector. Further, both of the trough-edge seals along the roller and opposing end seals are exposed to the possibility of jamming due to fine particles migrating into the seal gap and require periodic maintenance. Whilst the axial rotation system of ejection is effective at ejecting target particles, the mechanical reliability of the system is troublesome and is associated with lower than desirable waste gangue material. Thus, alternate ejection systems, which are complementary with dry transport, are disclosed which use fewer or no moving parts and may reduce waste.

Two categories of particle ejection are considered, namely: active ejection in which a target particle (along with some gangue) is physically ejected from the bulk feed stream; and passive ejection, where the entirely of the feed stream is diverted to recovery for a short duration while a target particle is present therein.

Active ejection include ejection by the application of a high pressure, fluid jet 40J to the feed stream. Arrangement the enable such a process including a cascade of the feed stream from a conveyor. The conveyor, such as a channel in the hydrodynamic embodiments, can house a detector 30 noting the passage of a target particle. The feed stream F, containing the target particle M is conveyed to cascade in an unsupported moving sheet of material through space, substantially in a two-dimensional (2D) stream. The jet can be actuated to eject the target particle M when it passes the jet's ejection zone. A controller 42 is calibrated with the velocity of the feed stream, the time of detection, the time the target particle M will be in the jet's zone, and a jetting duration if applicable. The parameters may also include lateral coordinates if the detector or detectors 30 specifically identify the target particle location in both time and lateral position in the 2D stream. Variation in lateral position can be managed by movable jets, or multiple jets, each for which target a specific width of the falling stream.

Multiple phases of concentration can be achieved with multi-level stacking of conveyers, with cascades of the feed streams discharging from a first phase 12a of detection and ejection from a first conveyor, to a second phase of detection and ejection from a second conveyor, and so on. The ejected material can be collected and combined as a concentrate, or directed to additional stages of concentration.

As the concentrate can be associated with less gangue, the nature of the more highly concentrated concentrate stream can be more amenable to alternate and more specific detectors. For example, with visible target particles, further refinement can include optical sensors identifying visual, or spectral characteristics enabling pinpoint targeting by the ejector step. As the concentrate contains both target particles of interest M, such as gold and other conductive particles are not if interest and preferably remain part of the gangue, an optical sensor could be provided to optically identify characteristics that are unique to the target particles of interest. A controller would include spectral analysis or other digital image analysis. The optical sensor is directed at the cascade, of feed stream on the conveyor, and generates a trigger signal related to characteristics unique to the target conductive particles of interest.

One embodiment of high pressure, fluid jet ejection is air jet ejection. Such technique have been deployed successfully in numerous materials handling applications across many industries. Diamond recovery machines, such as those used by DeBeers Group, South Africa, have deployed air ejection during primary concentration and secondary reconcentration of material. A blast of high-pressure air is aimed at the target particle as follows: Once a target particle is detected, a triggering signal is sent to a downline air jet manifold to initiate the activation of an air nozzle. A time delay of the firing of the jet is a function of the distance of the nozzle from the detection point as well as the known velocity of the particle. The lateral position of the particle is noted and, in embodiments with multiple jets, the corresponding nozzle is fired at the appropriate delay time. The "on time" of duration (td) of the jet is set to allow for the smallest possible amount of gangue material to be ejected along with the target particle. An advantage of this jet system is that the detector embodiment can remain fully stationary, therefore eliminating the need for complex seals and moving componentry.

If in individual particle is targeted, then the speed and its relative position along the detector must be known, and furthermore a complex control system is required. However, similar to the existing axial rotation ejection, if the entire volume of material on the detector is to be ejected along with the target particle, the system is simplified by having a air jet on-time equivalent to the time it takes for a particle to pass along the length of the detector.

For ejection from a cascade of material, both an increase in throughput and a reduction in gangue are achieved using multiple detectors arranged transverse to the flow, providing lateral location of target particles for pinpoint ejection. Multiple longitudinal detector channels are arranged along the conveyor and each detector associated with a corresponding jet.

This system is applicable with inclined gravity transport of dry materials but, in embodiments, consistency of material flow is assisted by vibration.

Figure 4B:
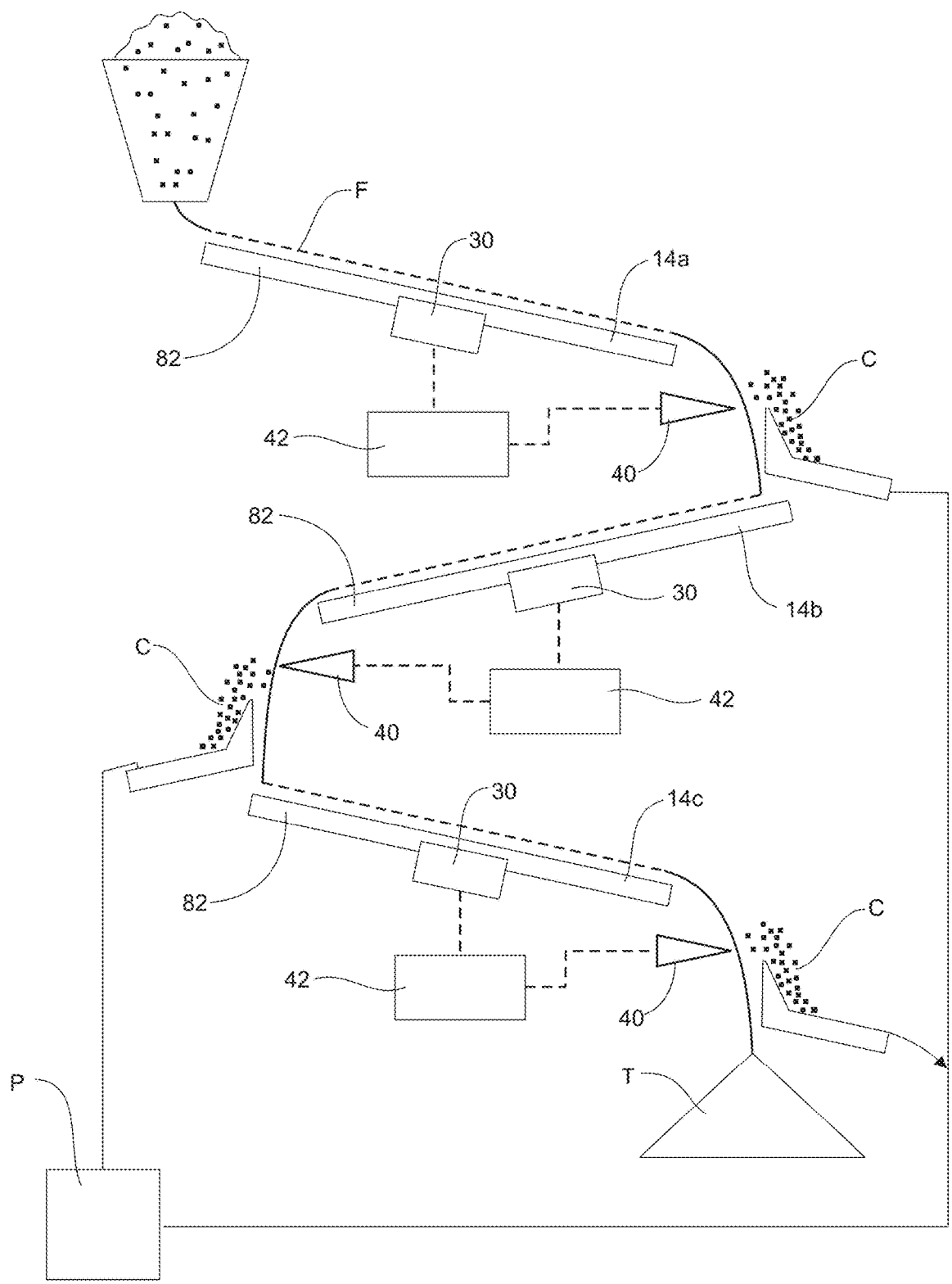
FIG. 4B is an embodiment of a stacked path for detection and active ejection of detected particles and the control circuit therefor.
Figure 26:
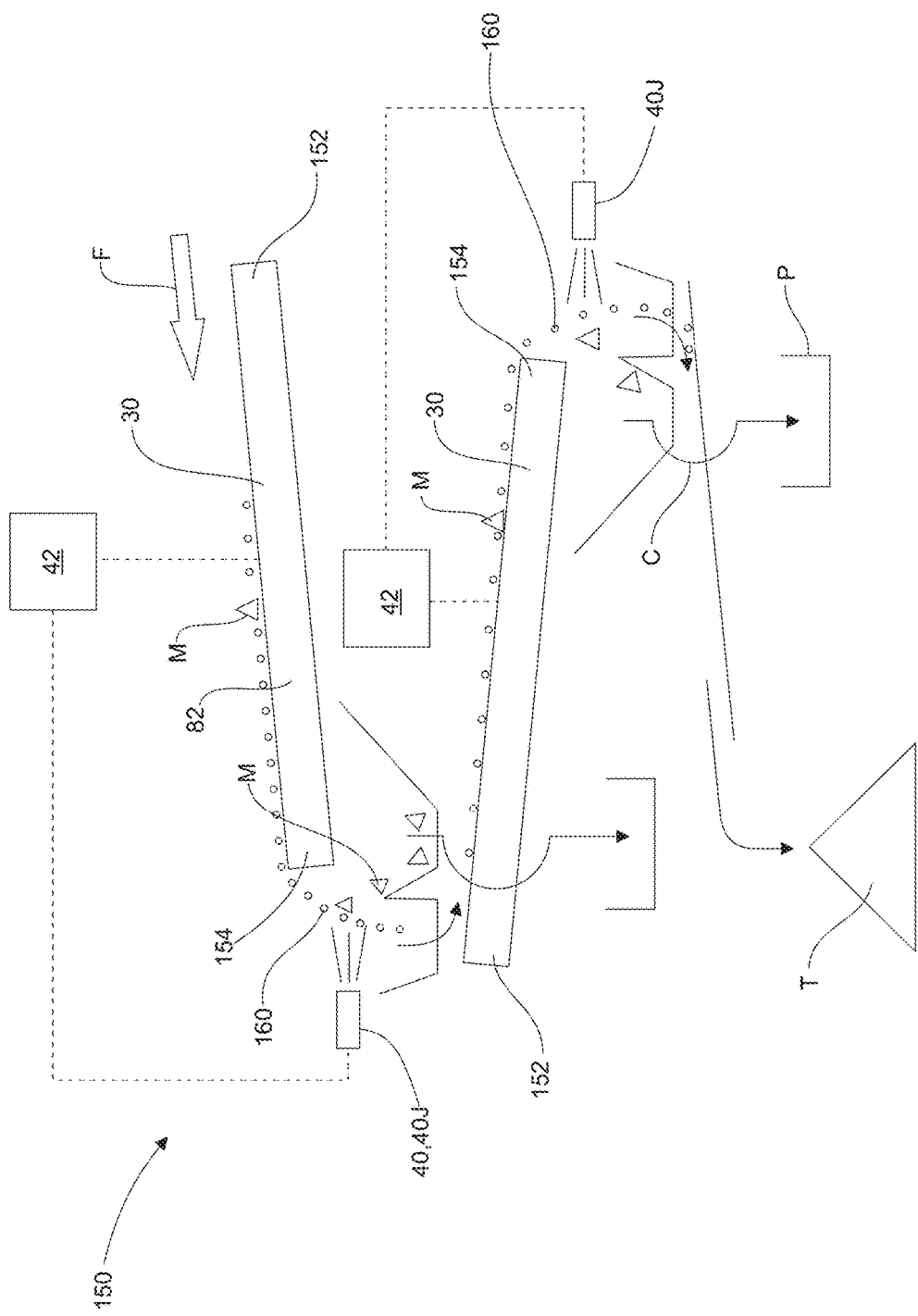
FIG. 26 is a schematic side view of a multilevel arrangement of conveyors for the formation of multiple unrestrained cascades of the feed stream, each cascade available for active ejection of target particles, such as through the application of high pressure fluid jets.

With reference to FIG. 26 and to the flow chart of FIG. 4B a cascade-type separator 150 is provided. Three phases of detection are provided in a multi-level conveyor system. Each conveyor 82 is inclined or provided with an alternate energizing means such as a vibrator 58, or both. The feed stream F advances from a feed end 152 to pass a detector 30 and falls from a discharge end 154. The detector 30 is connected to a controller 42 and the controller is connected to an ejector 40, in a jet-type ejector 40J. As shown in FIG. 7A, the ejector 40J can be multiple ejectors 40J,40J . . . each corresponding to and connected to multiple detectors 30,30 . . . . The feed stream F free falls in an unsupported or unconstrained cascade 160, exposing the stream to the ejection devices 40J. The cascade 160 is a thin sheet and the ejectors 40J are typically directed perpendicular to the cascade which can be directed towards the front side for capture of the ejected concentrate C from the backside (as shown in FIG. 26) or directed from the backside for capture of the concentrate C on the front side (as shown in FIG. 7A).

The cascade is relatively thin, and in vibratory transport, might be as thin as one particle thickness, rendering the target particles as detectable from both front and backsides, as well as minimizing gangue during ejection. Visibility, including detection by optical and more broadly, spectral, can be tuned to identify target particles in such as 2D sheet presentation, particularly in subsequent phases of detection or subsequent stages of concentration. For thicker cascades, greater than one particle in thickness, visibility characteristics detectors may be advantageously located on the backside due gravity separation, favoring the backside of the feed stream F and cascade 160. In embodiments using alternate detectors which use surface or visual characteristics of the target particles, a visual detector could be directed to the cascade 160 rather than along the conveyor 82. Detectors in bulk materials include hyperspectral imaging systems such as that disclosed in US publication 20070265783 to ABB Schweiz AG. An optical system using cameras can identify foreign objects in an image of the tobacco stream and eject foreign objects as disclosed in U.S. Pat. No. 6,637,598 to Japan Tobacco Inc.

Figure 28:
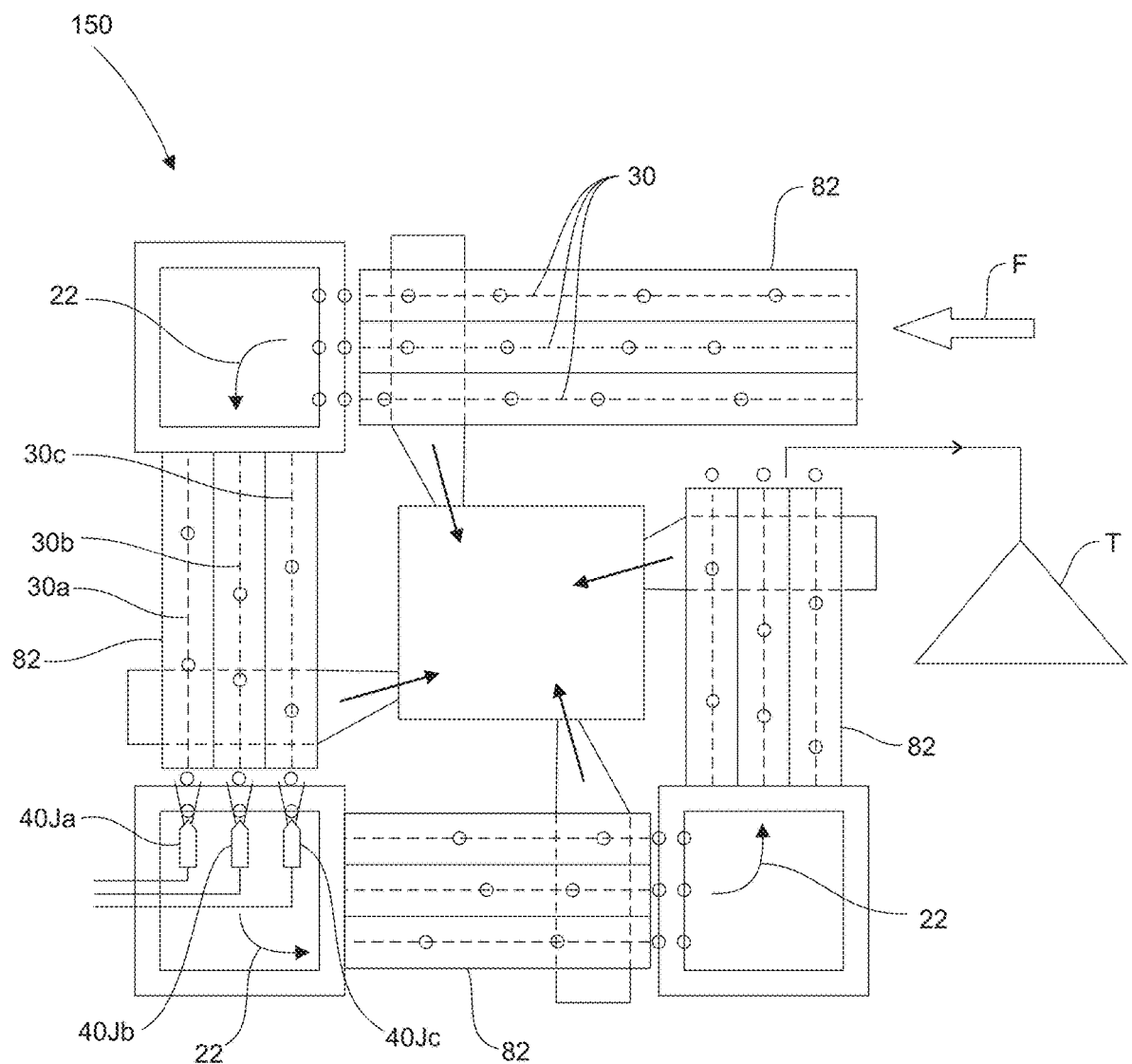
FIG. 28 is a schematic top view of the multilevel arrangement of conveyors in a compact footprint, such as that shown in FIG. 26, each conveyor shown with three V-troughs for three detectors, and with product ejected from each stage being directed inwardly to a common product receiver and the residuum stream from each stage being directed to the next stage until discharge to tailings, one example of the jet ejection method of FIG. 26, shown located at the cascade from stage 2.

A reduced-footprint separation unit can arrange the multi-level conveyors with the discharge end 154 of one located above the feed end 152 or another, with the conveyors 82 aligned vertically or in a polygonal, helical fashion as shown in FIG. 28. The mechanical aspect of the separator 150 has advantageously minimized or eliminated moving parts. Using vibratory transport, only the conveyor 82 is a moving, being vibrating surface, attached only to vibration supports and an integral vibrator 58, the design of which is designed for a large number of cycles.

In the two dimensional representation of FIG. 26 the conveyors are aligned vertically. In the separator 150 of FIGS. 27 and 28 the conveyors 82 are arranged in successive 90 degree arrangements, and in FIG. 28, a four-sided, square arrangement for a compact separator 150 with a common central collection of each phases concentrate C as product P.

Figure 27:
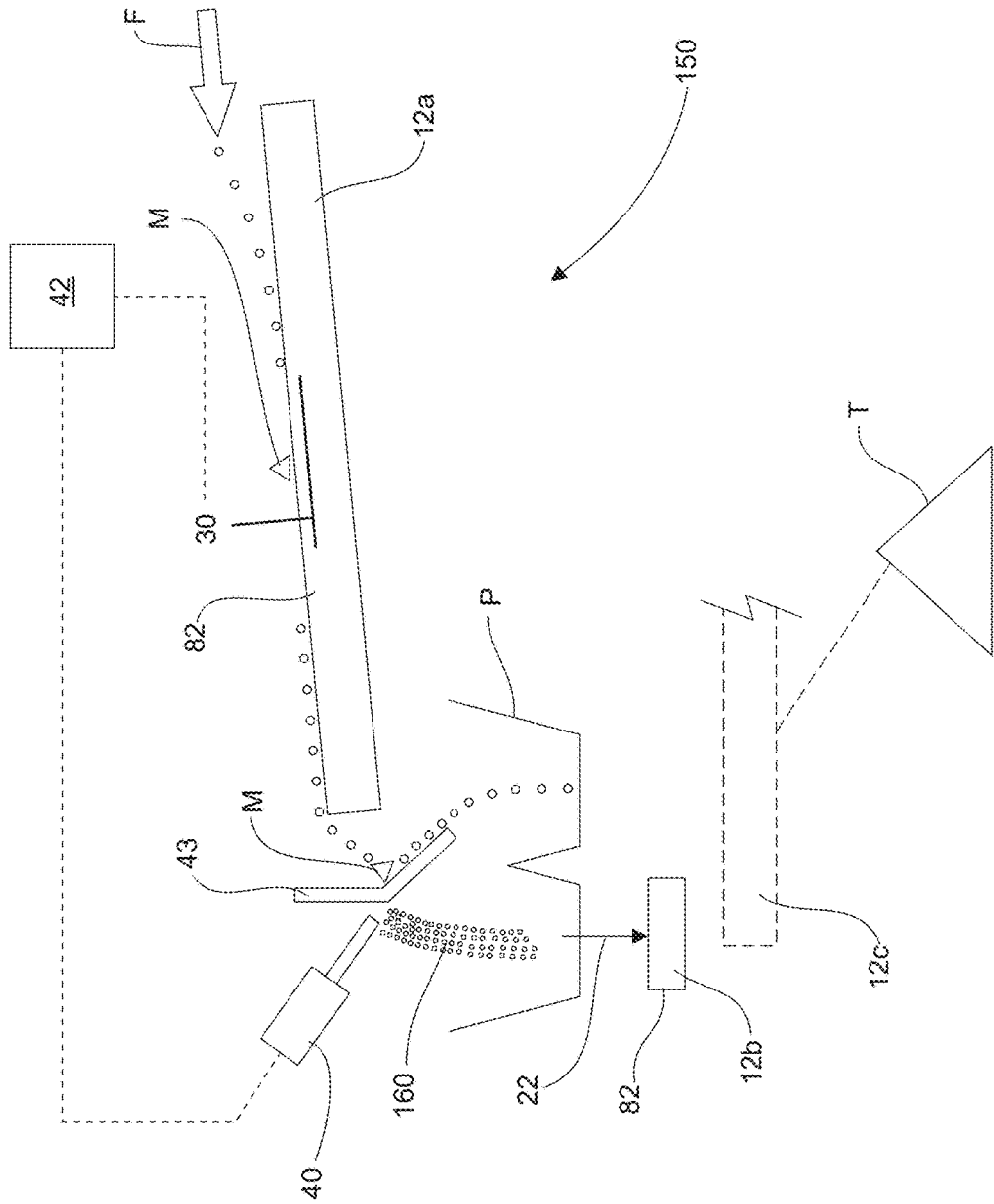
FIG. 27 is a schematic side view of another embodiment of a multilevel arrangement of conveyors for the formation of multiple unrestrained cascades of the feed stream, each cascade available for ejection of target particles, such as through direct diversion of the stream to a concentrate product or to tailings, the tailings stream being directed to subsequent detector/ejection phases.

In FIG. 27, the ejector 40 is mechanical, in which the controller 42 is connected to an actuator for moving a paddle 43 into and out of the cascade for temporary diversion of that portion of the feed stream containing the target particles M to product P. Two phases 12a,12b and conveyors 82,82 are shown, however, as shown in FIG. 28, three or four conveyor loops provide a convenience small footprint with maximum detecting and ejection opportunities before doubling the number of conveyors vertically from 3 to 6 or from 4 to 8.

Returning to FIG. 28, a four phase, four conveyor system is provided in which each conveyor contains three parallel detectors 30a,30b,30c. The resolution of detection of feed stream is increased three-fold. Each conveyor 82 can be as depicted in FIG. 7C in which the conveyor serves only as a detector and transport system, and the ejectors are spaced downstream therefrom. Each detector 30a,30b,30c is associated with a corresponding jet-type ejector 40Ja,40Jb,40Jc. When a target particle M is identified in the detection zone of only one of the detectors, say detector 30a, then only the ejector 40Ja is actuated to eject merely ⅓ of the width of the cascade 160 as concentrate C. If target particles are detected in the detection zones of all three detectors 30a,30b,30c then all three corresponding ejectors 40Ja,40Jb,40Jc are actuated, and the entire width of the cascade 160 is ejected for the time duration (td) dictated by the geometry of the conveyor 82, detector 30 and feed stream F.

Figure 29:
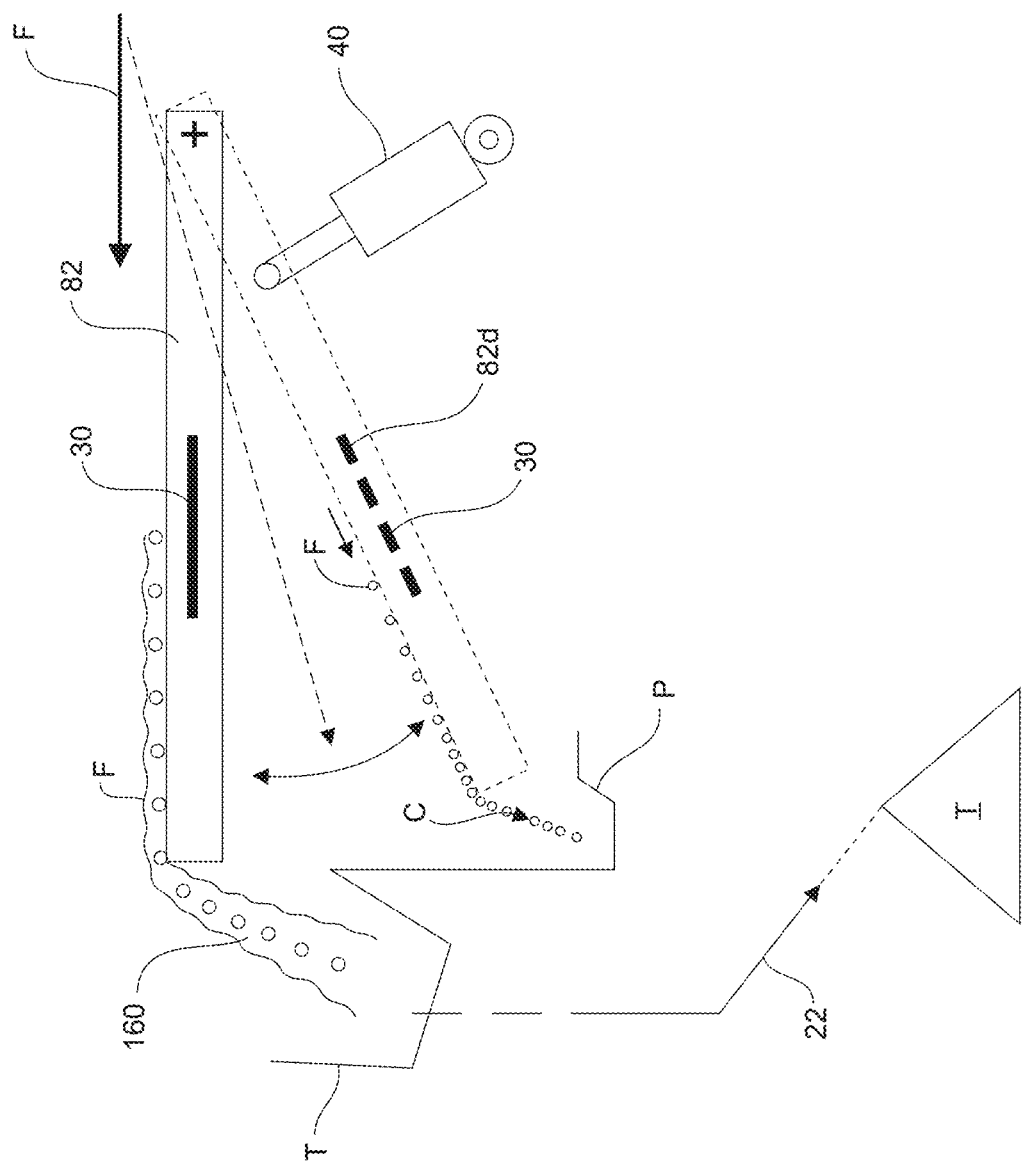
FIG. 29 is a schematic side view of another embodiment of a multilevel arrangement of conveyors with unrestrained cascades for ejection of target particles, the conveyor itself being directable for passive diversion of the entire stream to either product if target particles are detected or tailings if not.
Figure 30:
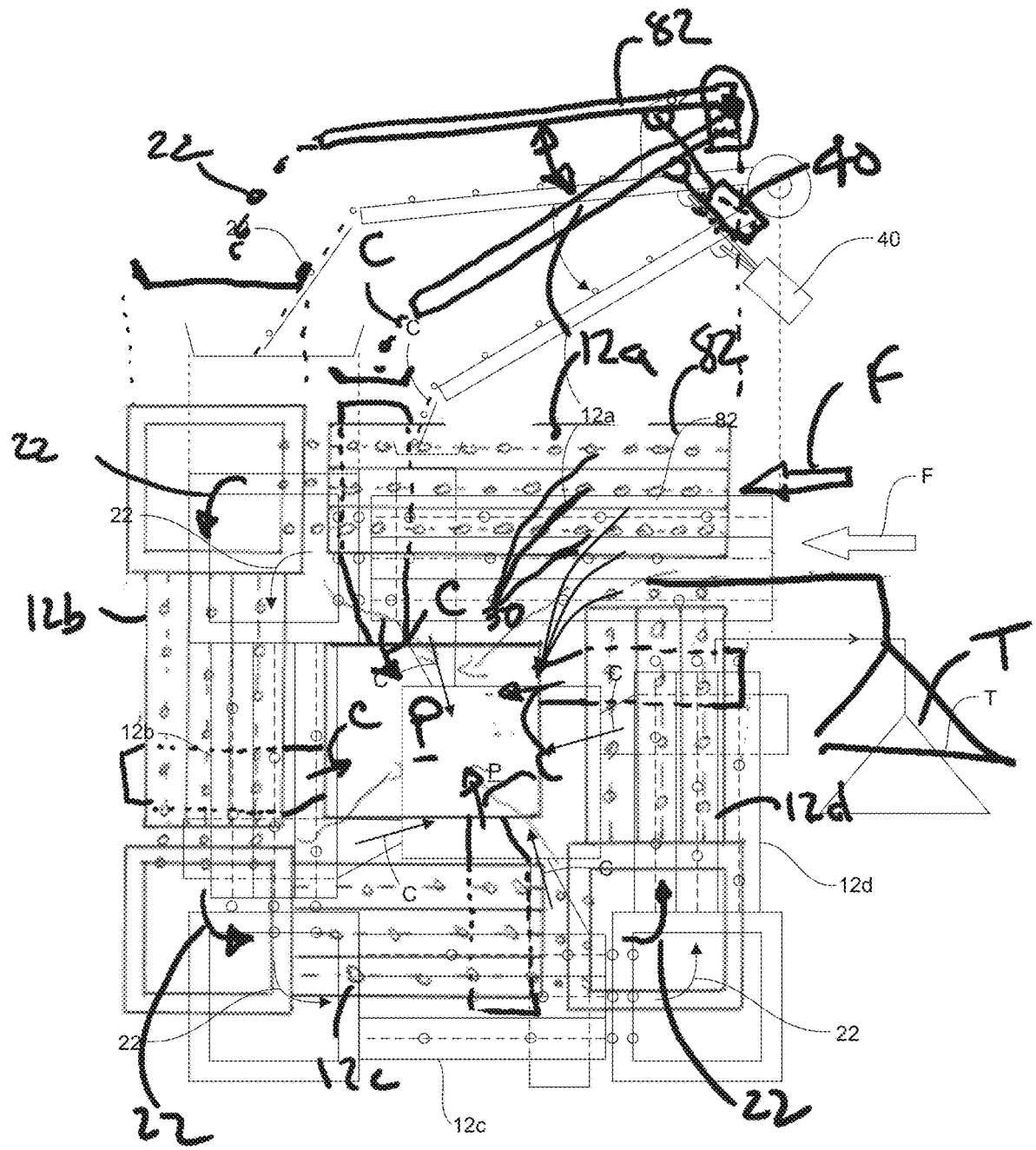
FIG. 30 is a schematic top view of the multilevel arrangement of conveyors of FIG. 29 in a compact footprint, the first phase being shown side view per FIG. 29 in relation to the first phase in plan view, the conveyors being pivotable to directed product to an inwardly spaced product tray and returnable to a discharge to the next stage conveyor until discharge to tailings.

With reference to FIGS. 29 and 30 another embodiment of a cascade-type separator unit 170 is provided. In FIG. 29, only one phase 12a is illustrated, and in FIG. 30 four phases 12a though 12d are disclosed. A mechanically simple, passive ejection apparatus and methodology is provided in which the entirely of the feed stream F is diverted when a target particle is identified by detector 30. Multiple detectors 30 improve the areal coverage of the feed stream, and identification of target particles therein, and do not result in specific ejection of a portion of the stream as was possible in the earlier separator 150. This simplistic system can result in higher gangue including in the concentrate C, but is simple, reliable and gravity transport alone would be suitable for most ore streams.

We claim:

1. A process for selecting particulates of conductive metals from an ore-containing aggregate, comprising:
    transporting the aggregate as a feed stream along a path;
    directing the feed stream through at least a first elongate detection zone, the first elongate detection zone comprising a V-shaped trough having a feed end, a discharge end, and bottom apex, and a first electrical detector at the bottom apex of the V-shaped trough, wherein the feed stream flows through the V-shaped trough from the feed end to the discharge end in parallel to the first electrical detector, and wherein a higher density portion of the feed stream gravimetrically concentrates towards the first electrical detector as the feed stream flows through the V-shaped trough;
    detecting the presence of conductive metals in the higher density portion of the feed stream in the first elongate detection zone and producing a triggering signal indicative of conductive metals detected therein; and
    actuating ejection of at least a portion of the feed stream that was in the first elongate detection zone to a concentrate stream upon receipt of the triggering signal, the balance of the feed stream continuing along the path as a residuum stream.

2. The process of claim 1, wherein transporting the aggregate as a feed stream along the path comprises dividing the feed stream into two or more sub-streams, each sub-stream being directed through a respective detection zone of the at least first elongate detection zone, and wherein at least a portion of a given sub-stream is ejected upon receipt of a respective triggering signal indicative of conductive metals detected therein.

3. The process of claim 1, wherein actuating ejection of the at least a portion of the feed stream that was in the first elongate detection zone comprises:
    displacing at least the first electrical detector corresponding to the triggering signal for ejecting the feed stream in the first elongate detection zone;
    cascading the feed stream in a free fall;
    determining a relevant portion of the cascading feed stream that was in the first elongate detection zone upon generation of the triggering signal; and
    ejecting the relevant portion.

4. The process of claim 1, wherein the feed stream comprises a slurry of ore and water or a dry stream.

5. The process of claim 1, wherein directing the feed stream through the first elongate detection zone further comprises vibrating the V-shaped trough to facilitate gravimetric concentration of the higher density portion of the feed stream toward the first electrical detector at the bottom apex of the V-shaped trough.

6. The process of claim 1, wherein the first electrical detector comprises one or more pairs of electrodes, each pair being spaced by a gap; and wherein the presence of conductive metals is detected when one or more conductive metal particles straddles the gap.

7. The process of claim 6, wherein each pair of electrodes comprises a first electrode with a first linear side face and a second electrode with a second linear side face, and wherein the first linear side face is adjacent and parallel to the second linear side face such that the gap is formed therebetween.

8. The process of claim 7, wherein the second electrode comprises an undulating top surface exposed to the underside of the feed stream.

9. The process of claim 1, wherein actuating ejection of the at least a portion of the feed stream comprises:
    allowing the feed stream to free fall in a cascade out of the first elongate detection zone; and
    mechanically diverting the at least a portion of the feed stream out of the cascade to the concentrate stream.

10. A system for selecting particulates of conductive metals from a feed stream of an ore-containing aggregate, comprising:
    one or more elongate detection zones, each elongate detection zone comprising a V-shaped trough having a feed end, a discharge end, and a bottom apex, and one or more electrical detectors at the bottom apex of the V-shaped trough, each of the one or more electrical detectors configured to detect the presence of conductive metals in the feed stream and generate a triggering signal, wherein the flow of the feed stream through each V-shaped trough from the feed end to the discharge end is parallel to the one or more electrical detectors, and wherein a higher density portion of the feed stream gravimetrically concentrates towards the one of more electrical detectors as the feed stream flows through each V-shaped trough; and
    one or more ejection mechanisms actuatable responsive to a respective triggering signal from at least one electrical detector of the one or more electrical detectors to divert a portion of the feed stream associated with the at least one electrical detector to the concentrate stream.

11. The system of claim 10, wherein the one or more elongate detection zones comprises two or more elongate detection zones arranged in parallel, each detecting conductive particles in a respective sub-stream of the feed stream.

12. The system of claim 11, wherein a respective ejection mechanism of the one or more ejection mechanisms is positioned proximate each respective elongate detection zone of the two or more elongate detection zones.

13. The system of claim 10, further comprising:
    a vibrating mechanism configured to vibrate the V-shaped trough of each elongate detection zone to facilitate gravimetric concentration of the higher density portion of the feed stream toward the bottom apex of the V-shaped trough.

14. The system of claim 10, wherein the discharge end of each V-shaped trough comprises a drop-off at which the feed stream free falls as a cascade, and the one or more ejection mechanisms emit an air stream directed at the cascade to divert the portion of the feed stream to the concentrate stream.

15. The system of claim 10, wherein the conductive metals have optically identifiable characteristics, and the system further comprises:
    at least one subsequent channel for receiving the concentrate stream and transporting the concentrate stream as a cascading stream in front of at least one optical sensor configured to generate an optical trigger signal related to characteristics unique to the conductive particles;
    at least one subsequent ejection mechanism for receiving the optical triggering signal and diverting the conductive metals in the cascading stream as a subsequent ejected concentrate stream.

16. The system of claim 10, wherein each of the one or more electrical detectors comprises one or more pairs of electrodes, each pair being spaced by a gap;

and wherein the presence of conductive metals is detected when one or more conductive metal particles straddles the gap.

17. The system of claim 16, wherein each pair of electrodes comprises a first electrode with a first linear side face and a second electrode with a second linear side face, and wherein the first linear side face is adjacent and parallel to the second linear side face such that the gap is formed therebetween.

18. The system of claim 17, wherein the second electrode comprises an undulating top surface exposed to the underside of the feed stream.

19. The system of claim 10, wherein the one or more elongate detection zones comprises two or more elongate detection zones arranged in series such that the discharge end of the V-shaped trough of one elongate detection zone is proximate the feed end of the V-shaped trough of a subsequent elongate detection zone; and wherein at least one ejection mechanism of the one or more ejection mechanisms is positioned between the discharge end of the V-shaped trough of the one elongate detection zone and the feed end of the V-shaped trough of the subsequent elongate detection zone.

20. The system of claim 10, wherein the discharge end of each V-shaped trough comprises a drop-off at which the feed stream free falls as a cascade, and the one or more ejection mechanisms comprises a mechanical ejector that mechanically diverts the portion of the feed stream to the concentrate stream.

* * * * *